US011668915B2

(12) United States Patent
Choi

(10) Patent No.: US 11,668,915 B2
(45) Date of Patent: Jun. 6, 2023

(54) DIOPTRIC TELESCOPE FOR HIGH RESOLUTION IMAGING IN VISIBLE AND INFRARED BANDS

(71) Applicant: Youngwan Choi, Marina Del Rey, CA (US)

(72) Inventor: Youngwan Choi, Marina Del Rey, CA (US)

( * ) Notice: Subject to any disclaimer, the term of this patent is extended or adjusted under 35 U.S.C. 154(b) by 0 days.

(21) Appl. No.: 17/356,348

(22) Filed: Jun. 23, 2021

(65) Prior Publication Data
US 2021/0325648 A1    Oct. 21, 2021

Related U.S. Application Data

(63) Continuation-in-part of application No. 17/173,141, filed on Feb. 10, 2021, which is a continuation-in-part
(Continued)

(51) Int. Cl.
*G02B 17/06* (2006.01)
*G02B 23/12* (2006.01)

(52) U.S. Cl.
CPC ..... *G02B 17/0694* (2013.01); *G02B 17/0605* (2013.01); *G02B 23/12* (2013.01)

(58) Field of Classification Search
CPC ............ G02B 17/0694; G02B 17/0605; G02B 23/12; G02B 17/0856; G02B 17/0848; G02B 23/06
See application file for complete search history.

(56) References Cited

U.S. PATENT DOCUMENTS

| 4,101,195 A | 7/1978 | Nasa Korsch |
| 5,631,770 A | 5/1997 | Jarmuz |

(Continued)

FOREIGN PATENT DOCUMENTS

| CA | 2568108 A1 | 5/2008 |
| CA | 2647405 A1 | 6/2009 |

(Continued)

OTHER PUBLICATIONS

Savini, G., et al. "TWINKLE: a low earth orbit visible and infrared exoplanet spectroscopy observatory." Space Telescopes and Instrumentation 2016: Optical, Infrared, and Millimeter Wave. vol. 9904. International Society for Optics and Photonics, 2018.
(Continued)

*Primary Examiner* — Jade R Chwasz
(74) *Attorney, Agent, or Firm* — Knobbe, Martens, Olson & Bear, LLP

(57) ABSTRACT

A cata-dioptric optical system for high resolution imaging in visible and infrared bands. The system includes a concave primary mirror, a convex secondary mirror, at least one beam splitter, a first folding mirror, a first group of lenses, a second group of lenses, and at least two image planes. The image planes have one or more aggregated sensors, where a first image plane receives rays from the first group of lenses and a second image plane receives rays from the second group of lenses, and at least one image plane is positioned
(Continued)

behind the primary mirror and at a radial distance from the optical axis that is no more than the radius of the primary mirror.

21 Claims, 30 Drawing Sheets

Related U.S. Application Data of application No. 16/989,635, filed on Aug. 10, 2020, now Pat. No. 11,320,637.

(60) Provisional application No. 62/885,296, filed on Aug. 11, 2019.

(56) References Cited

U.S. PATENT DOCUMENTS

| | | | |
|---|---|---|---|
| 5,841,574 | A | 11/1998 | Willey |
| 6,333,811 | B1 | 12/2001 | Tatian et al. |
| 6,366,734 | B1 | 4/2002 | Beran et al. |
| 6,374,047 | B1 | 4/2002 | Beran et al. |
| 6,826,358 | B2 | 11/2004 | Partynski et al. |
| 6,969,176 | B2 | 11/2005 | Pohle |
| 7,031,059 | B1 | 4/2006 | Costes |
| 7,049,597 | B2 | 5/2006 | Bodkin |
| 7,082,001 | B2 | 7/2006 | Vizgaitis |
| 8,023,183 | B1 | 9/2011 | Cook |
| 8,123,371 | B2 | 2/2012 | Cook |
| 8,427,744 | B2 | 4/2013 | Cook |
| 8,534,851 | B2 | 9/2013 | Spencer |
| 9,377,614 | B2 | 6/2016 | Laborde et al. |
| 10,054,395 | B1 * | 8/2018 | Fantozzi ............... F41G 3/165 |
| 2005/0168811 | A1 | 8/2005 | Mattei |
| 2007/0109637 | A1 | 5/2007 | Cook |
| 2008/0266687 | A1 | 10/2008 | Cook |
| 2009/0009897 | A1 | 1/2009 | Holota et al. |
| 2010/0065725 | A1 | 3/2010 | Blanc et al. |
| 2011/0176205 | A1 | 7/2011 | Shaw et al. |
| 2015/0028212 | A1 | 1/2015 | Wright et al. |
| 2016/0341948 | A1 | 11/2016 | Tetaz et al. |
| 2016/0370562 | A1 | 12/2016 | Zhang et al. |
| 2019/0121114 | A1 | 4/2019 | Tetaz et al. |
| 2020/0004006 | A1 | 1/2020 | Sinclair et al. |
| 2020/0218055 | A1 | 7/2020 | Tran et al. |
| 2021/0041678 | A1 | 2/2021 | Choi |
| 2021/0191102 | A1 | 6/2021 | Choi |
| 2021/0325648 | A1 | 10/2021 | Choi |

FOREIGN PATENT DOCUMENTS

| | | |
|---|---|---|
| CN | 102866487 A | 1/2013 |
| CN | 103207452 A | 7/2013 |
| CN | 103278916 A | 9/2013 |
| CN | 104977621 A | 10/2015 |
| CN | 205581405 U | 9/2016 |
| CN | 107966804 A | 4/2018 |
| CN | 108957715 A | 12/2018 |
| CN | 109343206 A | 2/2019 |
| CN | 109459844 A | 3/2019 |
| CN | 110262024 A | 9/2019 |
| CN | 110989152 A | 4/2020 |
| CN | 111123503 A | 5/2020 |
| DE | 102016100478 B4 | 11/2017 |
| FR | 3073631 A1 | 5/2019 |
| KR | 10-1807414 | 12/2017 |
| RU | 2615162 C1 | 4/2017 |
| WO | WO 02/19030 A1 | 3/2002 |
| WO | WO 2016/160625 A1 | 6/2016 |

OTHER PUBLICATIONS

Simonetti, Francesca, et al. "Reflecting telescopes for an orbiting high-resolution camera for Earth observation." Optical Engineering 45.5 (2006): 053001.

Lampton, M., and M. Sholl. "Comparison of on-axis three-mirror-anastigmat telescopes." UV/Optical/IR Space Telescopes: Innovative Technologies and Concepts III. vol. 6687. International Society for Optics and Photonics, 2007.

Chrisp, Michael P., Brian Primeau, and Michael A. Echter. "Imaging freeform optical systems designed with NURBS surfaces." Optical Engineering 55.7 (2016): 071208.

Cook, Lacy G. "The last three-mirror anastigmat?." Lens Design: A Critical Review. vol. 10263. International Society for Optics and Photonics, 1992.

Jahn, Wilfried, Marc Ferrari, and Emmanuel Hugot. "Innovative focal plane design for large space telescopes." Space Telescopes and Instrumentation 2016: Optical, Infrared, and Millimeter Wave. vol. 9904. International Society for Optics and Photonics, 2016.

Gaudin-Delrieu, Catherine, et al. "The high resolution optical instruments for the Pleiades HR Earth observation satellites." International Conference on Space Optics—ICSO 2008. vol. 10566. International Society for Optics and Photonics, 2017.

Fayret, Jean-Philippe, et al. "Conception d'instrument pour une mission d'observation haute resolution et grand champ." International Conference on Space Optics—ICSO 2000. vol. 10569. International Society for Optics and Photonics, 2017.

Choi, Youngwan. "Study on the feasibility of micro camera systems for asynchronous, gigantic satellite constellation." Earth Observing Systems XXIV. vol. 11127. International Society for Optics and Photonics, 2019.

Korsch, Dietrich. "A three-mirror space telescope." Optical Engineering 14.6 (1975): 146533.

Costes, Vincent, Guillaume Cassar, and Laurent Escarrat. "Optical design of a compact telescope for the next generation earth observation system." International Conference on Space Optics—ICSO 2012. vol. 10564. International Society for Optics and Photonics, 2017.

Selimoglu, Ozgur, Mustafa Ekinci, and Ozgur Karci. "Thermal refocusing method for spaceborne high-resolution optical imagers." Applied optics 55.15 (2016): 4109-4112.

Metwally, Mohamed, Taher M. Bazan, and Fawzy Eltohamy. "Design of Very High-Resolution Satellite Telescopes Part I: Optical System Design." IEEE Transactions on Aerospace and Electronic Systems 56.2 (2019): 1202-1208.

Miravet, C., et al. "Development status of the telescope for the Ingenio/SEOSAT mission primary payload." Optical Design and Engineering IV. vol. 8167. International Society for Optics and Photonics, 2011.

Baker, Adam, et al. "Reading the fine print from orbit: Its not just about the resolution." (2008).

PCT International Search Report for International Application No. PCT/US20/45639 dated Oct. 29, 2020.

Riehl et al., The Raytheon DB-110 Sensor: Four Cameras in One Package, Raytheon Company, Nov. 1999.

International Preliminary Report on Patentability for International Application No. PCT/US2020/045639, dated Aug. 9, 2021.

International Search Report and Written Opinion for International Application No. PCT/US2022/15044 dated May 27, 2022.

Examination Report Under Sections 12 & 13 of the Patent Act, 1970 and the Patents Rules, 2003 for Indian Application No. 202217004163, dated May 30, 2022.

International Search Report for PCT Application No. PCT/US2022/33968 dated Oct. 12, 2022.

* cited by examiner

DIOPTRIC TELESCOPE FOR HIGH RESOLUTION IMAGING IN VISIBLE AND INFRARED BANDS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. For example, this application is a continuation-in-part of U.S. patent application Ser. No. 17/173,141, filed on Feb. 10, 2021, which is a continuation-in-part of U.S. patent application Ser. No. 16/989,635, filed on Aug. 10, 2020, which claims priority to U.S. Provisional Application No. 62/885,296, filed Aug. 11, 2019, the entire contents of each of which is hereby incorporated by reference in its entirety for all purposes and forms a part of the present specification.

BACKGROUND

Field

This disclosure relates generally to optical imaging systems, and more specifically to small form factor four-mirror based optical imaging systems for use in satellites or aerial vehicles.

Description of the Related Art

Optical imaging systems are useful in many applications such as imaging planets or stars. Known optical system designs for satellite imaging include a traditional Three Mirror Anastigmat (TMA) design and a Korsch design. Existing solutions to optical imaging have drawbacks with regard to size and corresponding resolution capability. Improvements in optical imaging are therefore desirable.

SUMMARY

In one aspect, an all-reflective optical system is disclosed. The all-reflective optical system comprises a concave primary mirror having a central aperture and a radius, the primary mirror having one of a parabolic, non-parabolic conical, or aspherical surface; a convex secondary mirror facing the primary mirror, the secondary mirror having an aspherical surface, where an optical axis extends from a vertex of the primary mirror to a vertex of the secondary mirror; a concave tertiary mirror arranged behind the primary mirror, the tertiary mirror having one of a parabolic, non-parabolic conical or aspherical surface; a concave quaternary mirror arranged in the central aperture of the primary mirror or behind the primary mirror, the quaternary mirror having one of a spherical, parabolic, non-parabolic conical or aspherical surface; and at least one image plane having one or more aggregated sensors. The image plane is positioned at a distance from the optical axis that is no more than the radius of the primary mirror.

In some embodiments, the optical system may additionally comprise an entrance pupil positioned near the primary mirror or the secondary mirror, and an exit pupil or Lyot stop positioned at one of 1) near the quaternary mirror, 2) between the tertiary mirror and the quaternary mirror, and 3) between the quaternary mirror and the image plane.

In some embodiments, the optical system may additionally comprise one or more folding mirrors arranged to deflect rays from the quaternary mirror to the image plane, wherein the one or more folding mirrors may be configured to fold a ray path. Based on using a first folding mirror, the exit pupil may be positioned between the tertiary and the quaternary mirror, or between the quaternary mirror and the first folding mirror. One of the folding mirrors may be tilted at a specific angle to an optical axis of the system. One of the folding mirrors positioned at the front of the image plane may widen the field of view with reflective and transmissive sections over a same spectral range, wherein each section may correspond to a specific sensor of the one or more sensors. One of the folding mirrors positioned at the front of the image plane may enable simultaneous multi-color imaging, wherein the one of the folding mirrors may be reflective over a first spectral range and transmissive over other spectral ranges, and may be reflective over a second spectral range and transmissive over other spectral ranges, wherein one of the aggregated sensors may be dedicated to the first spectral range and a different one of the aggregated sensors may be dedicated to the second spectral range.

In some embodiments, a form factor, defined as a ratio of a distance between the secondary mirror and the tertiary mirror to an effective focal length of the optical system, may be less than 0.09. Vertices of the primary mirror and the secondary mirror may form an optical axis, which may be a geometric reference line extending from the vertex of the primary mirror to the vertex of the secondary mirror. The primary mirror and the secondary mirror may be symmetric or periodic about the optical axis. A diagonal of a periodic mirror may have an angle of zero degrees or 45 degrees from a diagonal of the image plane. The optical axis of the tertiary mirror may not coincide with a mechanical axis.

In some embodiments, a radius of the secondary mirror may be in a range of 1% to 3% of an effective focal length, and a radius of the tertiary mirror may be in a range of 2% to 3% of the effective focal length. A radius of the quaternary mirror may be in a range of 6% to 22% of an effective focal length.

In some embodiments, the folding mirrors may enable simultaneous multi-color imaging, wherein each of the folding mirrors may be reflective over a particular spectral range and transmissive over other spectral ranges, and wherein each added folding mirror and a corresponding one of the aggregated sensors may be associated with a different spectral range.

In some embodiments, a distance from the tertiary mirror to the image plane along the optical axis may be in a range of 3% to 9% of an effective focal length and the distance from the secondary mirror to the tertiary mirror along the optical axis may be in a range of 4% to 9% of the effective focal length. The system may have an imaging resolution better than 1 m at a 500 km altitude.

In some embodiments, the system may be adapted to support simultaneous multi-color imaging, including 1) panchromatic and RGB and near-infrared, 2) visible and infrared (near-infrared, shortwave infrared, mid-wave infrared, or longwave infrared), 3) visible and visible, 4) infrared and infrared, 5) UV and visible, or 6) UV and infrared imaging.

In some embodiments, a diameter of the primary mirror may range from 3% to 8% of an effective focal length. A focal point distance from the primary mirrors may be in a range of 1% to 6% of an effective focal length. An effective focal length may be in a range of 300 mm to 20,000 mm. The optical system may further comprise a supporting structure for one or more of the mirrors. The supporting structure may be additively manufactured.

In some embodiments, the image plane may comprise a charge coupled device (CCD)-in CMOS time delay integration (TDI) sensor. The CCD-in-CMOS TDI sensor may be a multispectral TDI, backside illumination imager. The CCD-in-CMOS TDI sensor may comprise seven CCD arrays of 4096×256 pixels each. The CCD-in-CMOS TDI sensor may comprise four panchromatic CCD arrays of 16384×96 pixels each and eight multispectral CCD arrays of 8192×48 pixels.

In some embodiments, the primary mirror may have a circular or a non-circular shape, the tertiary mirror may have a segmented non-circular shape, and the quaternary mirror has a circular or non-circular shape. The non-circular shape of the primary mirror may enhance a modulation transfer function (MTF) and a signal to noise ratio (SNR).

In some embodiments, the quaternary mirror may face the tertiary mirror and may be positioned to avoid interference with rays from the secondary mirror to the tertiary mirror. The optical system may additionally comprise a supporting structure of the mirrors including a cylindrical tube or a conical baffle of the primary mirror. The four mirrors may be constructed of zero-CTE materials, low-CTE materials, or mild-CTE materials, wherein the four mirrors and a supporting structure may be made of one material. The system may be adapted to provide imaging in the modes of starring, scanning or pushbroom, video, stereo, BRDF (Bidirectional Reflectance Distribution Function), HDR (High Dynamic Range), polarimetric and low-light.

In some embodiments, the system may be adapted to be installed onboard satellites purposed for a non-imaging mission including communication satellites, or installed on imaging satellites, quasi-imaging satellites, or scientific mission satellites. The system may be adapted to be installed onboard airplanes, drones, unmanned aerial vehicles, and balloons. A back focal length between the quaternary mirror and the at least one image plane may be in a range of 2% to 5% of an effective focal length.

In another aspect, an all-reflective optical system is disclosed comprising a concave primary mirror having a central aperture and a radius, the primary mirror having one of a parabolic, non-parabolic, conical, or aspherical surface; a convex secondary mirror facing the primary mirror, the secondary mirror having a hyperbolic surface, where an optical axis extends from a vertex of the primary mirror to a vertex of the secondary mirror; a concave tertiary mirror arranged behind the primary mirror, the tertiary mirror having one of a parabolic, non-parabolic, conical and aspherical surface; a concave quaternary mirror arranged in front of the central aperture of the primary mirror, the quaternary mirror having one of a spherical, parabolic, non-parabolic, conical or aspherical surface; and at least one image plane having one or more aggregated sensors, wherein the image plane is positioned at a radial distance from the optical axis that is no more than the radius of the primary mirror.

In another aspect, an all-reflective optical system is disclosed comprising a concave primary mirror having a central aperture and a radius, the primary mirror having one of a parabolic, non-parabolic conical, or aspherical surface; a convex secondary mirror facing the primary mirror, the secondary mirror having an aspherical surface, wherein an optical axis extends from a vertex of the primary mirror to a vertex of the secondary mirror; a concave tertiary mirror arranged behind the primary mirror, the tertiary mirror having one of a parabolic, non-parabolic conical, or aspherical surface; a concave quaternary mirror arranged in the central aperture of the primary mirror or behind the primary mirror, the quaternary mirror having one of a spherical, parabolic, non-parabolic conical, or aspherical surface; at least one image plane having one or more aggregated sensors, wherein the image plane is positioned at a radial distance from the optical axis that is no more than the radius of the primary mirror; a first beam splitter and a second beam splitter configured to separate specific spectral ranges of light rays, wherein the first beam splitter and the second beam splitter have opposing tilt angles with respect to each other, and wherein the first beam splitter and the second beam splitter each receive light rays reflected by the secondary mirror; a first folding mirror receiving light rays from the first beam splitter and a second folding mirror receiving light rays from the second beam splitter; a second tertiary mirror receiving light rays from the first folding mirror and a third tertiary mirror receiving light rays from the second folding mirror; a second quaternary mirror receiving light rays from the second tertiary mirror and a third quaternary mirror receiving light rays from the third tertiary mirror; and a second image plane receiving focused light rays from the second quaternary mirror and a third image plane receiving focused light rays from the third quaternary mirror, the second and third image planes each having one or more aggregated sensors that convert light into electrical signals.

In some embodiments, the second image plane and the third image planes may each be positioned close to the primary mirror at a radial distance from the optical axis that is greater than the radius of the primary mirror. The first beam splitter and the second beam splitter may be each positioned between the primary mirror and the secondary mirror. The first beam splitter and the second beam splitter may each have a tilt angle ranging from 65 to 115 degrees with respect to the optical axis.

In some embodiments, the optical system may additionally comprise an exit pupil or Lyot stop positioned at one of: 1) near the second and third quaternary mirrors, 2) between the second and third tertiary mirrors and the second and third quaternary mirrors, and 3) between the second and third quaternary mirrors and the second and third image planes, and wherein intermediate focuses may be formed near the first folding mirror and the second folding mirror.

In another aspect, a reflective and cata-dioptric optical system is disclosed comprising a concave primary mirror having a central aperture and a radius, the primary mirror having one of a parabolic, non-parabolic conical, or aspherical surface; a convex secondary mirror facing the primary mirror, the secondary mirror having an aspherical surface, wherein an optical axis extends from a vertex of the primary mirror to a vertex of the secondary mirror; a concave tertiary mirror arranged behind the primary mirror, the tertiary mirror having one of a parabolic, non-parabolic conical, or aspherical surface; a concave quaternary mirror arranged in the central aperture of the primary mirror or behind the primary mirror, the quaternary mirror having one of a spherical, parabolic, non-parabolic conical, or aspherical surface; a main folding mirror or beam splitter configured to receive light rays from the quaternary mirror; a first main image plane receiving a first portion of light rays from the main folding mirror or beam splitter and a second main image plane receiving a second portion of light rays from the main folding mirror or beam splitter, each of the first main image plane and the second main image plane having one or more aggregated sensors, wherein each of the first main image plane and the second main image plane is positioned at a radial distance from the optical axis that is no more than the radius of the primary mirror.

In some embodiments, the reflective and cata-dioptric optical system may further comprise a first beam splitter and a second beam splitter configured to separate specific spectral ranges of light rays, wherein the first beam splitter and the second beam splitter may have opposing tilt angles with respect to each other, and wherein the first beam splitter and the second beam splitter may each receive light rays reflected by the secondary mirror; a first folding mirror receiving light rays from the first beam splitter and a second folding mirror receiving light rays from the second beam splitter; a first group of lenses receiving light rays from the first folding mirror and a second group of lenses receiving light rays from the second folding mirror; and a third image plane receiving light rays from the first group of lenses and a fourth image plane receiving light rays from the second group of lenses, the third and fourth image planes may each have one or more aggregated sensors that convert light into electrical signals.

In some embodiments, the third image plane and the fourth image plane may each comprise a commercially available sensor, and wherein a focal length of the first group of lenses and the second group of lenses may each be adjusted independently to match an optical resolution of each of the first group of lenses and the second group of lenses to a pixel size of each of the commercially available sensor.

In some embodiments, the first group of lenses and the second group of lenses may each comprise lenses having spherical or aspherical surfaces. The first beam splitter and the second beam splitter may each be positioned between the primary mirror and the secondary mirror. The first beam splitter and the second beam splitter may each have a tilt angle ranging from 65 to 115 degrees with respect to the optical axis.

In some embodiments, the reflective and cata-dioptric optical system may additionally comprise an exit pupil or Lyot stop positioned in the first group of lenses and the second group of lenses and before the third and fourth image planes, and wherein an intermediate focus may be formed near the first folding mirror and the second folding mirror.

In some embodiments, the lenses of the first group of lenses and the second group of lenses may be radiation hardened or resistant. The folding mirrors may perform scanning to cover a field of view of the optical system with a smaller number of sensors than when the folding mirrors do not perform the scanning.

In some embodiments, the reflective and cata-dioptric optical system may further comprise an inertial measurement unit connected to the first and second folding mirrors to compensate for unwanted motion of the system by stabilizing the line of sight of the system or the instantaneous field of view of image sensors positioned at the third and fourth image planes.

In some embodiments, the reflective and cata-dioptric optical system may further comprising a first beam splitter, a second beam splitter and a third beam splitter configured to separate light rays of a specific spectral range, and wherein the first, second and third beam splitters may each receive light rays reflected by the secondary mirror; a first folding mirror receiving light rays from the first beam splitter, a second folding mirror receiving light rays from the second beam splitter, and a third folding mirror receiving light rays from the third beam splitter; a first group of lenses receiving light rays from the first folding mirror, a second group of lenses receiving light rays from the second folding mirror, and a third group of lenses receiving light rays from the third folding mirror; and a third image plane receiving light rays from the first group of lenses, a fourth image plane receiving light rays from the second group of lenses, and a fifth image plane receiving light rays from the third group of lenses, the third, fourth and fifth image planes may each have one or more aggregated sensors that convert light into electrical signals.

In some embodiments, the reflective and cata-dioptric optical system may further comprise a first beam splitter configured to separate light rays of a specific spectral range, wherein the first beam splitter may receive light rays reflected by the secondary mirror; a first folding mirror receiving light rays from the first beam splitter; a first group of lenses receiving light rays from the first folding mirror, wherein the first group of lenses may include a second beam splitter or a reflective polarizer; and a third image plane receiving light rays from a first path in the first group of lenses and a fourth image plane receiving light rays from a second path in the first group of lenses, the first and second paths being based on the second beam splitter or the reflective polarizer, the third and fourth image planes may each have one or more aggregated sensors that convert light into electrical signals.

In some embodiments, the reflective and cata-dioptric optical system may further comprise a first beam splitter configured to separate light rays of a specific spectral range, wherein the first beam splitter may receive light rays reflected by the secondary mirror; a first folding mirror receiving light rays from the first beam splitter; a first group of lenses receiving light rays from the first folding mirror, wherein the first group of lenses may include filter wheels or sliders comprising narrow-band spectral filters within a spectral range defined by the first beam splitter; and a third image plane receiving light rays from the first group of lenses, the third image plane may have one or more aggregated sensors that convert light into electrical signals.

In some embodiments, the reflective and cata-dioptric optical system may further comprise a first beam splitter configured to separate light rays of a specific spectral range, wherein the first beam splitter may receive light rays reflected by the secondary mirror; a first folding mirror receiving light rays from the first beam splitter or first filter wheels or sliders arranged between the first beam splitter and the folding mirror; a first group of lenses receiving light rays from the first folding mirror, wherein the first group of lenses may include second filter wheels or sliders when the first filter wheels or sliders may not be utilized, the first filter wheels or sliders and the second filter wheels or sliders may comprise polarizers at zero, 45, 90 and 135 degrees for polarimetric imaging; and a third image plane receiving light rays from the first group of lenses, the third image plane may have one or more aggregated sensors that convert light into electrical signals.

In some embodiments, the reflective and cata-dioptric optical system may further comprise eight beam splitters configured to separate light rays of a specific spectral range, and wherein each of the eight beam splitters may respectively receive light rays reflected by the secondary mirror; eight folding mirrors receiving light rays from respective beam splitters; eight groups of lenses receiving light rays from respective folding mirrors; and eight further image planes receiving light rays from respective groups of lenses, the eight further image planes may each have one or more aggregated sensors that convert light into electrical signals, wherein the eight further image planes may each be positioned close to the primary mirror at a radial distance from the optical axis that is greater than the radius of the primary mirror.

In another aspect, a cata-dioptric optical system is described. The system comprises a concave primary mirror, a convex secondary mirror, at least one beam splitter, a first folding mirror, a first group of lenses, a second group of lenses, and at least two image planes. The concave primary mirror has a central aperture and a radius, with the primary mirror having one of a parabolic, non-parabolic conical, or aspherical surface. The convex secondary mirror faces and receives light rays from the primary mirror, with the secondary mirror having an aspherical surface, where an optical axis extends from a vertex of the primary mirror to a vertex of the secondary mirror. The at least one beam splitter is configured to separate specific spectral ranges of light rays, where a first beam splitter receives light rays reflected by the secondary mirror. The first folding mirror receives light rays from the first beam splitter. The first group of lenses is for a visible imaging chain receiving rays from the first beam splitter, where the first group of lenses is positioned in parallel to the optical axis. The second group of lenses is for an infrared imaging chain receiving rays from the first folding mirror, where the second group of lenses is positioned in parallel to the optical axis. The at least two image planes have one or more aggregated sensors, where a first image plane receives rays from the first group of lenses and a second image plane receives rays from the second group of lenses, and at least one image plane is positioned behind the primary mirror and at a radial distance from the optical axis that is no more than the radius of the primary mirror.

Various embodiments of the various aspects may be implemented. In some embodiments, the first beam splitter may be a plate beam splitter. An entrance pupil of the optical system may be positioned near the primary mirror or the secondary mirror. An intermediate focus may be formed around a vertex of the primary mirror, may be positioned between the primary mirror and the secondary mirror, or may be positioned between the primary mirror and the first group of lenses.

The first image plane and the second image plane may each comprise a commercially available sensor, where the first group of lenses and the second group of lenses may have spherical or aspherical surfaces and act as focal length optimizers to each independently adjust the focal length to match an optical resolution of each of the first group of lenses and the second group of lenses to a pixel size of each of the commercially available sensor. The first beam splitter may transmit rays of a specific spectral range and reflect rays of a different spectral range, may be positioned between the primary mirror and the secondary mirror and may have a tilt angle ranging from 65 to 115 degrees with respect to the optical axis. The rays reflected by the secondary mirror may impinge on the first beam splitter that redirects one part of the rays to the first folding mirror and transmits the other part of the rays to the first group of lenses.

In some embodiments, the second group of lenses with the second image plane may be positioned at a specific distance from and around the optical axis in a circumferential direction, and the first group of lenses with the first image plane may be positioned behind the primary mirror. The first group of lenses and the second group of lenses may be interchangeable with each other in their position. For the rays redirected by the first beam splitter, an intermediate focus may be formed near the first folding mirror, and an exit pupil or Lyot stop may be positioned immediately after the second lens group and before the second image plane. For the rays transmitted through the first beam splitter, the system may comprise a second folding mirror and a third group of lenses positioned after the first group of lenses and before the first image plane. For the rays transmitted through the first beam splitter, an intermediate focus may be formed near the central aperture of the primary mirror, and an exit pupil or Lyot stop may be positioned in the middle of the first group of lenses or between the first and the third group of lenses. For the rays transmitted through the first beam splitter, a Fabry Perot interferometer may be positioned for hyperspectral imaging at the exit pupil or Lyot stop. For the rays transmitted through the first beam splitter, a filter wheel or slider that includes a series of meta-lens may be arranged, at the exit pupil or Lyot stop, to correct residual optical aberrations, to minimize estimated optical aberrations due to mechanical and thermal distortion during system operation, and/or to remove focus-shift due to the thermal expansion or shrinkage of system structure. The system may further comprise an inertial measurement unit connected to the first and second folding mirrors to compensate for unwanted motion of the system by stabilizing a line of sight of the system or an instantaneous field of view of image sensors positioned at the first and second image planes. The system may further comprise an inertial measurement unit connected to the first and second folding mirrors to compensate for unwanted motion of the system, and the first and second folding mirrors may be configured to move a line of sight of the system or an instantaneous field of view of image sensors positioned at the first and second image planes so that projections of the sensors are shifted by 1/n pixels. The rays reflected by the secondary mirror may impinge on the first beam splitter that redirects one part of the rays to the first folding mirror and transmits another part of the rays to the first group of lenses, where, for the rays transmitted through the first beam splitter, the system comprises a second beam splitter positioned after the first group of lenses, wherein the second beam splitter redirects a portion of the rays through a third group of lenses and to the first image plane, and wherein the second beam splitter transmits through another portion of the rays to the second folding mirror and through a fourth group of lenses and to a third image plane. The rays reflected by the secondary mirror may impinge on the first beam splitter that redirects one part of the rays to the first folding mirror and transmits another part of the rays to the first group of lenses, where, for the rays redirected by the first beam splitter to the first folding mirror and then to the second group of lenses, the system may further comprise a third beam splitter positioned in the second group of lenses, where the third beam splitter redirects a portion of the rays through a part of the second group of lenses and to a fourth image plane, and where the third beam splitter transmits through another portion of the rays to another part of the second group of lenses and to the second image plane. The rays reflected by the secondary mirror may impinge on the first beam splitter that redirects one part of the rays from the secondary mirror to the first folding mirror and transmits another part of the rays from the secondary mirror to a fourth beam splitter, where, for rays transmitted through the fourth beam splitter and then the first group of lenses, the system may further comprise a second beam splitter positioned after the first group of lenses, where the second beam splitter redirects a portion of the rays through a third group of lenses and to the first image plane, and where the second beam splitter transmits through another portion of the rays to the second folding mirror and through a fourth group of lenses to a third image plane, and where, for rays redirected by the fourth beam splitter, the system may further comprise a third folding mirror that receives the rays redirected by the fourth beam splitter and reflects these rays to a fifth group of lenses, and a fifth beam splitter positioned in the fifth group of lenses, where the fifth beam splitter redirects a portion of the rays through a part of the fifth group of lenses and to a fifth image plane, and where the fifth beam splitter transmits through another portion of the rays to another part of the fifth group of lenses and to a sixth image plane. The rays reflected by the secondary mirror may impinge on the first beam splitter that redirects one part of the rays from the secondary mirror to the first folding mirror and transmits another part of the rays from the secondary mirror to the fourth beam splitter, where, for the rays redirected by the first beam splitter to the first folding mirror and then to the second group of lenses, the system may further comprise a third beam splitter positioned in the second group of lenses, where the third beam splitter redirects a portion of the rays through a part of the second group of lenses and to a fourth image plane, and where the third beam splitter transmits through another portion of the rays to another part of the second group of lenses and to the second image plane. The first beam splitter may transmit rays of a first spectral range and reflect rays of a second spectral range, where the fourth beam splitter transmits rays of a portion of the first spectral range and reflects rays of another portion of the first spectral range, and where the first beam splitter and the fourth beam splitter are each positioned between the primary mirror and the secondary mirror and each has a tilt angle ranging from 65 to 115 degrees with respect to the optical axis.

BRIEF DESCRIPTION OF THE DRAWINGS

Elements in the figures have not necessarily been drawn to scale in order to enhance their clarity and improve understanding of these various elements and embodiments described herein. Furthermore, elements that are known to be common and well understood to those in the industry are not depicted in order to provide a clear view of the various embodiments described herein, thus the drawings are generalized in form in the interest of clarity and conciseness.

FIGS. 23-28A are schematics showing various embodiments of configuration layouts for mirrors and lenses, including one or more beam splitters, one or more folding mirrors, and two or more imaging planes, that may be used with the various optical systems described herein.

DETAILED DESCRIPTION OF CERTAIN EMBODIMENTS

In the following discussion that addresses a number of embodiments and applications, reference is made to the accompanying drawings that form a part hereof, and in which is shown by way of illustration specific embodiments in which the embodiments described herein may be practiced. It is to be understood that other embodiments may be utilized, and changes may be made without departing from the scope of the disclosure.

Various inventive features are described below that can each be used independently of one another or in combination with another feature or features. However, any single inventive feature may not address all of the problems discussed above or only address one of the problems discussed above. Further, one or more of the problems discussed above may not be fully addressed by the features of each embodiment described below.

Figure 1A:
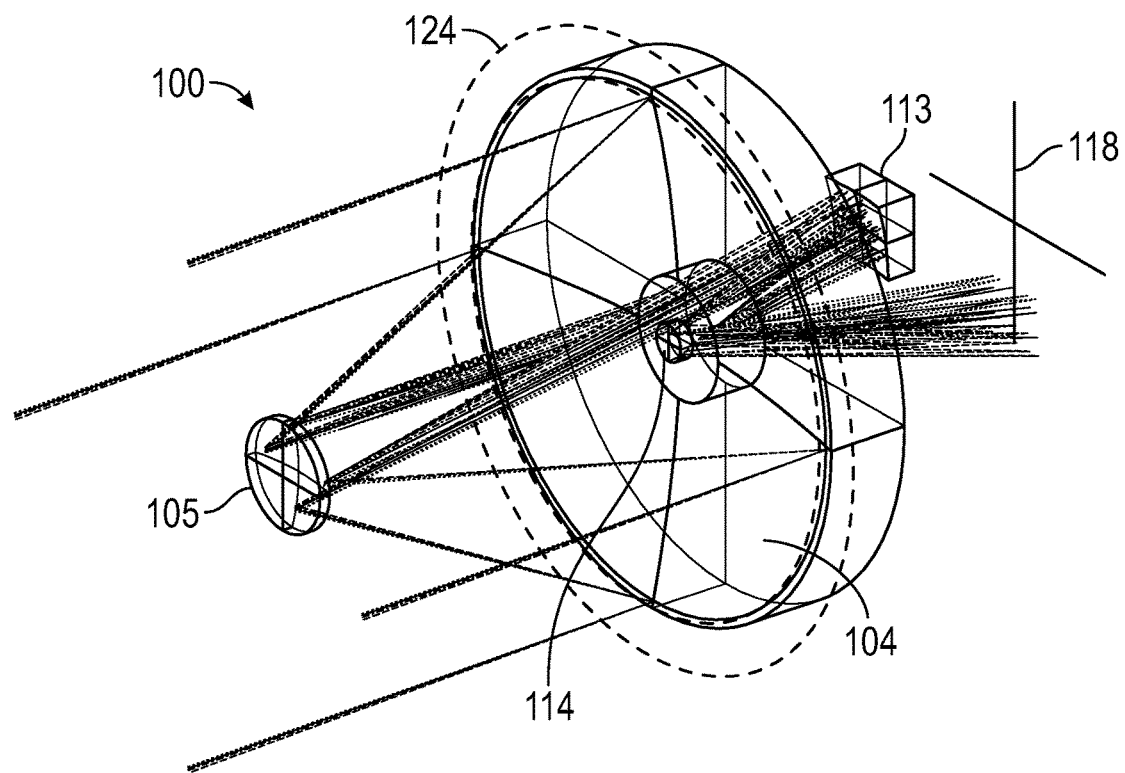
FIGS. 1A and 1B are schematics of an embodiment of an optical system that may be used for imaging.

Described herein are embodiments of small volume, high resolution optical imaging systems and methods that can be used in satellites and other aerial systems. An optical system 100 is shown in FIGS. 1A and is one embodiment that may be used for providing high resolution imaging performance in a "micro" or small form factor (volumetric envelope). The optical systems may "piggyback" on other missions with existing high bandwidth capabilities.

A constellation of satellites in orbit may operate in collaboration with each other for coordinated ground coverage. The orbits of the satellites in the constellation may be synchronized. For example, the orbits may be geostationary, where the satellites may have orbital periods equal to the average rotational period of Earth and in the same direction of rotation as Earth. Or the orbits may be sun-synchronous, such as a nearly polar orbit around Earth, in which the satellite passes over any given point of the Earth's surface at the same local mean solar time or the orbit precesses through one complete revolution each year so it always maintains the same relationship with the Sun. Synchronous systems introduce complexity by requiring dedicated platforms and sensors, launchers, and operation stations. For remote sensing, typical examples of such synchronized constellations include the programs of PLANETSCOPE (a.k.a. DOVE), SKYSAT, BLACKSKY, and CARBONITE.

The systems described herein may be used in systems in synchronous as well as asynchronous orbits. Thus, in some embodiments, the imaging systems may be used with an Asynchronous Constellation of Earth observation Camera system (ACEC). This is especially true for constellations of many small satellites, such as CUBESATs, and also with Low-Earth Orbit (LEO) broadband data relay satellite constellations, such as Space NGSO Satellite System, One Web, and Amazon's KUIPER System. Any of the optical systems or features thereof described herein may include any of the features of the micro optical and camera systems and other aspects described in "Study on the feasibility of micro camera systems for asynchronous, gigantic satellite constellation", by Youngwan Choi, Proc. SPIE 11127, Earth Observing Systems XXIV, 111270Z (9 Sep. 2019, available at https://doi.org/10.1117/12.2529090), the entire contents of which are incorporated by reference herein in their entirety.

An asynchronous constellation may include camera systems onboard any available platforms, which have planned missions but can host additional payloads. It may be different from the nominal constellation in the sense that it will not be operated synchronously and not provide coordinated ground coverage with the sole purpose of only providing a stream of images. The most significant benefit of the asynchronous constellation is to avoid or minimize cost, time, and effort to develop a platform, require a specific launch system, and operate a dedicated ground control system, which can be a large fixed cost. An advantage of leveraging LEO broadband data relay satellites for asynchronous constellation imaging is its broad data bandwidth. CUBESATs or other platforms with dedicated imaging or other missions may suffer from decreased data bandwidth. Free from the data bandwidth issue, asynchronous constellation with the LEO data relay satellites can stream image data in dedicated channels as the satellites stream movies or other content so that users can selectively receive, record, and process image data.

To do this, much smaller or micro camera systems that have dimensional advantages and can accommodate themselves to any available space are needed. Recent developments of smaller cameras focuses on dimensional advantages only so that such development relies on optical designs that are easier to design, simpler to develop, or cheaper to build. However, such an approach may seem reasonable but may put a limit or constraint on leveraging such cameras for serious missions due to decreased performance, such as optical resolution.

The optical system 100 and the other embodiments of imaging systems described herein may be used for constellation operations and be micro in physical dimension as well as be advanced in performance. Systems and methods for a 4-mirror telescope in a small form factor are described.

The embodiments described herein may be onboard satellite platforms that are already planned, as a secondary payload or an additional system. In some embodiments, the imaging system may have a size on the scale of a star sensor or tracker. The imaging system may be lightweight. The imaging system may minimize power consumption. The imaging system and its interface to a platform may be simple so that it can be installed and operated easily. The imaging system may be capable of proper imaging, which may be described by its specification. The imaging system may have proper MTF values. The imaging system may be designed to operate over a wide spectral range and equipped with a number of channels over the spectral range, with panchromatic, red, green, blue, and near infrared as a baseline set. The imaging system may be capable of a large field of view.

For such a camera system, an important requirement is distortion property. A camera system with a small f-number, a small aperture with a longer effective focal length for higher resolution, may need a time-delay-integration (TDI) sensor to achieve a proper signal-to-noise ratio (SNR) for further processing on the ground. Distortions induced by optical design can cause smear in the camera system. To avoid a significant degradation of image quality for TDI imaging, distortions induced by the system should be minimized over an entire field-of-view (FOV).

The optical imaging systems described herein are based on a reflective or mirror system, which may be unusual for a small form, affordable system. Usual cameras for CAN- or NANO-SAT are based on a cata-dioptric design for its design simplicity and cost reduction. The examples are PLANETSCOPE (a.k.a. DOVE), SKYSAT, BLACKSKY, and CARBONITE.

The design of the SKYSAT camera is based on a Ritchey-Cassegrain telescope, which has two mirrors (primary and secondary) and a small number of lenses. It is known for easy manufacturing, cost reduction, and simple alignment/assembly logic. Also, it utilized COTS frame CMOS sensors. The CARBONITE camera is an example of commercially available, off-the-shelf astronomical telescope, which is modified to be accommodated to space environment, and equipped with a commercial CMOS sensor for color video imaging. Utilizing a commercial telescope seemed to be a smart move in a sense that development or manufacturing effort can be reduced, cost can be cut seriously, and operation management can be efficient. Whole processes were developed suitable for implementing constellation of Earth observation satellites.

Different from those approaches, the optical system embodiments described herein for cameras are based on a reflective design that is a four-mirror system. The optical system described herein may have no limit of spectral range to be covered. The system may have no chromatic aberration, which can be critical for multispectral imaging. The system may have high design flexibility due to degree of freedom of multi-mirror system. The system may have mass reduction deduced by mirror light-weighting. The system may have a small form factor.

Figure 1B:
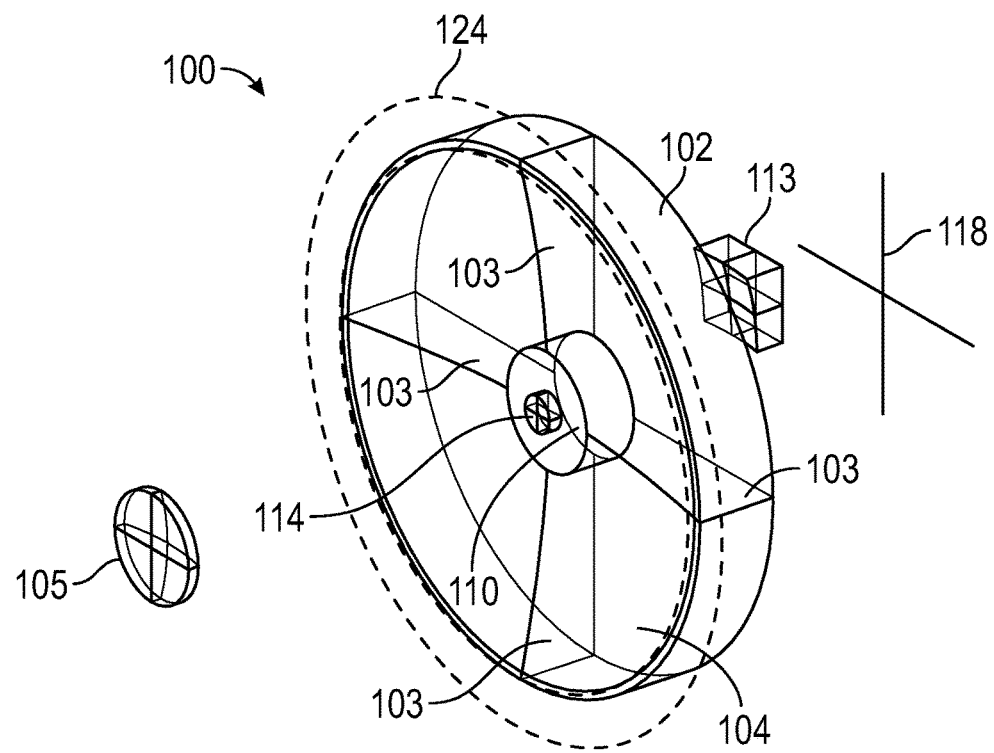
Figure 1C:
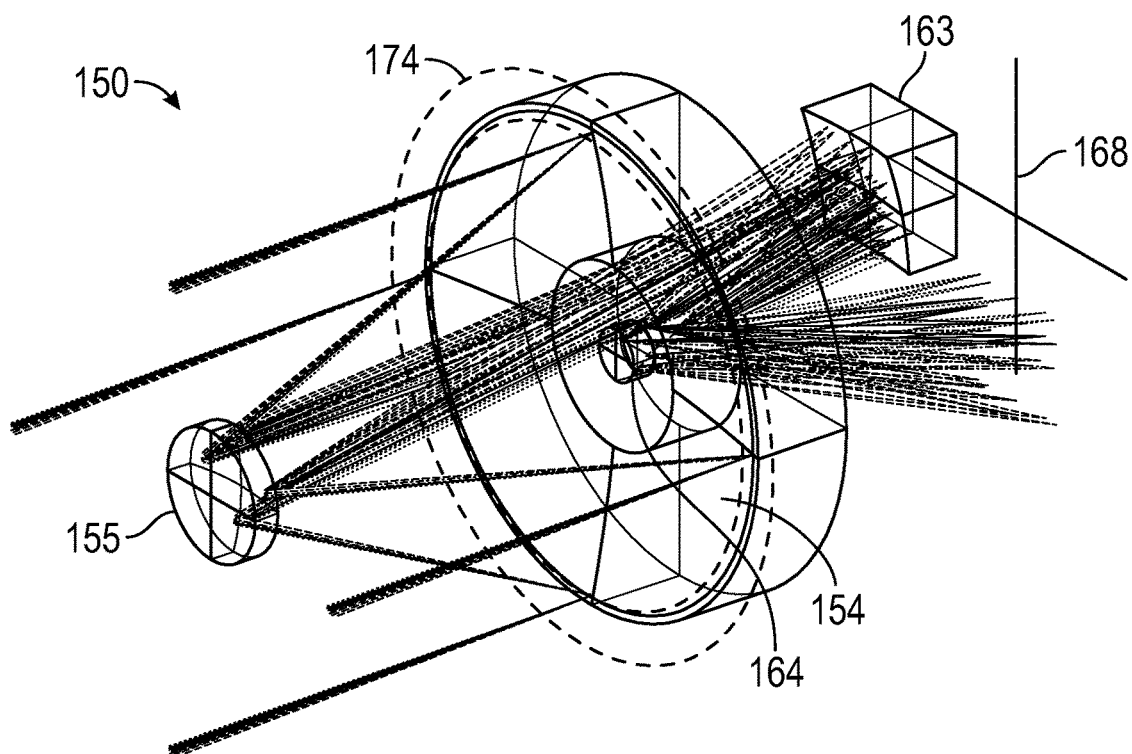
FIGS. 1C and 1D are schematics of another embodiment of an optical system that may be used for imaging.
Figure 1D:
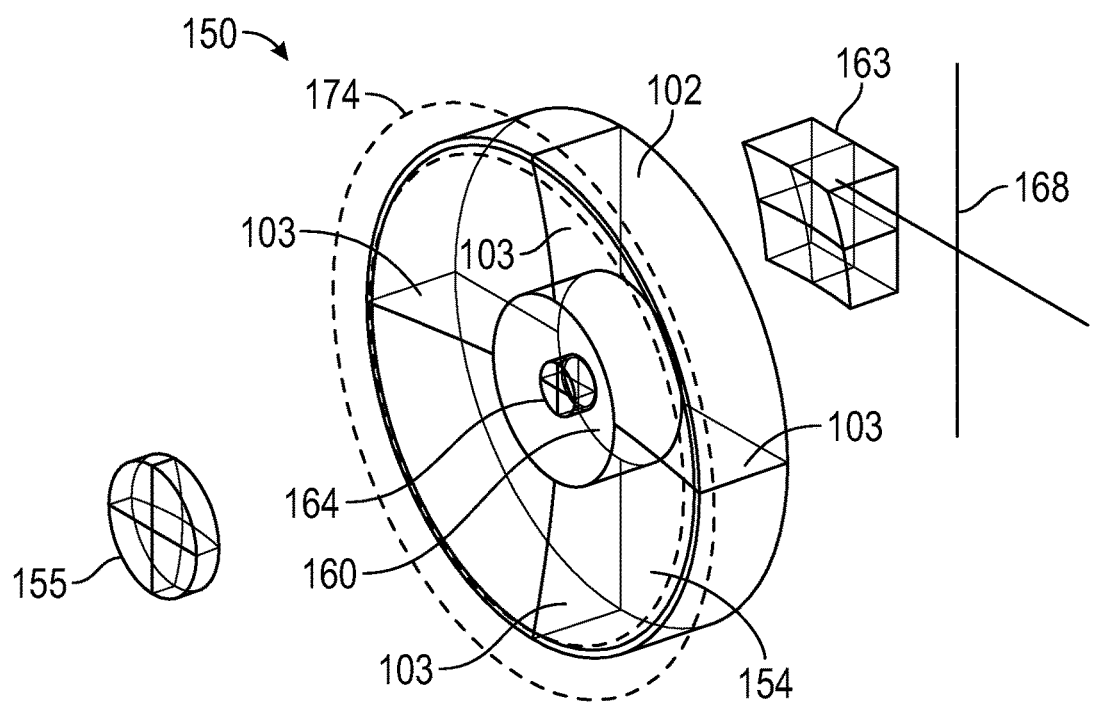

FIG. 1A is a perspective schematic view of an optical layout of a first optical system 100 showing optical path lines. FIG. 1B is a perspective schematic view of the optical system 100 without the optical path lines shown for clarity. The optical lines may be indicative of multiple spectral bands. Referring to FIG. 1C, a perspective view of an optical layout of a second optical system 150 showing optical lines is illustrated. FIG. 1D shows the optical system 150 without the optical lines for clarity.

The first two mirrors of the optical systems 100, 150, a primary mirror 104 and a secondary mirror 105 in FIGS. 1A and 1B, and a primary mirror 154 and a secondary mirror 155 in FIGS. 1C and 1D, are responsible for power of the systems so that it can determine its effective focal length or resolution. "Effective focal length" as used herein has its usual and customary meaning, and includes without limitation the distance from a principal plane of an optical mirror to an imaging plane 118, 168. Entrance pupil 124 of the optical system 100 (shown in FIGS. 1A and 1B), and entrance pupil 174 of the optical system 150 (shown in FIGS. 1C and 1D), control the amount of light through the respective systems, and may be located at the respective primary mirrors. The entrance pupil may be the optical image of the physical aperture stop, as seen through the front (the object side) of the optical system. The corresponding image of the aperture as seen through the back of the optical system is called the exit pupil.

The primary mirrors 104, 154 may be supported by a structural support 102 having radially extending beam 103 to support the mirror structure. The structure 102 and beams 103 may minimize the distortion on the primary mirror surface that may be induced by bonding and thermal environmental change. Also, it may protect the primary mirror from random vibration and shock that the camera may experience during launch.

In some embodiments, the various mirrors and supporting structures for any of the optical systems described herein may be formed of aluminum, ceramics, designed composite materials, other suitable materials, or combinations thereof. In some embodiments, the one or more structures and/or the one or more mirrors can be manufactured by 3D printing technology also known as additive manufacturing technology. For example, the mirrors and the supporting structure may all be additively manufactured as one monolithic piece.

A tertiary mirror 113 in FIGS. 1A and 1, and a tertiary mirror 163 in FIGS. 1C and 1D, contribute to widening a field of view (FOV) and corrects corresponding residual optical aberrations. The tertiary mirrors 113, 163 may not include an optical axis, for example for simpler manufacturability, and two or more tertiary mirrors may be manufactured from one base piece. A quaternary mirror 114 in FIGS. 1A and 1B, and a quaternary mirror 164 in FIGS. 1C and 1D, may minimize distortion and control a back focal length. "Back focal length" as used herein has it usual and customary meaning, and incudes without limitation the distance between the last surface of an optical mirror to its image plane. The fields of view of the optical systems 100, 150 are designed so that the rays do not interfere with the respective quaternary mirror and the central aperture of the respective primary mirror. The quaternary mirrors 114, 164 reflect the respective light along the optical path to the imaging plane 118, 168.

FIG. 1D shows the second optical system 150 but without showing the optical path lines for clarity. The diameter of the aperture or central hole 110 in FIG. 1B and 160 in FIG. 1D is minimized to maximize the use area of the primary mirror and in some embodiments is not larger than the corresponding secondary mirror 105, 155. The diameter of the central hole 110 in FIG. 1B and hole 160 in FIG. 1D may be designed large enough to not interfere with the light rays travelling through the central holes 110 and 160.

Figure 1E:
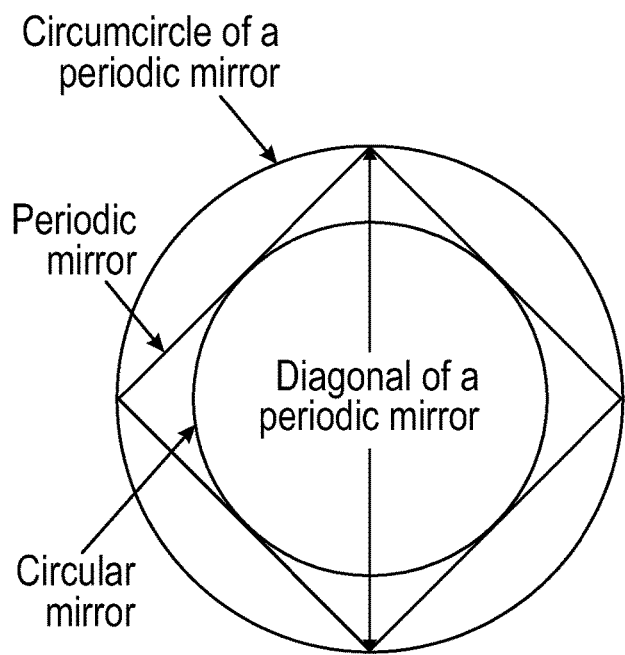
FIGS. 1E and 1F are schematics showing diagonals for respectively a periodic mirror and an image plane.
Figure 1F:
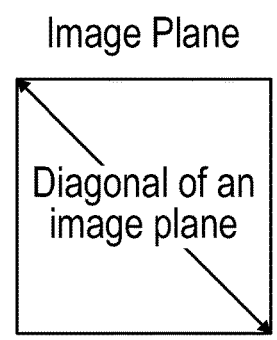

The primary mirrors 104, 154 and/or the secondary mirrors 105, 155 may be symmetric or periodic about the respective optical axis. FIGS. 1E and 1F are schematics showing diagonals for respectively a periodic mirror and an image plane. The diagonal of a periodic mirror may have an angle of zero degrees or 45 degrees from a diagonal of the image plane. The optical axis of the tertiary mirror may not coincide with a mechanical axis.

Figure 1G:
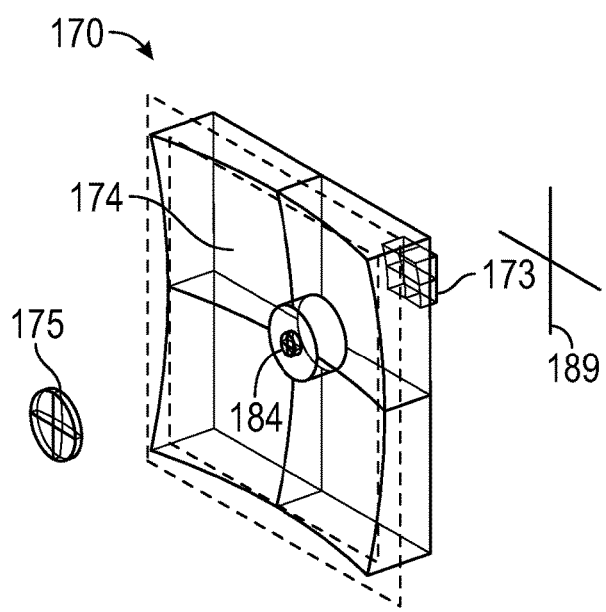
FIGS. 1G and 1H show example embodiments of optical systems having a periodic primary mirror.
Figure 1H:
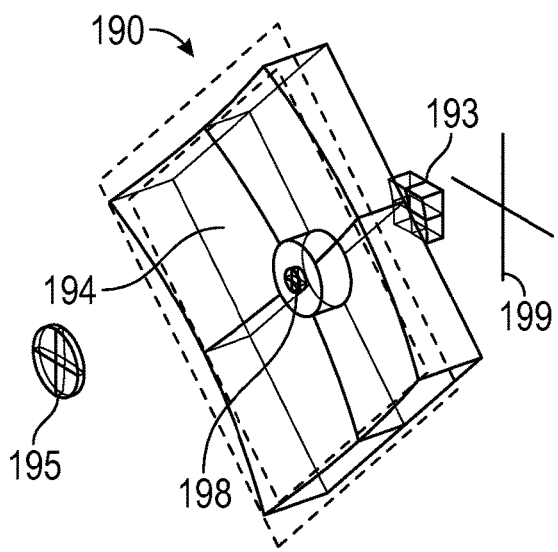

FIGS. 1G and 1H show example embodiments of optical systems 170, 190 respectively having a periodic primary mirror 174, 194. The optical systems 170, 190 further include, respectively, a secondary mirror 175, 195, a tertiary mirror 173, 193, a quaternary mirror 184, 198 and an imaging plane 189, 199. The optical systems 170, 190 may have the same or similar features and/or functions as the optical systems 100 or 150.

The optical systems 100, 150 may include any of the same or similar features and/or functions as the other embodiments of optical systems described herein, and vice versa. For example, the optical systems 100, 150 may include any of the same or similar features and/or functions as optical systems 210, 300, 400, 500, 600, 700, 800, 900, 1000, 1100, 1200, 1300, 1430, 1460, and vice versa. For example, for any of the optical systems described herein, the primary mirror may be concave and have a central aperture.

The primary mirror may have a parabolic surface, a non-parabolic conical surface, or an aspherical surface. A "parabolic surface" as used herein has its usual and customary meaning, and includes, without limitation, a reflective surface used to collect the light energy and may have a shape that is part of a circular paraboloid, that is, the surface generated by a parabola revolving around its axis. A "non-parabolic conical surface" as used herein has its usual and customary meaning, and includes, without limitation, a curve rotated about its axis where the curve is obtained as the intersection of the surface of a cone with a plane other than a parabola. For example, the "non-parabolic conical surface" may be hyperbolic, elliptical, or circular. An "aspherical surface" as used herein has its usual and customary meaning, and includes, without limitation, a surface that is not spherical. In some embodiments, a spherical surface may be slightly altered so as to reduce spherical aberration.

Figure 3:
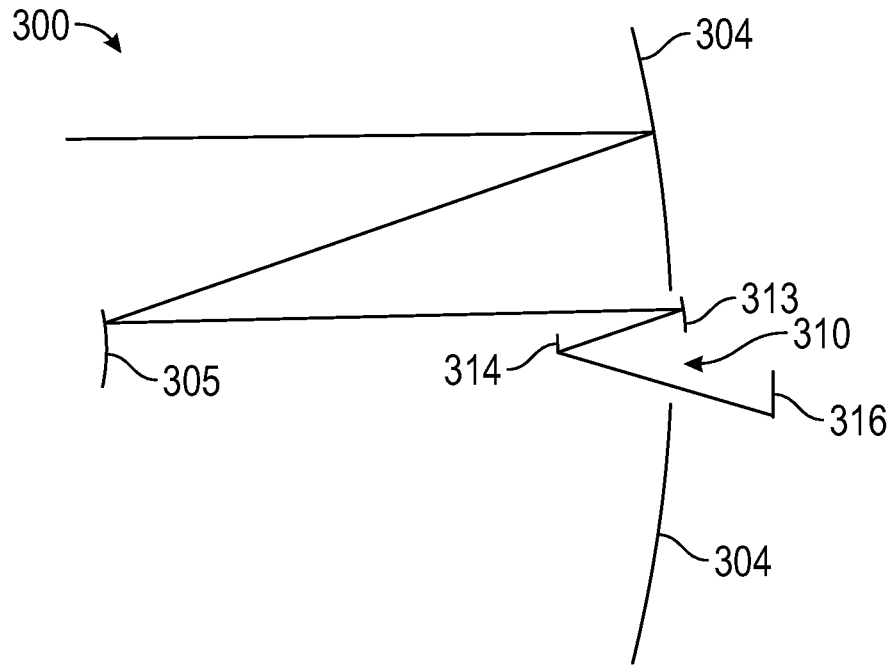
FIGS. 3-5 are schematics showing various embodiments of configuration layouts for mirrors and an imaging plane that may be used with the various optical systems described herein.

The secondary mirror may be convex and face the primary mirror. The secondary mirror may have an aspherical surface. The tertiary mirror may be concave and arranged behind the primary mirror. "Behind" may refer to a side of the primary mirror that is opposite the side of the primary mirror that reflects incoming light to the secondary mirror. The tertiary mirror may have a parabolic surface, a non-parabolic conical surface, or an aspherical surface. The quaternary mirror may be concave and arranged in the central aperture of the primary mirror, before the primary mirror or behind the primary mirror, for example as shown in FIG. 3. The quaternary mirror may have one of a spherical surface, a parabolic surface, a non-parabolic conical surface, or an aspherical surface.

There may be at least one image plane having one or more aggregated sensors, where the image plane is positioned at a specific distance from an optical axis. The optical axis may be defined as a geometric reference line extending between the vertices of the primary and secondary mirrors. The vertex for a given mirror may be a point on the mirror's surface where the principal axis meets the mirror.

The optical system 100 may have a larger primary mirror 104 and thus higher resolution relative to the primary mirror 154 of the optical system 150. The resolution of the optical system 100 may be better than 1 m at 500 km altitude. The optical system 150 may have a resolution of better than 2 m at 500 km altitude. The optical system 150 may have a larger field of view (FOV) than the optical system 100. The optical system 100 may have a narrower field of view (FOV) relative to the optical system 150. The optical system 100 may have volumetric dimensions of 200 mm (Width)×200 mm (Height)×250 mm (Length). The optical system 150 may have volumetric dimensions of 100 mm (W)×100 mm (H)×150 mm (L). The optical system 150 may be lighter in weight than the optical system 100. The optical systems 100, 150 may both have a proper MTF for higher resolution imaging.

Both the optical systems 100, 150 may have similar mirror types and optical paths. But their respective purposes and missions may be different. The purpose of the optical system 100 may be to map the surface of the Earth and acquire geospatial data. The purpose of the optical system 150 may be for remote sensing and environmental monitoring.

In some embodiments, the optical systems 100, 150 may achieve various parameters for orbital systems and/or imaging systems. Example parameters achievable with the optical systems 100, 150 are described in Table 1. For example, the design orbit may be set to 500 km, the spectral bands may be designed to be compatible with big satellites and scientific satellite imaging except the panchromatic band, etc. The panchromatic band (PAN band) may be designed to include up to red-edge, improving Modulation Transfer Function (MTF) in the band, which may be unavoidable due to its small aperture size.

TABLE 1

| Design Parameters | Optical System 100 | Optical System 150 |
|---|---|---|
| Orbit Altitude (km) | 500 | 500 |
| Ground Sample Distance (GSD, m) | ≤1 | ≤2 |
| Spectral Range (nm) | | |
| PAN band | 450~720 | 450~720 |
| NIR band | 770~890 | 770~890 |
| Red band | 630~690 | 630~690 |
| Green band | 520~590 | 520~590 |
| Blue band | 450~520 | 450~520 |
| Pixel size (μm) | 5 | 5 |
| Number of active pixels | ≤12000 | ≤8000 |
| Size of Clear Aperture (mm × mm) | ≤200 × 200 | ≤100 × 100 |
| Time-Delay-Integration (TDI) steps of Backside-Illumination (BSI) sensor | 128 | 128 |

Figure 2A:
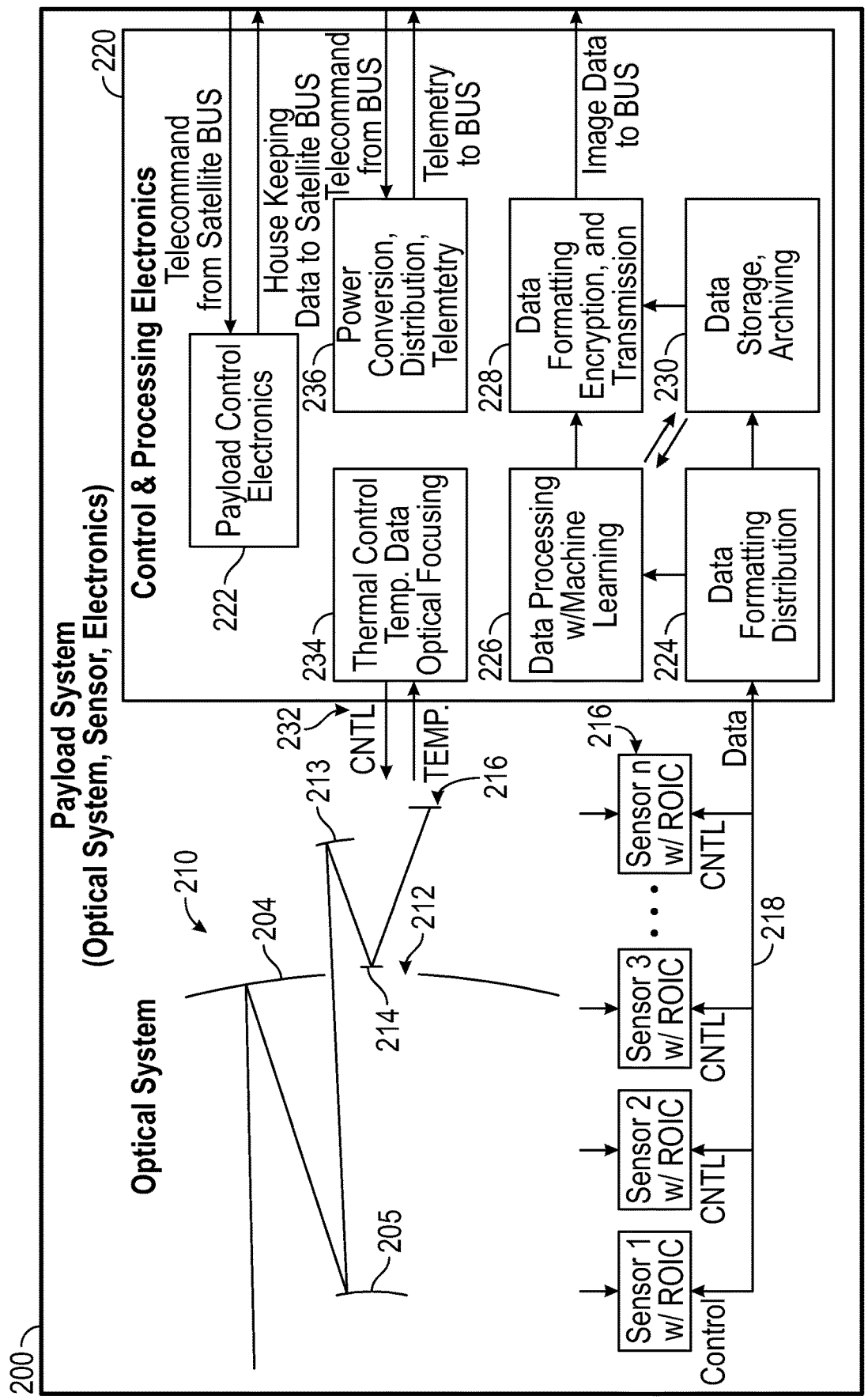
FIG. 2A is a block diagram showing a schematic of an embodiment of a payload system for a satellite that may include the various optical systems described herein.

FIG. 2A is a block diagram of an example payload system 200 configuration for an optical system 210 in a satellite. The optical system 210 is shown in schematic form. The optical system 210 includes a concave primary mirror 204 having a central aperture 212. The primary mirror may have one of parabolic, non-parabolic conical or aspherical surface. A smaller convex secondary mirror 205 faces the primary mirror 204 and has an aspherical surface. The secondary mirror may have an aspherical surface. A concave tertiary mirror 213 is arranged behind the primary mirror 204. The tertiary mirror may have one of parabolic, non-parabolic conical or aspherical surface. A concave quaternary mirror 214 is arranged slightly behind the central aperture 212 of the primary mirror 204, where the quaternary mirror can have one of a spherical, parabolic, non-parabolic conical or aspherical surface. The primary mirror 204, the tertiary mirror 213 and the quaternary mirror 214 each have positive power or focal length, and the secondary mirror 205 has negative power. "Behind" may be defined as described above. Behind may also refer to a direction in FIG. 2A as oriented that is to the right, such that "behind" the primary mirror 204 may mean to the right of the primary mirror 204 as oriented in the figure.

An image sensor 216 having up to 'n' aggregated sensors that convert light into electrical signals is positioned behind the primary mirror 204. In certain embodiments, the image sensor 216 may deliver an output format of thirty-two sub-LVDS (low-voltage differential signaling) channels of digital data across an interface 218 to a control and processing electronics portion 220 of the satellite. In other embodiments, other output formats are used. The sensor 216 includes a readout integrated circuit (ROIC) used for infrared, visible, and other arrayed sensors. The functions supported by the ROIC include processing and shaping of an image signal and may include unit cell preamplifiers. Interface 218 also includes control signals from the control and processing electronics 220, where the control signals may include a serial peripheral interface (SPI) and a clock signal in some embodiments.

In certain embodiments, a data formatting and distribution subsystem 224 receives the data across the interface 218 and then further sends the data to a data processing with machine learning subsystem 226 and to a data storage and archiving subsystem 230 to be stored. The stored data from the data storage and archiving subsystem 230 can be sent directly to the data processing subsystem 226 for various types of processing. The output of processed data from the data processing subsystem 226 can be sent directly to the data storage and archiving subsystem 230 for storage. The output of processed data from the data processing subsystem 226 and data from the data storage and archiving subsystem 230 can be sent to a data formatting, encryption and transmission subsystem 228. The output of the data formatting, encryption and transmission subsystem 228, such as image data, is then sent to a satellite Bus for further distribution, which may include transmission to an earth station, relay satellite, or other entity that receives the data. The data processing subsystem 226 may include one or processors and one or more memories, such as a memory for program instructions and a memory and/or a cache for data.

A payload control electronics subsystem 222 receives telecommands from the satellite Bus and provides housekeeping data to the satellite Bus. The payload control electronics subsystem 222 provides commands to portions of the payload system 200, including to the image sensor 216 and/or to a thermal control, temperature data and optical focusing subsystem 234. The thermal control, temperature data and optical focusing subsystem 234 provides control signals, such as thermal control and optical focusing, via an interface 232 to the optical system 210 and receives temperature data back from the optical system 210.

A power conversion, distribution and telemetry subsystem 236 receives telecommands from the satellite Bus and provides telemetry data to the satellite Bus. The power conversion, distribution and telemetry subsystem 236 may also receive power, such as from solar panels or batteries of the satellite.

An important issue with imaging systems for smaller satellites, such as CUBESATs, is calibration, including absolute and inter-sensor calibrations. Most imagery from commercial CUBESATs is not calibrated in a standard way on a standard radiance or reflectance scale, for example. Thus, it may be challenging to compare the image data with big commercial satellites or scientific satellites imaging, like MODIS or LANDSAT. Even inter-sensor calibration is uncertain, which may owe mainly to temporarily unstable or inconsistent performance of commercial sensors.

On the contrary, the sensors for the optical systems described herein, such as the aggregate sensor of the sensor 216 in optical system 210, may be developed and tailored to space applications and their consistency and stability may be validated. Importantly, the optical system 210 and all the optical systems described herein may be calibrated according to the standard processes and with respect to each other so that all the image data from the systems is compatible with each other and also with reference systems.

Figure 2B:
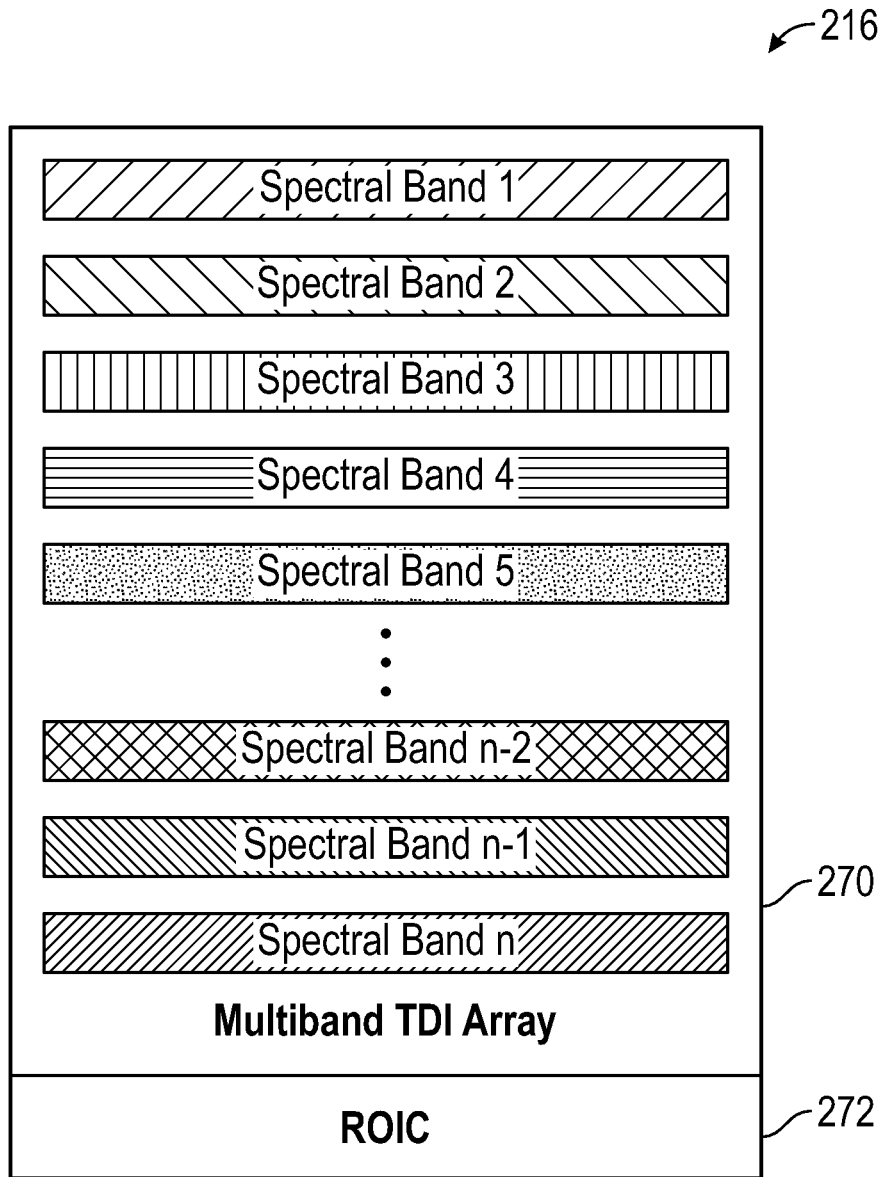
FIG. 2B is block diagram showing a schematic of an embodiment of an image plane circuit that may be used with the various optical systems described herein.

Referring to FIG. 2B, an example embodiment of a sensor circuit for the image sensor 216 is shown. The image sensor 216 may include a readout integrated circuit (ROIC) 272 and a charged coupling device (CCD) array 270. Photons incident on the surface of the CCD array 270 (top surface as oriented in the figure) generate a charge that can be read by electronics and turned into a digital copy of the light patterns falling on the device. In certain embodiments, a charge coupled device in complementary metal-oxide-semiconductor (CCD-in-CMOS) time delay integration (TDI) sensor from IMEC International may be used for the optical system 210, even though a pixel size of 5 micrometers (m) is preferred. In some embodiments, using a format of 4096 columns and 256 stages per multiband CCD array 270, a backside illumination sensor combines a TDI CCD array with CMOS drivers and readout pixels on a pitch of 5.4 μm. An on-chip control and sequencer circuit may be included. In certain embodiments, a 130 MHz clock 262 may be an input to the image sensor along with a serial peripheral interface (SPI) for control. The imager may interface through the SPI and may integrate on-chip PLLs to deliver an output format of 32 sub-LVDS (low-voltage differential signaling) channels as part of the ROIC 272. A seven-band version of the circuit can contain seven CCD arrays of 4096×256 pixels each.

In other embodiments, other sensor circuits may be used for the image sensor 216, which may have differing sizes of the array 270 and a different ROIC 272 for the output of data. For example, the image sensor 216 may include four panchromatic CCD arrays of 16384×96 pixels each and eight multispectral CCD arrays of 8192×48 pixels.

To maximize the area that is exposed to light, backside illumination technology can be used. This consists of bonding the sensor wafer to a carrier wafer and thinning it from the backside. This directly exposes the CCD gates to the light, without obstruction of metal lines. An effective fill factor thus reaches 100% percent. Backside illuminated CMOS imagers feature a very high intrinsic light sensitivity and are very efficient in detecting (near) ultraviolet and blue light. Several antireflective coatings (ARCs) are available to reach a high quantum efficiency in selected regions of the spectrum, e.g. more than 70% in the UV range or more than 90% in the visible range.

With a TDI sensor, image quality is sensitive to platform motion, which can be represented by image smear MTF. The image smear MTF of the optical system 210 may be 0.974 with smearing of 0.2 pixels, the number of TDI steps at 128, and a clocking phase of 4. This may impose requirements of attitude stability of the platform, which may be twenty-two micro-radians per second (rad/sec) or 4.54 arcseconds per second (arcsec/sec). When the attitude stability requirement is relaxed to smearing of one pixel, then the smear MTF becomes 0.75 and the stability may be 23 arcsec/sec.

Referring to FIG. 3, a schematic of an embodiment of an all-reflective optical system 300 is shown. The optical design of the optical system 300 may be different from a traditional Three Mirror Anastigmat TMA or three mirror Korsch design. The Korsch design may have an ellipsoid surface for the primary mirror, a hyperbola surface for the secondary mirror, and an ellipsoid surface for the tertiary mirror.

The optical system 300 includes a concave primary mirror 304 having a central aperture 310, where the primary mirror can have one of a parabolic, non-parabolic conical, or aspherical surface. A smaller convex secondary mirror 305 faces the primary mirror 304 and has an aspherical surface. A concave tertiary mirror 313 is arranged behind the primary mirror 304, where the tertiary mirror can have one of a parabolic, non-parabolic conical or aspherical surface. A concave quaternary mirror 314 is arranged in front of the central aperture 310 of the primary mirror 304, where the quaternary mirror can have one of a spherical, parabolic, non-parabolic conical or aspherical surface. The primary mirror 304, the tertiary mirror 313 and the quaternary mirror 314 each have positive power or focal length, and the secondary mirror 305 has negative power.

An image plane 316 having one or more aggregated sensors that convert light into electrical signals is positioned behind the primary mirror 304. In certain embodiments, the image plane 316 is positioned at a specific distance from an optical axis that is defined by a mechanical symmetry around a line through the vertices of the primary and the secondary mirrors, which may define the "optical axis." The specific distance is within the physical radius (from the optical axis) of the primary mirror. Thus, the image plane will not exceed a cylindrical envelope that is defined by the radius from the optical axis of the primary mirror. The radius of the primary mirror may extend perpendicularly from the principal axis of the mirror to an outermost edge of the mirror. The principal axis may be a geometric reference line going through the center of the mirror that is exactly perpendicular to the surface of the mirror.

The optical system 300 uses the secondary mirror 305 that is symmetric around the optical axis. The tertiary mirror 313 can have a segmented non-circular shape. The quaternary mirror 314 can have a circular or non-circular shape. The primary mirror 304 can have a circular or a non-circular shape, where the latter is to enhance modulation transfer function (MTF) and signal to noise ratio (SNR). A circular shape is inscribed to a non-circular shape, which may be periodic about the optical axis.

For an example of a square and its incircle, the incircle may be the shape of a primary mirror for traditional optical system design. If the radius of the incircle is "r," then the area of the square will be larger by 4/pi. This is not usually an issue for a larger camera for which a large volume is allocated. However, for a small satellite, which is usually a cuboid, a primary mirror in a square shape can have a larger area by 4/pi and boost MTF and SNR.

Both Korsch and other four-mirror optical designs do not use a parabolic surface for the primary and/or the tertiary mirrors. With the primary and/or the tertiary mirrors of the optical system 300 having a parabolic surface, the optical system 300 can provide a unique, affordable solution to a mission with budget constraints. For a parabolic surface, a general test setup can be used for manufacturing, or a stitching measurement is possible. Also, a commercial product line can be used for parabolic mirror manufacturing, especially when mirrors are smaller than 300 mm. In contrast, non-parabolic conic or aspherical surface may require a dedicated test tool, including computer generated hologram (CGH) or nulling optics.

For a parabolic surface, a general test setup can be used for manufacturing, or stitching measurement is possible. Also, a commercial product line can be used for parabolic mirror manufacturing, especially, when mirrors are smaller than 300 mm.

The primary and the secondary mirrors 304, 305 forming the optical axis are symmetric or periodic about this axis. The primary and secondary mirrors face each other. The tertiary mirror 313 faces the back of the primary mirror 304 and may be a segmented mirror. As used herein, "segmented mirror" includes its usual and customary meaning and includes, without limitation, an array of smaller mirrors designed to act as segments of a single, larger curved mirror. The optical axis of the tertiary mirror 313 may not coincide with a mechanical axis. As used herein, the "mechanical axis" has its usual and customary meaning, and may include, without limitation, a normal vector at the center or at the edge of the mirror. In certain embodiments, the tertiary mirror 313 is a segment of a larger mirror. In such embodiments, the optical axis for the tertiary mirror 313 may refer to the optical axis of the larger mirror and the mechanical axis may refer to the axis of the segmented mirror. The quaternary mirror 314 faces the tertiary mirror 313 and is positioned to avoid interference with rays from the secondary mirror 305 to the tertiary mirror 313.

The metering and supporting structure of the mirrors can be a cylindrical tube or a conical baffle of the primary mirror 304, such as those shown and described with respect to FIGS. 14A-14D. The cylindrical envelope may be coextensive with a cylindrical structure to limit the specific distance at which the imaging plane is located relative to the optical axis between the primary and secondary mirrors. For example, the location of the imaging plane may be radially limited by the radius of the cylindrical structure.

Light rays impinge upon and are reflected by the primary mirror 304 first, the secondary mirror 305 next, the tertiary mirror 313 thirdly, and finally the quaternary mirror 314, so that the rays reach the image plane 316. The image plane 316 includes one or more sensors, which may be aggregated in an orderly manner. An entrance pupil of the optical system 300 can be positioned near the primary or the secondary mirrors 304, 305. An intermediate focus is formed around a vertex of the primary mirror 304, positioned between the primary and the secondary mirrors 304, 305, or between the primary mirror 304 and the tertiary mirror 313. An exit pupil or Lyot stop can be positioned near the quaternary mirror 314, between the tertiary and the quaternary mirrors 313, 314, or between the quaternary mirror 314 and the image plane 316. As used herein, a "Lyot stop" has its usual and customary meaning and includes, without limitation, an optical stop that reduces the amount of flare which may be caused by diffraction of other stops and baffles in the optical system. The Lyot stops may be located at images of the system's entrance pupil and have a diameter slightly smaller than the pupil's image.

The optical system 300 has a small form factor. The form factor is defined as the ratio of 1) a distance between the secondary and tertiary mirrors 305, 313 to 2) an effective focal length of the optical system 300. The optical system 300 has a form factor of less than 0.2 and of 0.09 in some embodiments. The form factor may be from about 0.09 to 0.2, from about 0.04 to less than 0.25. The form factor may be less than 0.25. The form factor may have the following values or about the following values: 0.02, 0.03, 0.04, 0.05, 0.06, 0.07, 0.08, 0.09, 0.010, 0.11, 0.12, 0.13, 0.14, 0.15, 0.16, 0.17, 0.18, 0.19, 0.20, 0.21, 0.22, 0.23, 0.24 or 0.25. The form factor may be less than 0.04, less than 0.05, less than 0.06, less than 0.07, less than 0.08, less than 0.09, less than 0.010, less than 0.11, less than 0.12, less than 0.13, less than 0.14, less than 0.15, less than 0.16, less than 0.17, less than 0.18, less than 0.19, less than 0.20, less than 0.21, less than 0.22, less than 0.23, less than 0.24, or less than 0.25.

In addition to the small form factor, the optical system 300 has a benefit over the prior art in having a much shorter physical distance from the tertiary mirror 313 to the image plane 316. The prior art has quite a long distance between the tertiary mirror and image plane and mandates one or more folding mirrors to fit into a limited dimension. This configuration may lead to difficulty in optical alignment, thermal instability during operation, which may end with performance degradation. The optical system 300, because of the small form factor and the short distance between the tertiary mirror 313 and the image plane 316, eliminates unnecessary folding mirrors and simplifies the alignment and assembly and stability of operation.

The optical system can be designed to have mirrors of zero coefficient of thermal expansion (CTE) materials (such as Zerodur, Fused Silica, Suprasil, Astrostiall, etc.), low-CTE materials (such as Borosilicate glass, like BOROFLOAT, Pyrex, etc.), and mild-CTE materials (such as Crown glass, like NBK7).

For CTE matching, a specific combination of mirror and structure materials are used for the optical system. Superinvar, invar, or designed composite material can be used for zero-CTE mirror materials. Invar, Kovar, ceramics, or designed composite material can be used for low-CTE mirror materials. Titanium, ceramics, or design composite materials can be used for mild-CTE mirror materials.

A monolithic structure can be used for the optical system as an ultimate solution. Mirrors and structures can be made of one material, including aluminum, ceramics, designed composite materials, and is not limited to this list.

Figure 4:
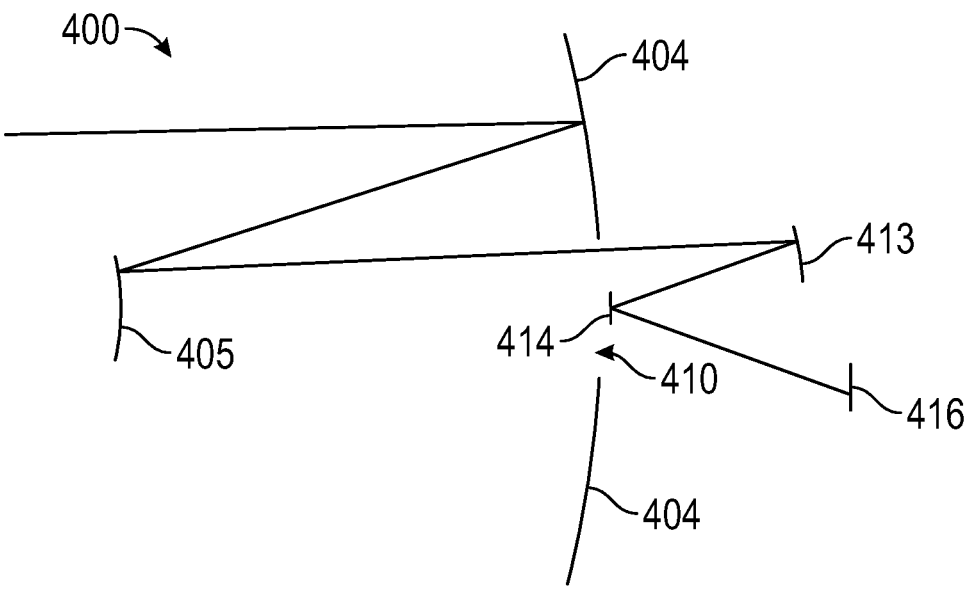

Referring to FIG. 4, a schematic of another embodiment of an all-reflective optical system 400 is shown. The optical system 400 includes a primary mirror 404, a secondary mirror 405, a tertiary mirror 413, a quaternary mirror 414, and image plane 416. The primary mirror 404, secondary mirror 405, tertiary mirror 413, the quaternary mirror 414 and image plane 416 may have the same or similar features and/or functions as, respectively, the primary mirror 304, the secondary mirror 305, the tertiary mirror 313, the quaternary mirror 314 and image plane 316 of the optical system 300, and vice versa.

However, in the optical system 400, the quaternary mirror 414 is located behind the primary mirror 404, but close to an aperture 410 in the primary mirror 404. The tertiary mirror 413 is positioned further behind the primary mirror 404 in the optical system 400 than in the optical system 300. In certain embodiments, the tertiary mirror 413 may be positioned a distance behind the primary mirror 404 that is in a range of 20% to 60%, of 30% to 50%, or of 35% to 45%, of the diameter of the primary mirror 404. The primary mirror 404 of the optical system 300 in FIG. 3 can be manufactured in one body with the tertiary mirror 313 so that the center of mass is closer to the primary mirror 304 and the crosstalk moment of inertia (MOI) of the system can be reduced. The optical system 400 of FIG. 4 is different from the optical system 300 with regard to effective focal length and field-of-view. An advantage of the configuration of the optical system 400 is that placing the quaternary mirror 414 closer to the primary mirror 404 may make it easier to set a Lyot stop on the quaternary mirror 414 and the central hole size or aperture 410 of the primary mirror can be minimized.

Figure 5:
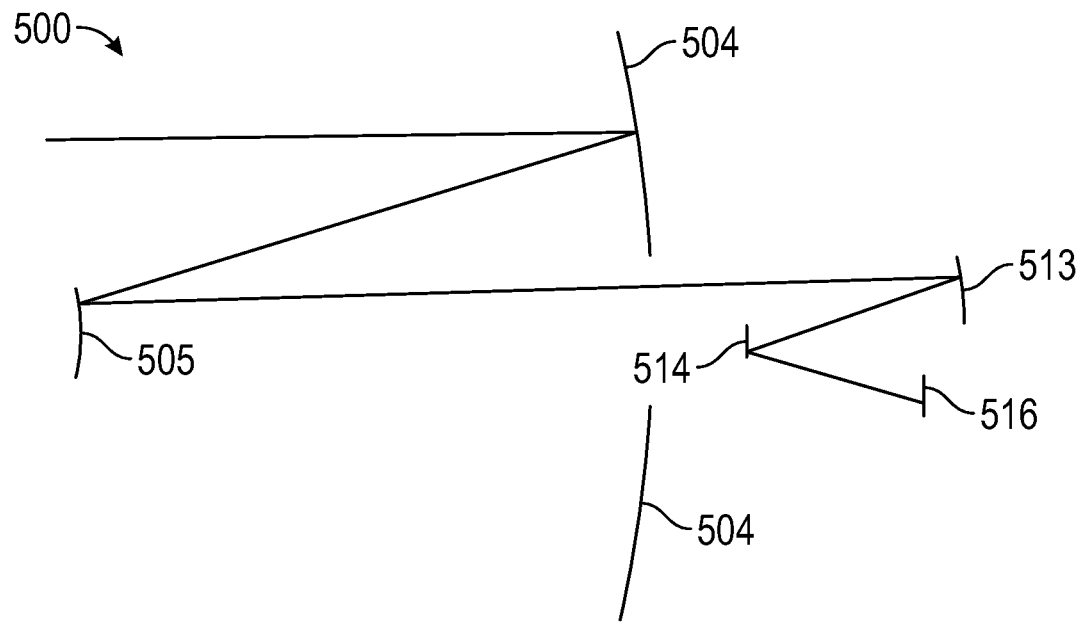
Figure 6:
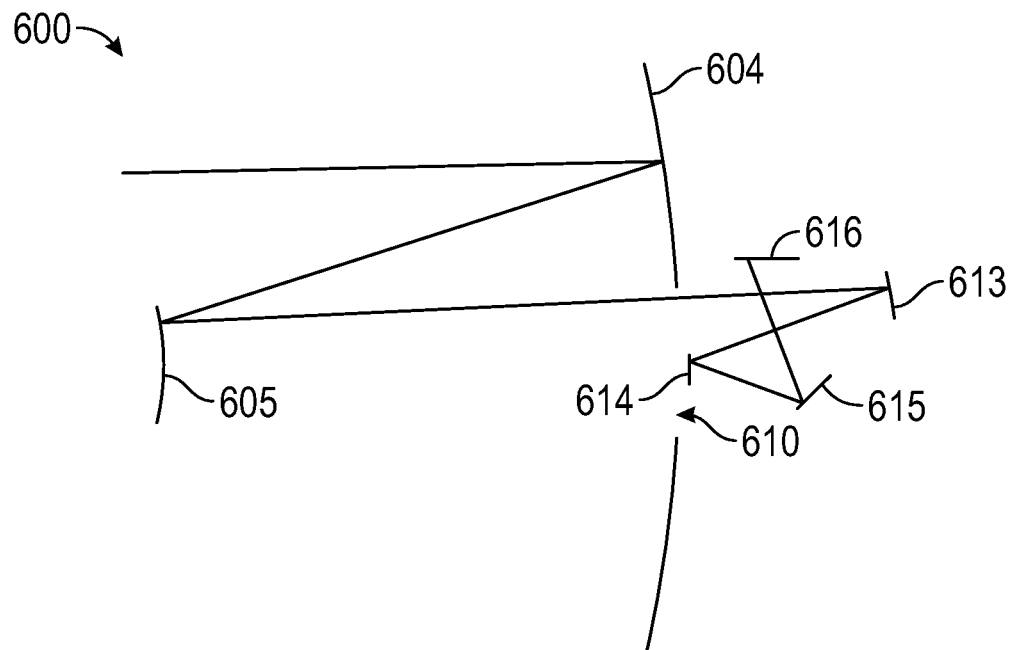
FIGS. 6-9 are schematics showing various embodiments of configuration layouts for mirrors, including one or more folding mirrors, and an imaging plane, that may be used with the various optical systems described herein.

Referring to FIG. 5, a schematic of another embodiment of an all-reflective optical system 500 is shown. The optical system 500 includes a primary mirror 504, a secondary mirror 505, a tertiary mirror 513, a quaternary mirror 514, and an image plane 516. The primary mirror 504, secondary mirror 505, tertiary mirror 513, quaternary mirror 514 and image plane 516 may have the same or similar features and/or functions as, respectively, the primary mirror 304, the secondary mirror 305, the tertiary mirror 313, the quaternary mirror 314 and the image plane 316 of the optical system 300, and vice versa.

However, in the optical system 500, the quaternary mirror 514 is located a distance behind the primary mirror 504 that is greater than a distance between the quaternary mirror 414 and the primary mirror 404 of the optical system 400 (see FIG. 4). Further, in the optical system 500, the tertiary mirror 513 is positioned a distance behind the primary mirror 504 that is greater than a distance of the respective corresponding mirrors of the optical system 400. In certain embodiments, the tertiary mirror 513 may be positioned a distance behind the primary mirror 504 that is in a range of 45% to 55% of the diameter of the primary mirror 504. The optical system 500 may be designed for much smaller pixel sensors, such as having a pixel size of less than 4 micrometers in certain embodiments. The optical system 500 may be different from the optical system 300 with respect to effective focal length and field-of-view. In some embodiments, the optical system 500 may have a shorter effective focal length and a wider field-of-view relative to the optical system 300, which may allow the system 500 to include sensors with smaller pixel size. ut it may be relatively closer to an aperture 610 in the primary mirror 604. The tertiary mirror 613 is similarly positioned behind the primary mirror 604 as in the optical system 400. An added folding mirror 615 receives rays from the quaternary mirror 614 and reflects them to the image plane 616, which is positioned above the folding mirror 615. In certain embodiments, the image plane 616 is positioned to be above and parallel to the optical axis.

Some embodiments of the optical systems may have a longer system optical path length between the quaternary mirror 614 and the image plane 616 using the folding mirror 615. If the image plane 616 is behind the tertiary mirror 613, the system optical path length is the distance between the secondary mirror 605 and the image plane 616. With using the folding mirror 615, the system optical path length is the distance between the secondary mirror 605 and the tertiary mirror 613. The image plane 616 may be positioned to satisfy the requirement of focal length and field-of-view. The configuration of the optical system 600 may provide a compact design. Another advantage is that the system 600 may allow for easier installation of a sensor cooler and a radiating plate for the cooler. Furthermore, in the optical system 600, a sensor for the image plane can be positioned closer to the primary mirror supporting structure and the sensor can be held in a more stable way.

Figure 7:
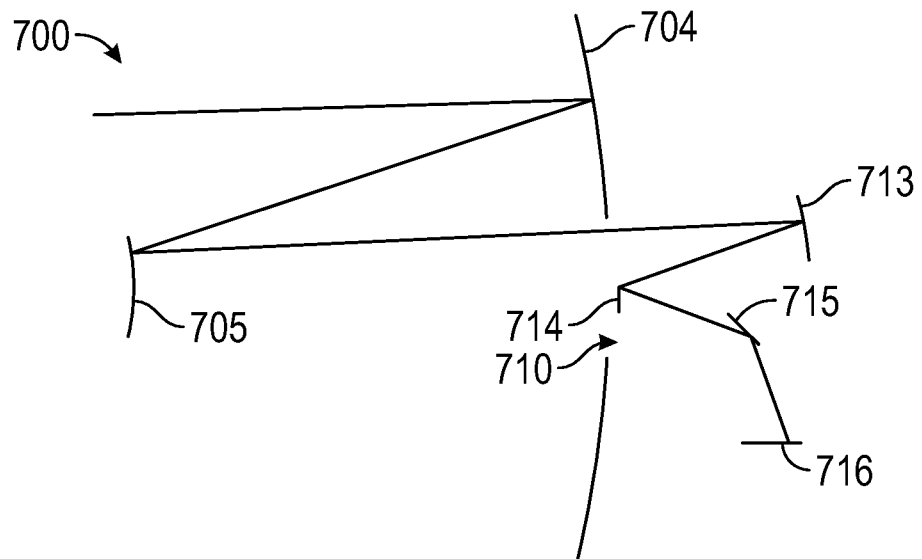

Referring to FIG. 7, another embodiment of an all-reflective optical system 700 having a folding mirror 715 is shown. The optical system 700 may have the same or similar features and/or functions as the optical system 600, and vice versa. The optical system 600 includes a primary mirror 704, a secondary mirror 705, a tertiary mirror 713, a quaternary mirror 714, and an image plane 716, which may have the same or similar features and/or functions as, respectively, the primary mirror 604, the secondary mirror 605, the tertiary mirror 613, the quaternary mirror 614, and the image plane 616 of the optical system 600, and vice versa. The quaternary mirror 714 is behind the primary mirror 704, as in the optical system 600, but is close to an aperture 710 in the primary mirror 704. The tertiary mirror 713 is similarly positioned behind the primary mirror 704 as in the optical system 600. The folding mirror 715 receives rays from the quaternary mirror 714 and reflects them to the image plane 716, which is positioned below the folding mirror 715. In certain embodiments, the image plane 716 is positioned to be below and parallel to the optical axis. An advantage of the configuration of the optical system 700 is that the configuration of the mirrors including the folding mirror 715 leads to a more compact design. Another advantage is that the optical system 700 can use a sensor for the image plane in a larger package. A CMOS sensor or a sensor with a ROIC tends to have larger package so that it can embrace more circuits or components that may help minimize readout noise, crosstalk, and blooming.

Figure 8:
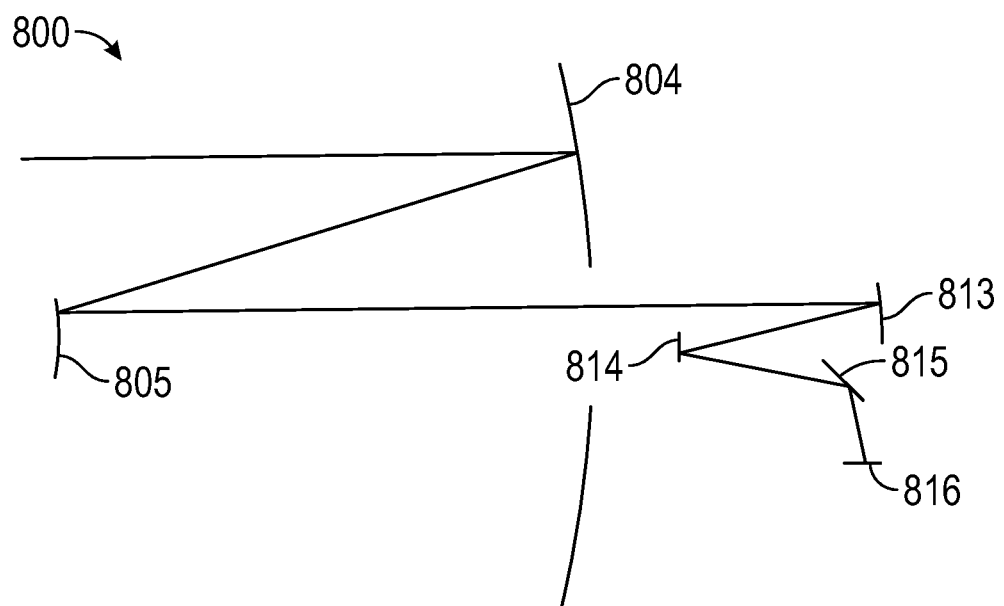

Referring to FIG. 8, another embodiment of an all-reflective optical system 800 having a folding mirror 815 is shown. The optical system 800 may have the same or similar features and/or functions as the optical system 700, and vice versa. The optical system 800 includes a primary mirror 804, a secondary mirror 805, a tertiary mirror 813, a quaternary mirror 814, and an image plane 816, which may have the same or similar features and/or functions as, respectively, the primary mirror 704, the secondary mirror 705, the tertiary mirror 713, the quaternary mirror 714, and the image plane 716 of the optical system 700, and vice versa. However, the image plane 816 is closer to the optical axis than the image plane 716 is close to its respective optical axis. The quaternary mirror 814 is behind the primary mirror 804 but is further behind it than in the respective corresponding components of the optical system 700. The tertiary mirror 813 is positioned further behind the primary mirror 804 than in the optical system 700. The folding mirror 815 receives rays from the quaternary mirror 814 and reflects them to the image plane 816, which is positioned below the folding mirror 815. In certain embodiments, the image plane 816 is positioned to be below and parallel to the optical axis. The optical system 800 is designed for smaller pixel sensors, which are usually commercial or MIL-STD. An advantage of the optical system 800 is that it can utilize up-to-date sensors, including commercial or MIL-STD sensors.

Figure 9:
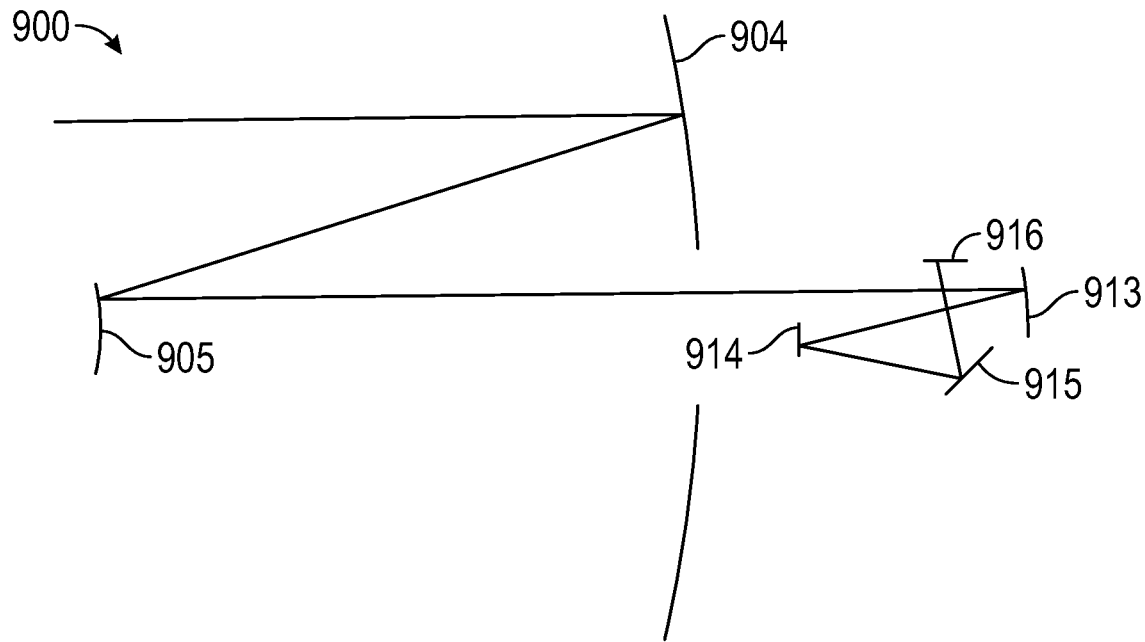

Referring to FIG. 9, another embodiment of an all-reflective optical system 900 having a folding mirror 915 is shown. The optical system 900 may have the same or similar features and/or functions as the optical system 800. The optical system 900 includes a primary mirror 904, a secondary mirror 905, a tertiary mirror 913, a quaternary mirror 914, and an image plane 916, which may have the same or similar features and/or functions as, respectively, the primary mirror 804, the secondary mirror 805, the tertiary mirror 813, the quaternary mirror 814, and the image plane 816 of the optical system 800, and vice versa.

However, in the optical system 900, the image plane 916 is closer to the optical axis than the image plane 816 is close to its respective optical axis. The quaternary mirror 914 is behind the primary mirror 904, in a similar distance to that of the optical system 800. The tertiary mirror 913 is positioned behind the primary mirror 904 in a similar distance to that of the optical system 800. The folding mirror 915 receives rays from the quaternary mirror 914 and reflects them to the image plane 916, which is positioned above the folding mirror 915. In certain embodiments, the image plane 916 is positioned to be above and parallel to the optical axis. Advantages of the optical system 900 are that a sensor of the image plane can be more stable against vibration and that a cooler with a radiator can be installed in an easier way than in other optical system configurations.

Figure 10:
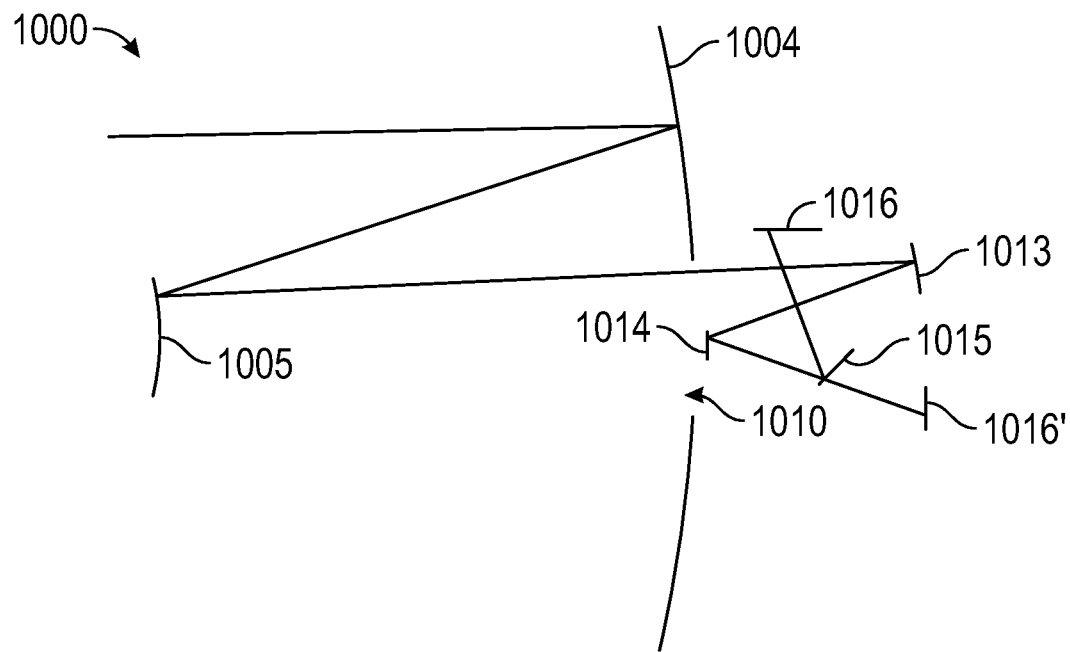
FIGS. 10-13 are schematics showing various embodiments of configuration layouts for mirrors, including one or more folding mirrors, and two imaging planes, that may be used with the various optical systems described herein.

Referring to FIG. 10, an embodiment of an all-reflective optical system 1000 having multiple image planes and a folding mirror 1015 is shown. The optical system 1000 may have the same or similar features and/or functions as the optical system 600. The optical system 1000 includes a primary mirror 1004, a secondary mirror 1005, a tertiary mirror 1013, a quaternary mirror 1014, and a first image plane 1016, which may have the same or similar features and/or functions as, respectively, the primary mirror 604, the secondary mirror 605, the tertiary mirror 613, the quaternary mirror 614 and the image plane 616 of the optical system 600, and vice-versa. The first image plane 1016 is a similar distance to the optical axis as the image plane 616 is to its respective optical axis. However, optical system 1000 has a second image plane 1016' similar to the first image plane 1016. The first image plane 1016 can be dedicated to a first spectral range and the second image plane 1016' can be dedicated to a second spectral range.

The quaternary mirror 1014 is behind the primary mirror 1004 and is close to an aperture 1010 in the primary mirror 1004 at a distance similar to that in the respective corresponding components of the optical system 600. The tertiary mirror 1013 is positioned behind the primary mirror 1004 in a similar distance to that in the respective corresponding components of the optical system 600. The folding mirror 1015 receives rays from the quaternary mirror 1014 and reflects some of the rays within a certain spectral range to the first image plane 1016, which is positioned above the folding mirror 1015. The folding mirror 1015 may be transmissive to rays within a second different range from that which is reflected. The optical system 1000 enables simultaneous multi-color imaging by having the folding mirror 1015 be reflective over the first spectral range and transmissive over the second spectral range. In certain embodiments, the first image plane 1016 is positioned to be above and parallel to the optical axis, and the second image plane 1016' is positioned to be below and perpendicular to the optical axis on an opposite side of the optical axis as the first image plane 1016. An advantage of the optical system 1000 is that it can perform multicolor imaging due to the properties of the folding mirror and the multiple imaging planes.

Figure 11:
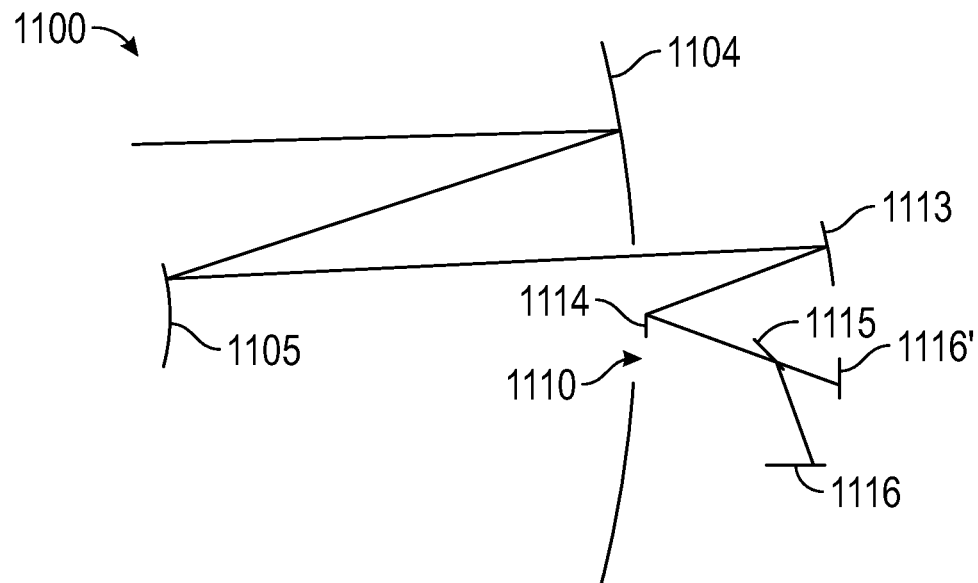

Referring to FIG. 11, another embodiment of an all-reflective optical system 1100 having multiple image planes and a folding mirror 1115 is shown. The optical system 1100 may have the same or similar features and/or functions as the optical system 1000. The optical system 1100 includes a primary mirror 1104, a secondary mirror 1105, a tertiary mirror 1113, a quaternary mirror 1114, a folding mirror 1115 and a first image plane 1116, which may have the same or similar features and/or functions as, respectively, the primary mirror 1004, the secondary mirror 1005, the tertiary mirror 1013, the quaternary mirror 1014, the folding mirror 1015 and the first image plane 1016 of the optical system 1000, and vice versa. However, in the optical system 1100, the first image plane 1116 is positioned at a greater distance to the optical axis than the first image plane 1016 is to its respective optical axis. The optical system 1100 has a second image plane 1116' similar to the first image plane 1116. The first image plane 1116 can be dedicated to a first spectral range and the second image plane 1116' can be dedicated to a second spectral range.

The quaternary mirror 1114 is behind the primary mirror 1104 and is close to an aperture 1110 in the primary mirror 1104 at a distance similar to that in the respective corresponding components of the optical system 1000. The tertiary mirror 1113 is positioned behind the primary mirror 1104 in a similar distance to that in the respective corresponding components of the optical system 1000. The folding mirror 1115 receives rays from the quaternary mirror 1114 and reflects some of them to the first image plane 1116, which is positioned below the folding mirror 1115. The optical system 1100 enables simultaneous multi-color imaging by having the folding mirror 1115 be reflective over a first spectral range and transmissive over a second spectral range. In certain embodiments, the first image plane 1116 is positioned to be below and parallel to the optical axis, and the second image plane 1116' is positioned to be below and perpendicular to the optical axis. An advantage is that the optical system 1100 can use a sensor for the image plane in a larger package. A CMOS sensor or a sensor with a ROIC tends to have larger package so that it can embrace more circuits or components that may help minimize readout noise, crosstalk, and blooming.

Figure 12:
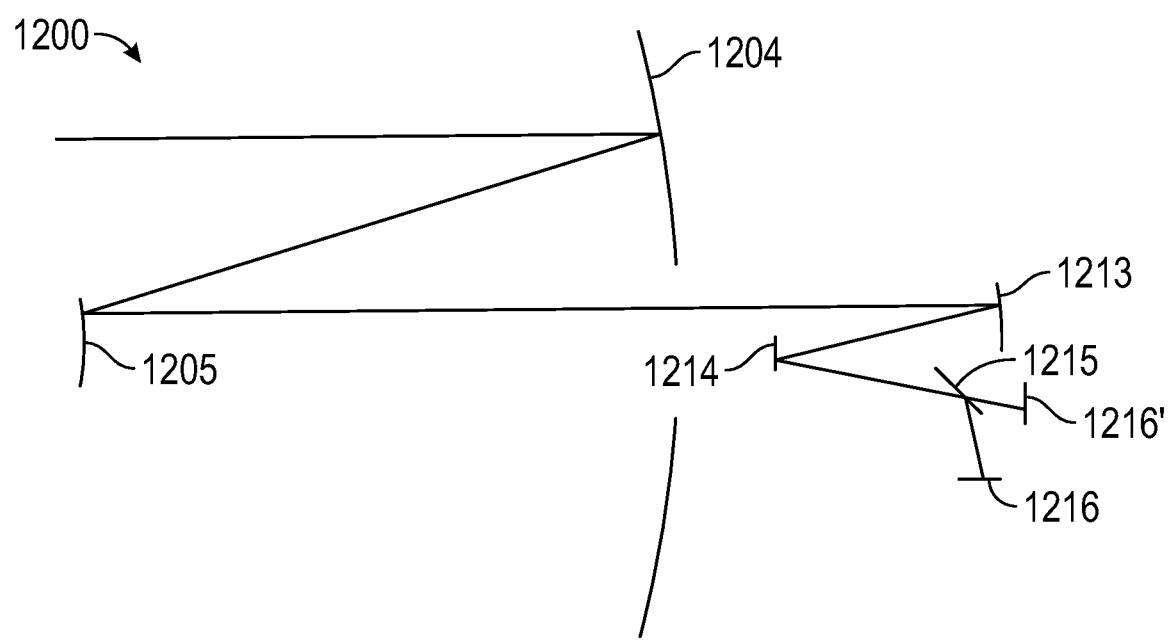

Referring to FIG. 12, another embodiment of an all-reflective optical system 1200 having multiple image planes and a folding mirror 1215 is shown. The optical system 1200 may have the same or similar features and/or functions as the optical system 1100. The optical system 1200 includes a primary mirror 1204, a secondary mirror 1205, a tertiary mirror 1213, a quaternary mirror 1214, a folding mirror 1215 and a first image plane 1216, which may have the same or similar features and/or functions as, respectively, the primary mirror 1104, the secondary mirror 1105, the tertiary mirror 1113, the quaternary mirror 1114, the folding mirror 1115 and the first image plane 1116 of the optical system 1100, and vice versa. However, in the optical system 1200, the first image plane 1216 is positioned at a shorter distance to the optical axis than the first image plane 1116 is to its respective optical axis. The optical system 1200 has a second image plane 1216' similar to the first image plane 1216. The first image plane 1216 can be dedicated to a first spectral range and the second image plane 1216' can be dedicated to a second spectral range.

The quaternary mirror 1214 is behind the primary mirror 1204 at a distance greater than in the respective corresponding components of the optical system 1100. The tertiary mirror 1213 is positioned behind the primary mirror 1204 at a greater distance than in the respective corresponding components of the optical system 1100. The folding mirror 1215 receives rays from the quaternary mirror 1214 and reflects them to the first image plane 1216, which is positioned below the folding mirror 1215. The optical system 1200 enables simultaneous multi-color imaging by having the folding mirror 1215 be reflective over the first spectral range and transmissive over the second spectral range. In certain embodiments, the first image plane 1216 is positioned to be below and parallel to the optical axis, and the second image plane 1216' is positioned to be below and perpendicular to the optical axis. The second image plane 1216' is positioned to be closer to the optical axis than the second image plane 1116' is close to its respective optical axis. The optical system 1200 is designed to utilize smaller pixel sensors for the image plane. An advantage of the optical system 1200 is that it can utilize up-to-date sensors, including commercial or MIL-STD sensors.

Figure 13:
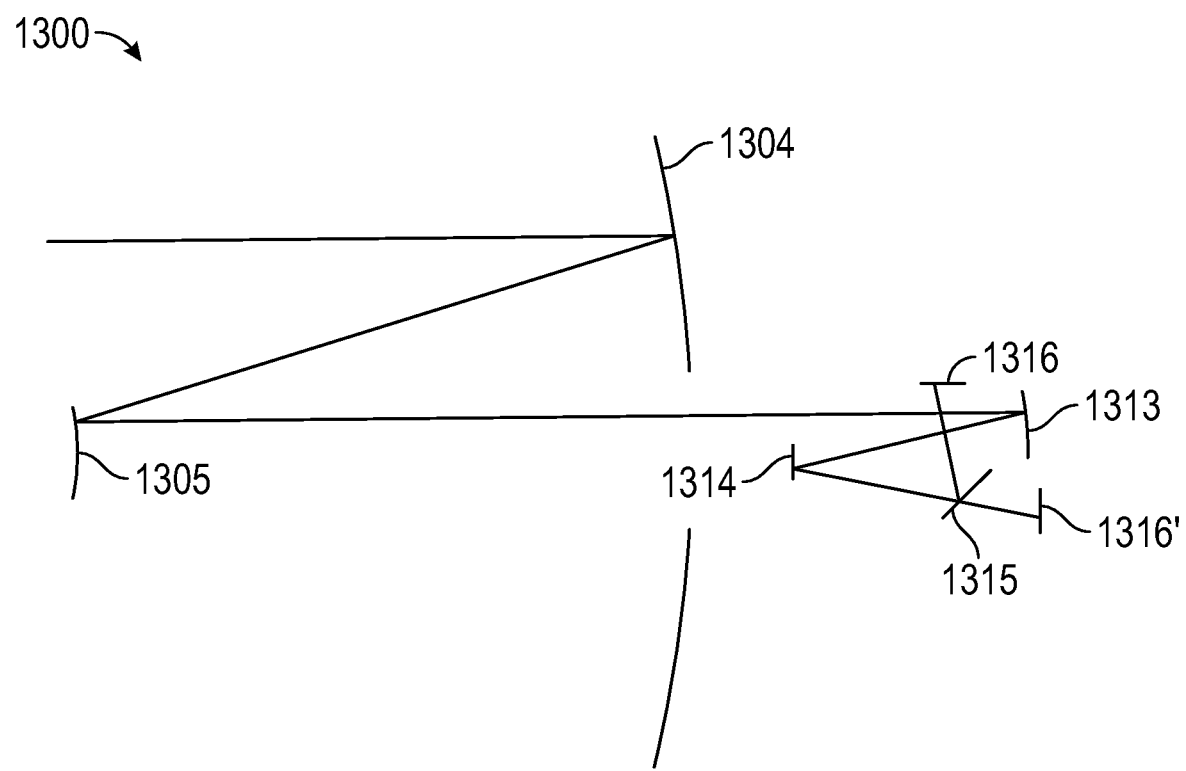

Referring to FIG. 13, another embodiment of an all-reflective optical system 1300 having multiple image planes and a folding mirror 1315 is shown. The optical system 1300 may have the same or similar features and/or functions as the optical system 1000. The optical system 1300 includes a primary mirror 1304, a secondary mirror 1305, a tertiary mirror 1313, a quaternary mirror 1314, a folding mirror 1315 and a first image plane 1316, which may have the same or similar features and/or functions as, respectively, the primary mirror 1004, the secondary mirror 1005, the tertiary mirror 1013, the quaternary mirror 1014, the folding mirror 1015 and the first image plane 1016 of the optical system 1000, and vice versa. However, in the optical system 1300, the first image plane 1316 is positioned at a shorter distance to the optical axis than the first image plane 1016 is to its respective optical axis. The optical system 1300 has a second image plane 1316' similar to the first image plane 1316. The first image plane 1316 can be dedicated to a first spectral range and the second image plane 1316' can be dedicated to a second spectral range.

The quaternary mirror 1314 is behind the primary mirror 1304 at a distance greater than in the respective corresponding components of the optical system 1000. The tertiary mirror 1313 is positioned behind the primary mirror 1304 at a greater distance than that in the respective corresponding components of the optical system 1000. The folding mirror 1315 receives rays from the quaternary mirror 1314 and reflects them to the first image plane 1316, which is positioned above the folding mirror 1315. The optical system 1300 enables simultaneous multi-color imaging by having the folding mirror 1315 be reflective over the first spectral range and transmissive over the second spectral range. In certain embodiments, the first image plane 1316 is positioned to be above and parallel to the optical axis, and the second image plane 1316' is positioned to be below and perpendicular to the optical axis. The second image plane 1316' is positioned to be closer to the optical axis than the second image plane 1016' is close to its respective optical axis. An advantage of the optical system 1300 is that a cooler with a radiator for the sensor can be installed in an easier way than in other optical system configurations.

Figure 14A:
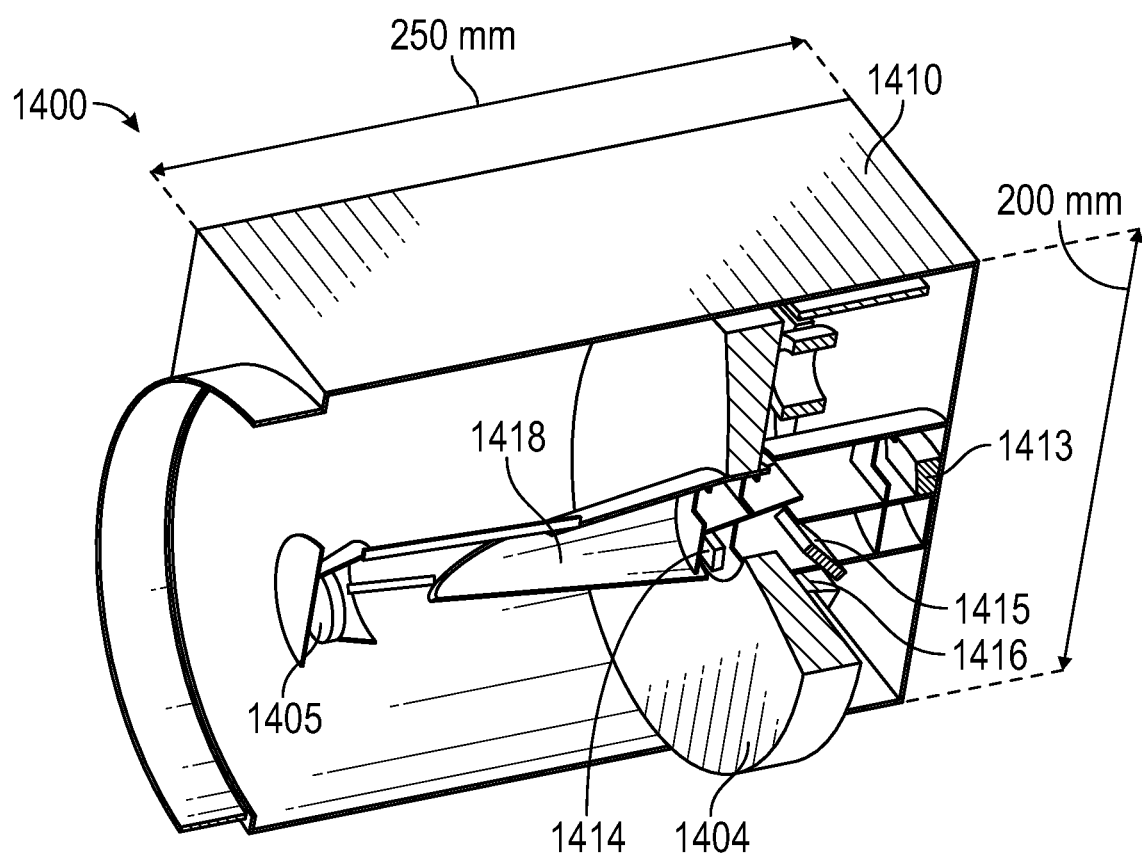
FIGS. 14A-14D are various views of an embodiment of a camera system that includes the optical system of FIG. 1.

Referring to FIG. 14A, a cross-sectional perspective view of a camera system 1400 having an optical system is illustrated. A box 1410 illustrates enclosing of the camera and can be a mechanical interface to a satellite BUS. A metering structure 1418, shown as a cone shaped structure, maintains a distance between a primary mirror 1404 and a secondary mirror 1405. The metering structure 1418 may maintain this distance within one micrometer when a temperature changes by 1° C. degree. A supporting structure 1408, best shown as a cylindrical tube in FIG. 14D, supports the primary mirror 1404. In certain embodiments, the radius of the cylindrical structure 1408 can be defined by a radius from the portion of the optical axis extending between the primary mirror 1404 and the secondary mirror 1405. The inner surface of the curved sidewall of the cylindrical structure 1408 can be a limit of the specific distance from the optical axis for the image plane 316 described above.

In certain embodiments, dimensions of the camera are 200 mm×200 mm×250 mm. Depending on the focal length of an optical system, the dimensions may range from 75 mm×75 mm×100 mm, designed for 5 m resolution at 500 km, to dimensions of 750 mm×750 mm×1000 mm, designed for 0.25 m resolution at 500 km. The overall volumetric envelope of the camera system may be less than 0.01 m3, less than 0.008 m3, less than 0.006 m3, less than 0.004 m3, less than 0.003 m3, less than 0.001 m3, or from 0.0005 m3 to 0.01 m3.

The form factor is defined as the ratio of a distance between the secondary and tertiary mirror to a focal length of the optical system. The distance between the secondary and tertiary mirror may be measured along the optical path. In certain embodiments, the optical system can be implemented in a form factor having the values described above, for example of less than 0.2, less than 0.15, or less than 0.1. For the prior art, the form factor is known to be more than 0.25. With the relatively smaller form factor of the optical systems described herein, the optical system can provide imaging resolution better than 1 m, 0.5 m, or 0.25 m at 500 km altitude. The optical system can also be capable of imaging resolution better than 0.1 m in an elliptical orbit. In other embodiments, the form factor can be in a range between 0.04 and 0.09. Examples of focal lengths, distances between the secondary mirror and the tertiary mirror for each focal length and a corresponding form factor of the system are provided in Table 2.

TABLE 2

| Focal Length (mm) | Distance between the secondary mirror and the tertiary mirror (mm) | Form Factor (Distance/ Focal Length) |
|---|---|---|
| 2300 | 340 | 0.15 |
| 2600 | 245 | 0.09 |
| 2700 | 250 | 0.09 |
| 2750 | 143 | 0.05 |
| 2850 | 260 | 0.09 |
| 2900 | 300 | 0.10 |
| 3300 | 200 | 0.06 |
| 3575 | 300 | 0.08 |
| 3600 | 300 | 0.08 |
| 3600 | 260 | 0.07 |
| 3850 | 355 | 0.09 |
| 4000 | 265 | 0.07 |
| 4000 | 240 | 0.06 |
| 4000 | 275 | 0.07 |
| 4500 | 375 | 0.08 |
| 4650 | 375 | 0.08 |
| 5000 | 365 | 0.07 |
| 5150 | 295 | 0.06 |
| 5200 | 355 | 0.07 |
| 5300 | 630 | 0.12 |
| 5300 | 275 | 0.05 |
| 5500 | 355 | 0.06 |
| 5750 | 325 | 0.06 |
| 6250 | 675 | 0.11 |
| 7150 | 390 | 0.05 |
| 7500 | 400 | 0.05 |
| 8500 | 770 | 0.09 |
| 9000 | 460 | 0.05 |
| 20000 | 775 | 0.04 |

Figure 14B:
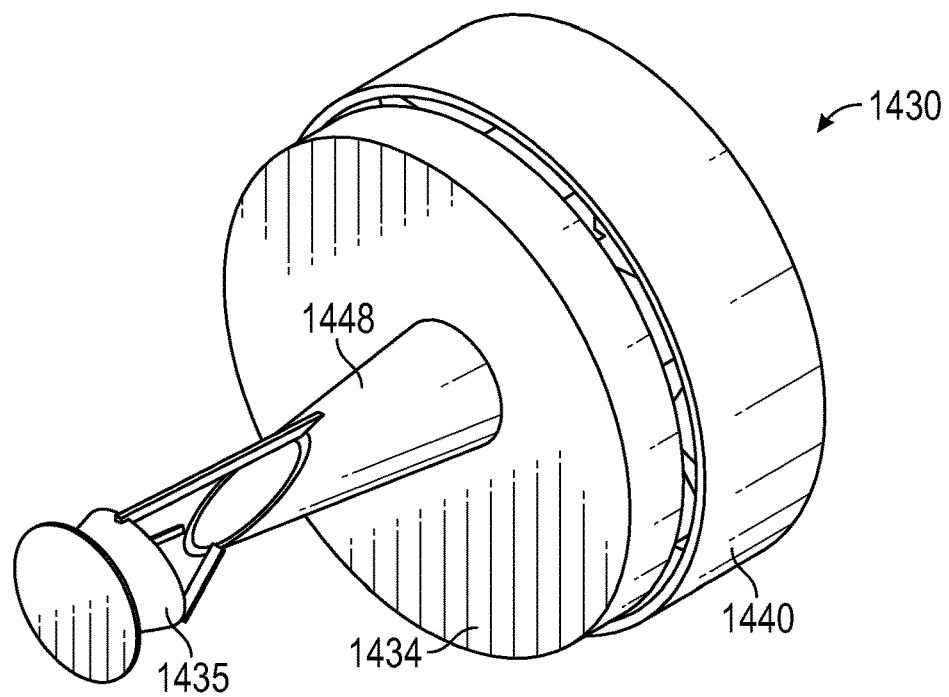

Referring to FIG. 14B, an embodiment of an optical system 1430 for cameras is illustrated. A metering structure 1448, shown as a cone shaped structure, keeps a distance between a primary mirror 1434 and a secondary mirror 1435 to the design within +/−one micrometer when a temperature changes by one Celsius degree.

For thermal controlling of the metering structure, temperature sensors and heaters (wire or patch type) can be installed on the metering structure. Payload control electronics reads the data from the temperature sensors and control the heaters to keep the metering structure 1448 within a specified range so that the focus of the camera system is on aggregated sensors.

A ring structure 1440 is a supporting structure for the primary mirror 1434 and supports the primary mirror kinematically so as to minimize structural distortion that may be induced during assembly. Also, the ring structure 1440 can be an interface to a satellite BUS, which can eliminate the need of a box-type enclosure, such as the enclosure 1410 shown in FIG. 14A.

Figure 14C:
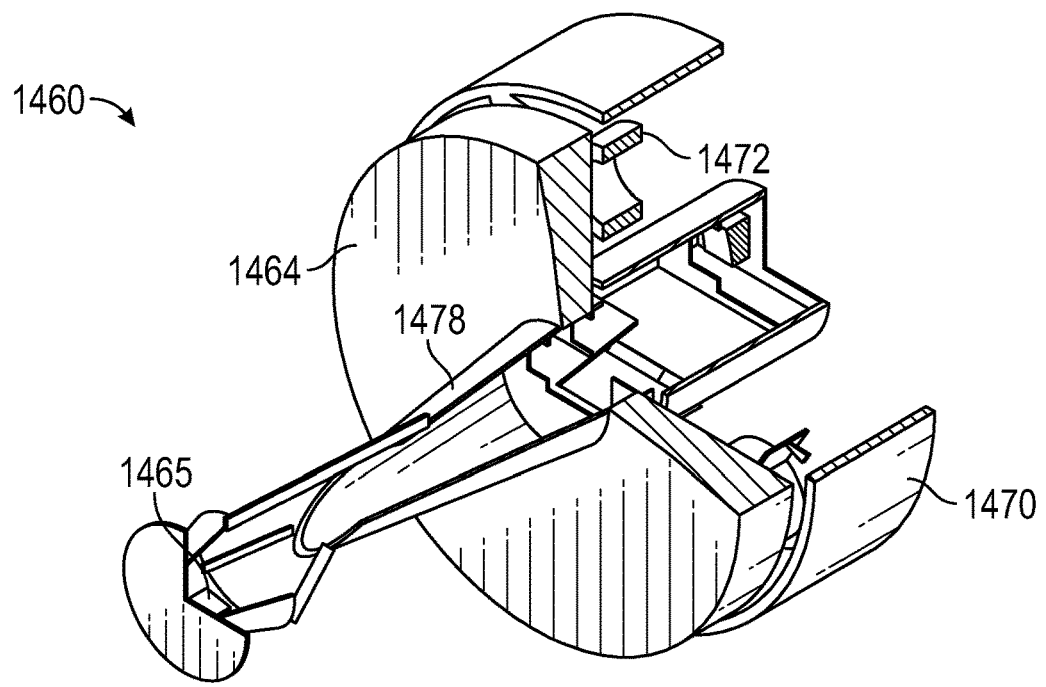

Referring to FIG. 14C, a partial cross-sectional perspective view of an optical system 1460 for cameras is illustrated. A metering structure 1478, shown cone-shaped, maintains a distance between a primary mirror 1464 and a secondary mirror 1465, which may be maintained in some embodiments within ±one micrometer when a temperature of the metering structure 1478 changes by one Celsius degree. The supporting structure 1470, shown as a ring-shaped structure, for the primary mirror 1464 supports a primary mirror kinematic mounting structure 1472 so as to minimize structural distortion that may be induced during assembly. Also, the supporting structure 1470 can be an interface to a satellite BUS. In certain embodiments, the radius of the supporting structure 1470 can be defined by a physical radius from the optical axis of the primary mirror 1464. The inner surface of the ring structure 1470 can be a limit of the specific distance from the optical axis for the image plane 316 described above. A diameter of the primary mirror 1464, which is about 7% of the focal length of the optical system, determines a width and height of the camera system. The length of the camera system is determined by the distance between the secondary mirror 1465 and a tertiary mirror, which is about 4 to 9% of the focal length of the optical system.

Figure 14D:
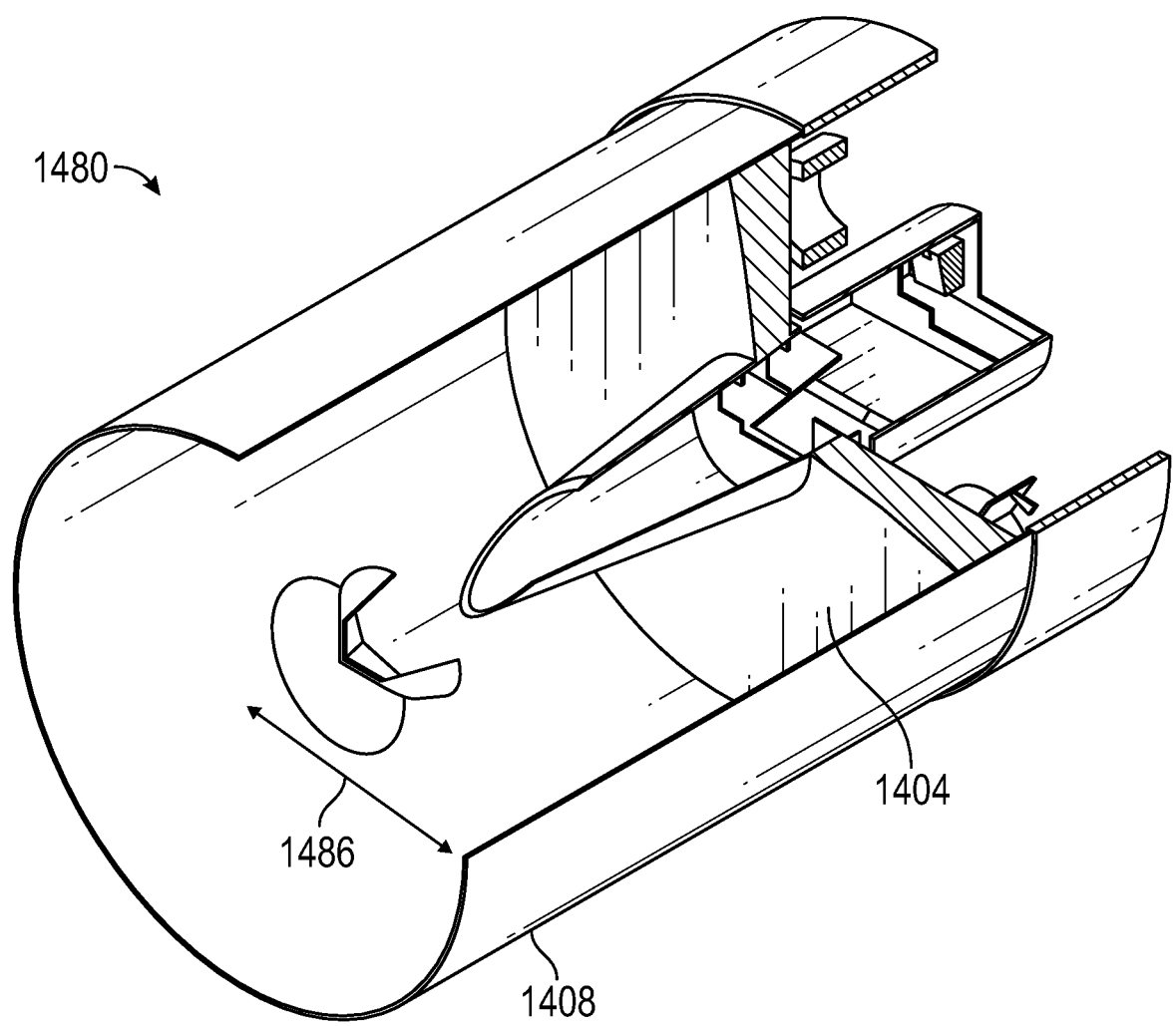

FIG. 14D is a partial cross-sectional perspective view of an optical system 1480 showing the cylindrical housing 1408 having a radius 1486 equal to the radius of the primary mirror 1404. The imaging plane may be located a radial distance from the optical axis that is no more the radius 1486. The housing 1408 may thus also have the same or nearly the same radius as the primary mirror for space savings. The optical axis extends between vertices of the primary and secondary mirrors.

Performance

The performance of the optical system 100 and the optical system 150 was analyzed to assess its design Modulation Transfer Function (MTF), tolerance MTF, and its distortion. Even though MTF and distortion is a way to evaluate optical performance of the system, they also indicate how the quality of resulting images will be. The MTF of panchromatic band is lower than other big camera systems, which cannot be avoided due to its smaller aperture size. Despite the lower MTF values, image quality can be enhanced by post processing on ground and also benefits by having a smaller anti-aliasing effect.

Figure 15A:
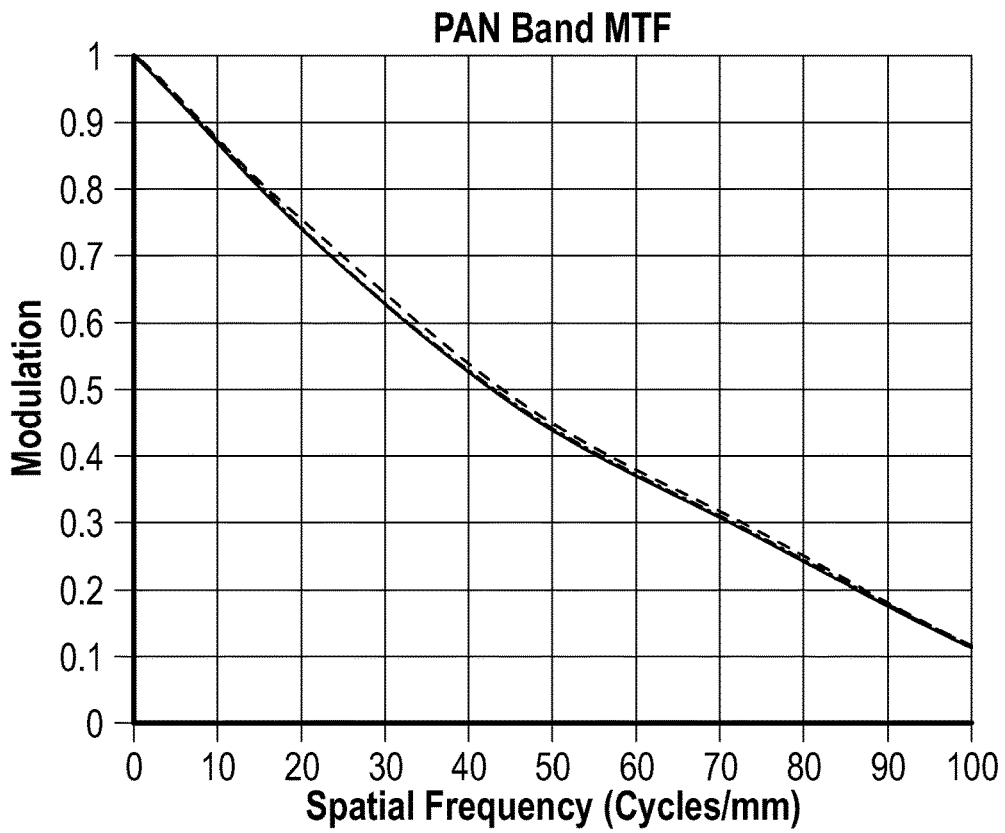
FIGS. 15A-17B are graphical plots showing various embodiments of performance characteristics for the optical system of FIG. 1A.
Figure 15B:
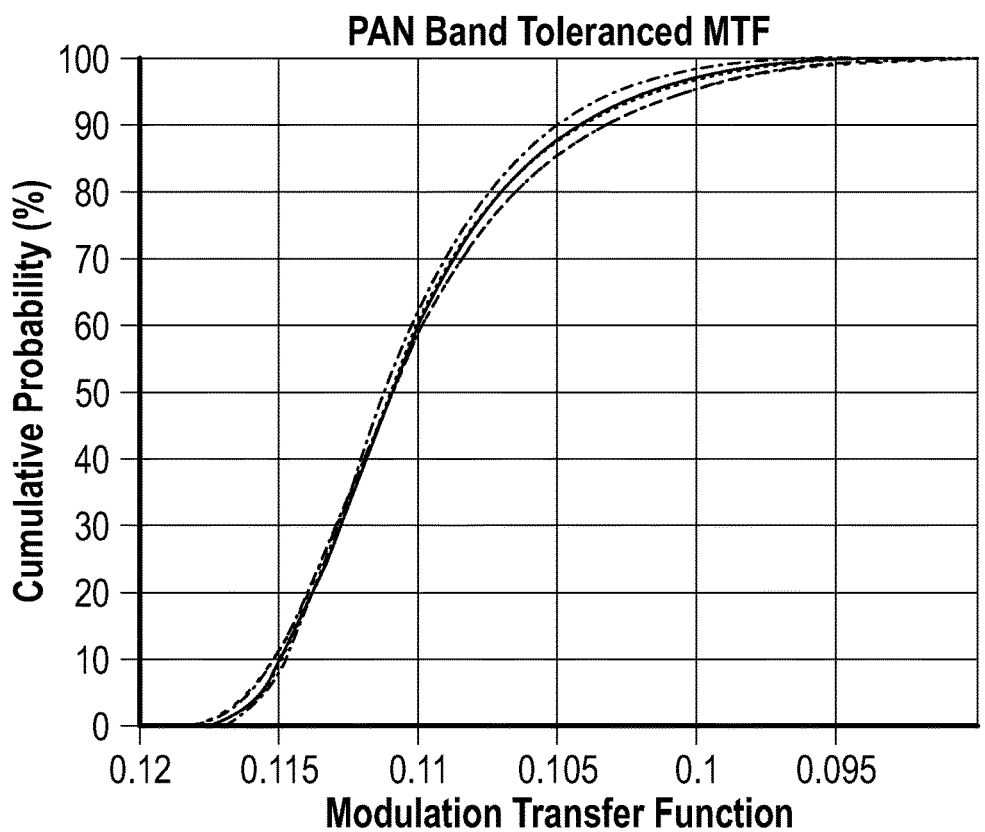

Referring to FIGS. 15A and 15B, the graphs present the optical design MTF and tolerance MTF, respectively, of the panchromatic band for the optical system 100. The Nyquist frequencies at which the MTF values are estimated are 100 mm/cycle for the panchromatic band and 25 mm/cycle for the multispectral bands. For tolerancing, sensitivity of each component is studied with assembly and alignment logics considered.

Figure 16A:
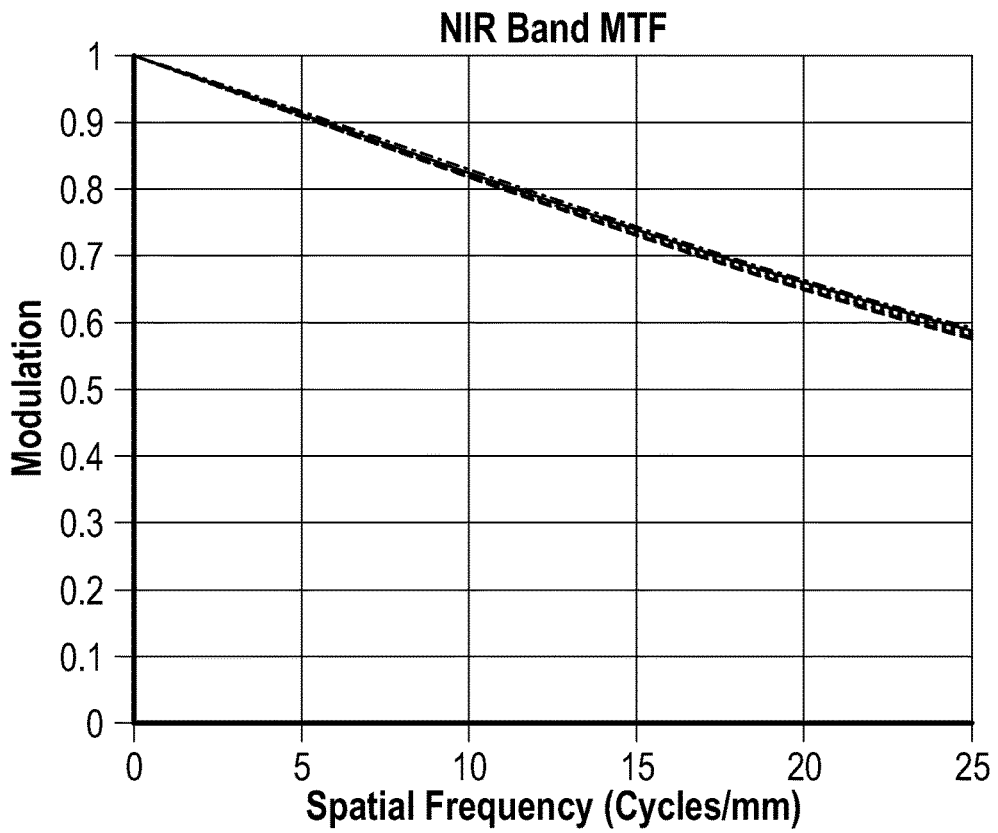
Figure 16B:
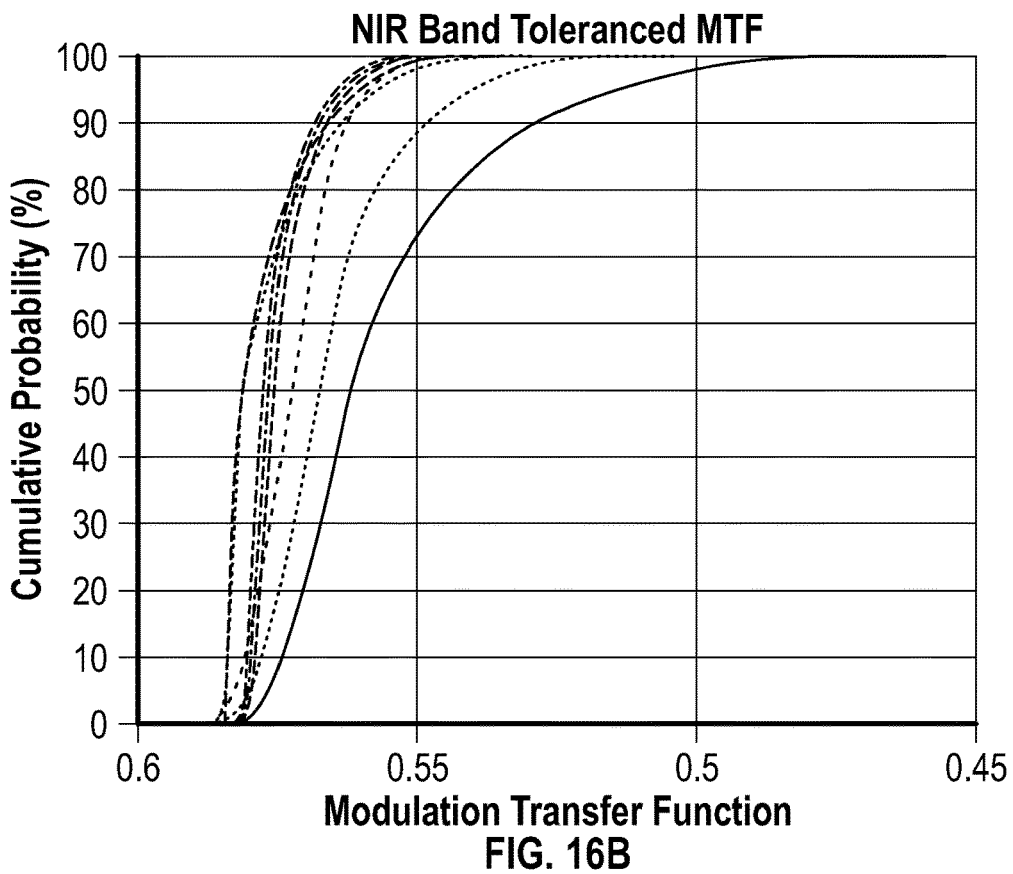
Figure 17A:
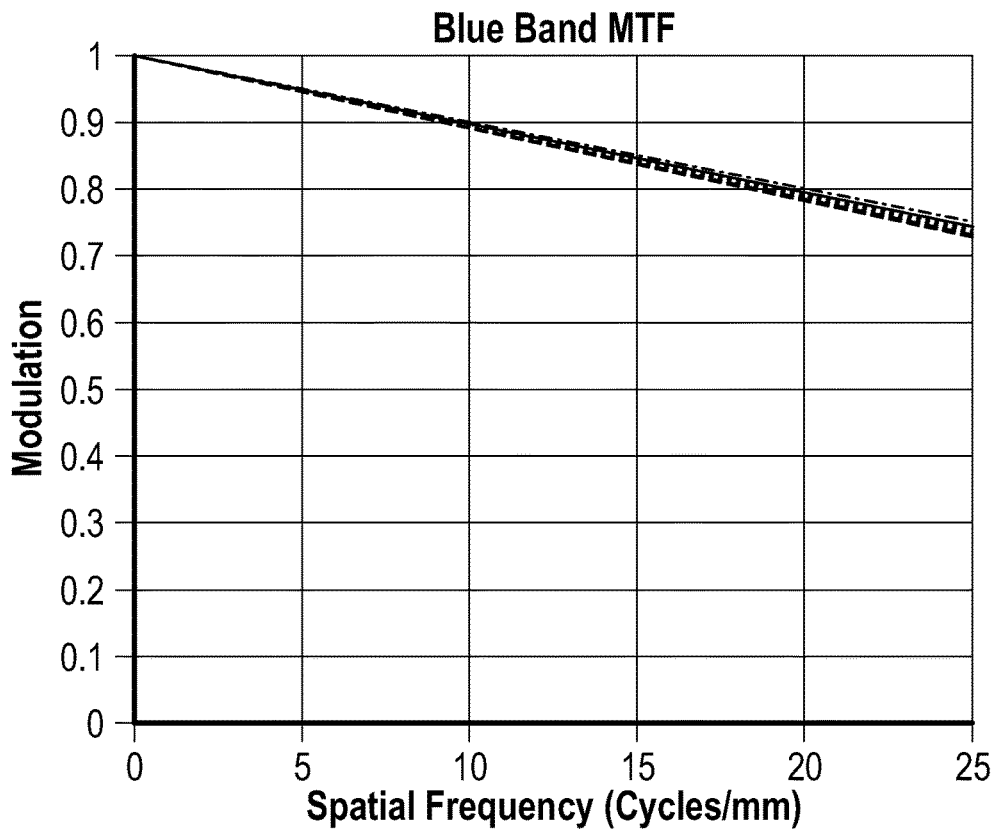
Figure 17B:
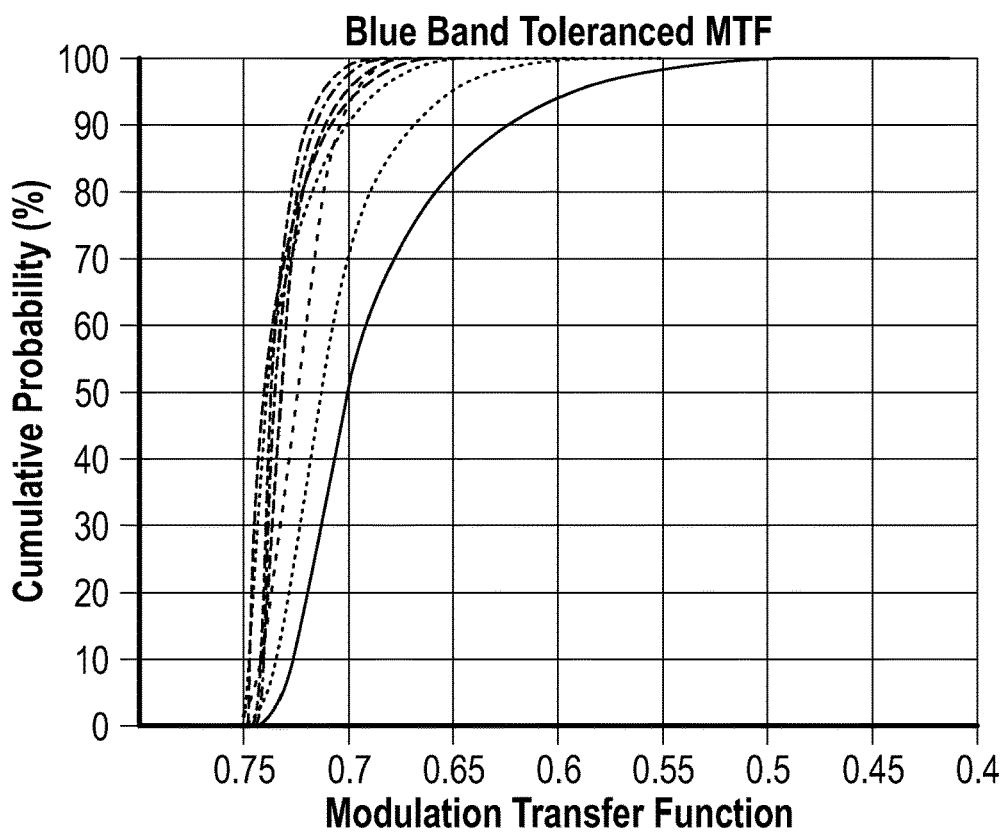

Referring to FIGS. 16A and 16B, the graphs present the optical design MTF and tolerance MTF, respectively, of the near-infrared (NIR) band for the optical system 100. Referring to FIGS. 17A and 17B, the graphs present the optical design MTF and tolerance MTF, respectively, of the blue band for the optical system 100.

The estimated MTF values of optical system 100 are summarized in Table 3. For panchromatic band, the design MTF is higher than 11% and tolerance value is slightly above 10%. For multispectral bands, the design values are greater than 57% and tolerance values are better than 51%. With tolerancing, MTF drop is higher in multispectral bands because those are located away from optical axis with their lower sampling frequency reflected.

TABLE 3

| Spectral bands | Design MTF (%) | Tolerance MTF (%) |
|---|---|---|
| PAN (450~720 nm) | ≥11 | ≥10 |
| NIR (770~890 nm) | ≥57 | ≥51 |
| RED (630~690 nm) | ≥63 | ≥55 |
| GREEN (520~590 nm) | ≥68 | ≥57 |
| BLUE (450~520 nm) | ≥72 | ≥59 |

Figure 18A:
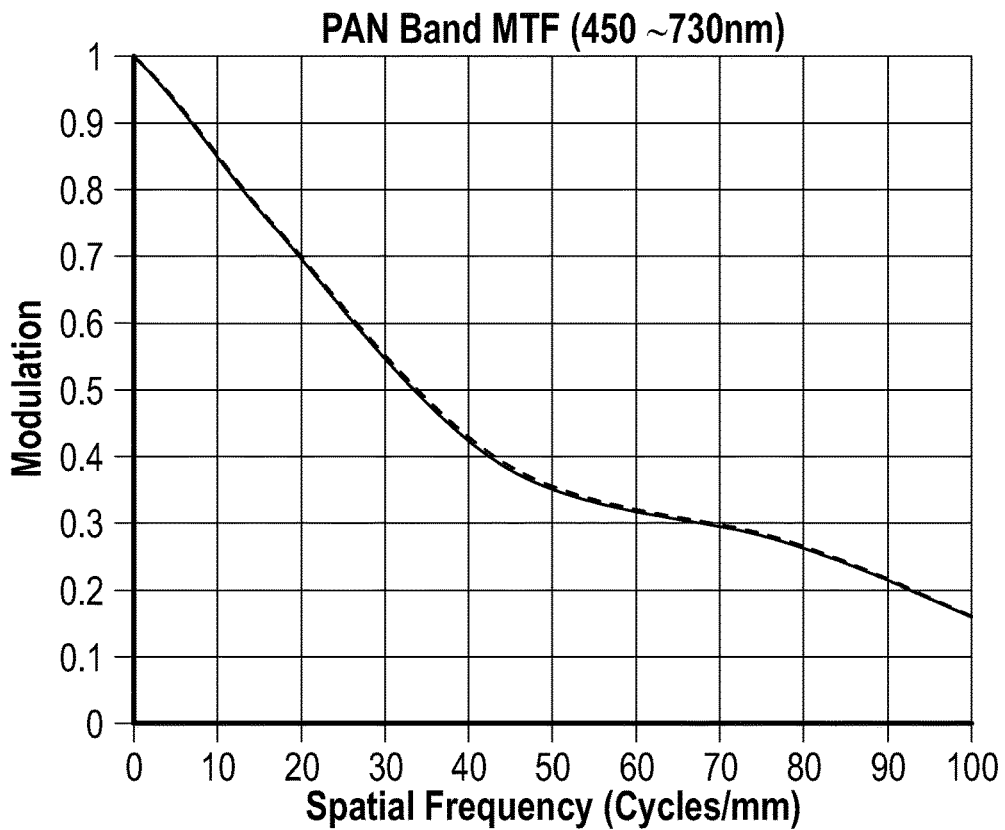
FIGS. 18A-20B are graphical plots showing various embodiments of performance characteristics for the optical system of FIG. 1C.
Figure 18B:
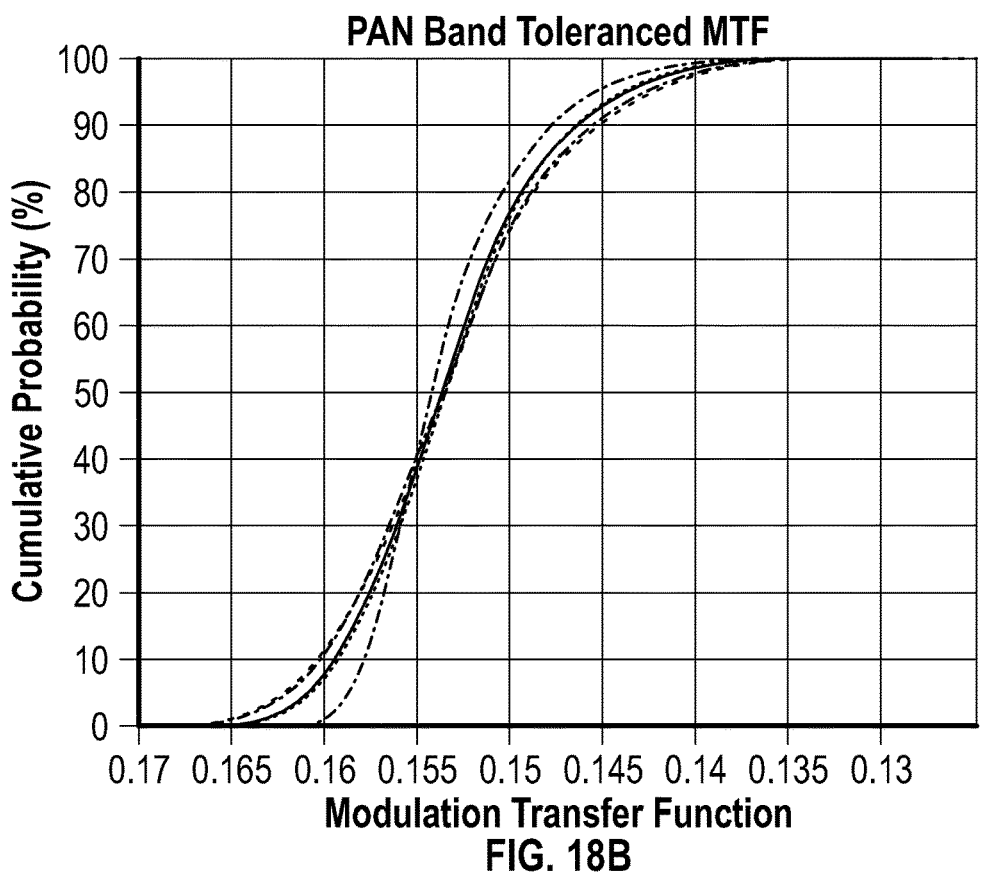

Referring to FIGS. 18A and 18B, the graphs present the analysis results of optical design MTF and tolerance MTF, respectively, of the panchromatic band for the optical system 150. In a similar manner as for the optical system 100, the Nyquist frequencies are 100 mm/cycle for the panchromatic band and 25 mm/cycle for the multispectral bands. Sensitivity of each component was studied and fed into the analysis with assembly and alignment logics considered.

Figure 19A:
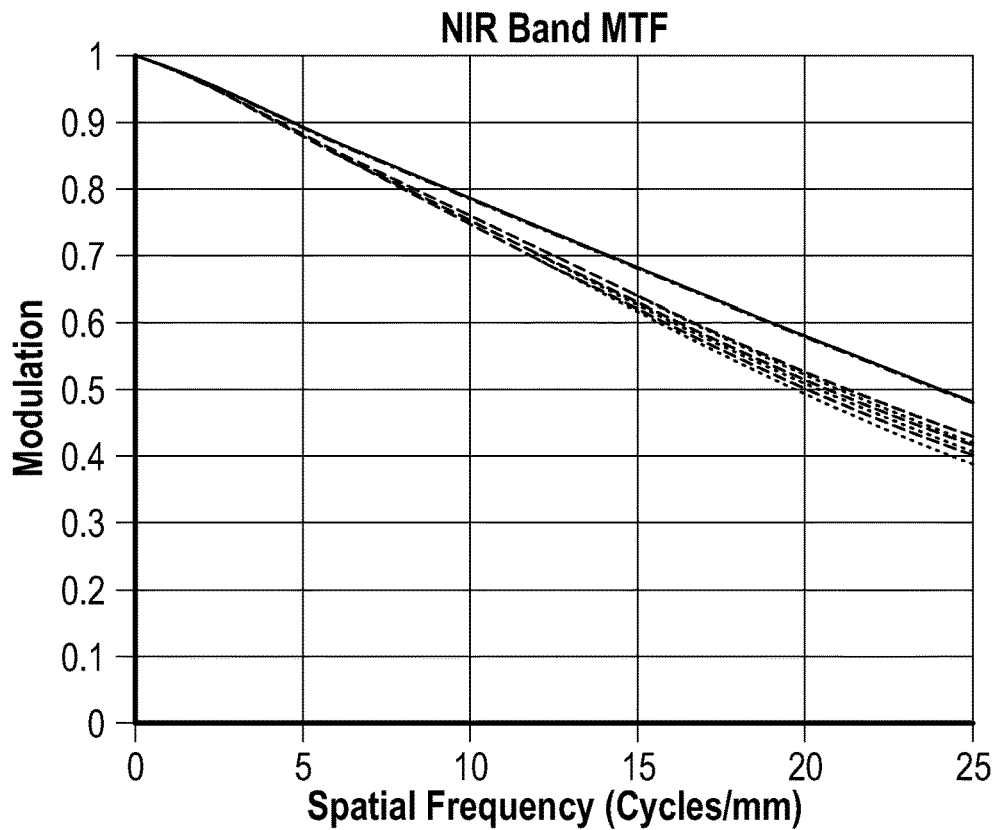
Figure 19B:
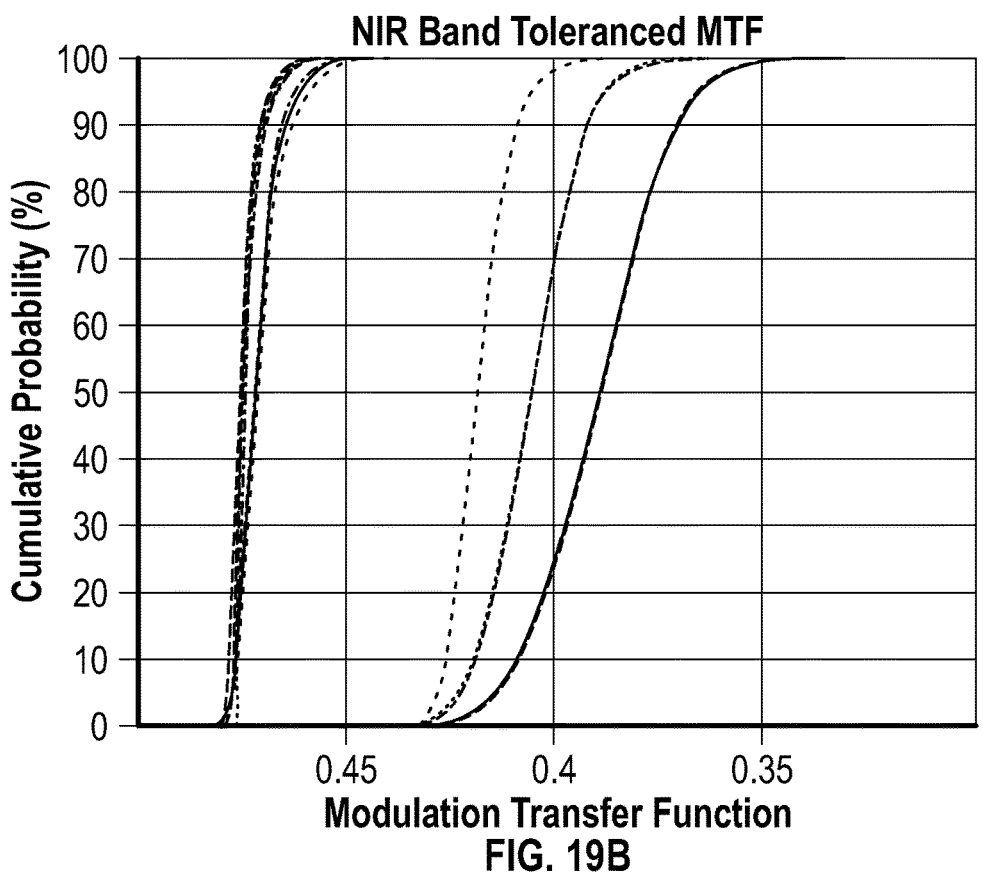
Figure 20A:
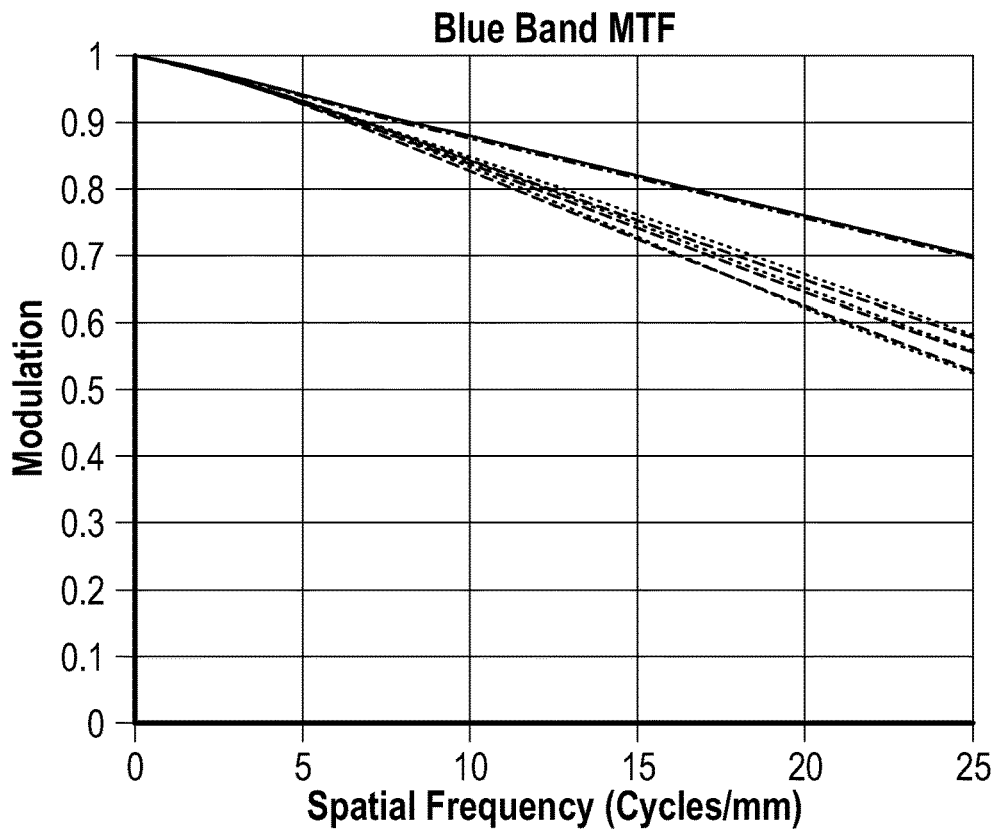
Figure 20B:
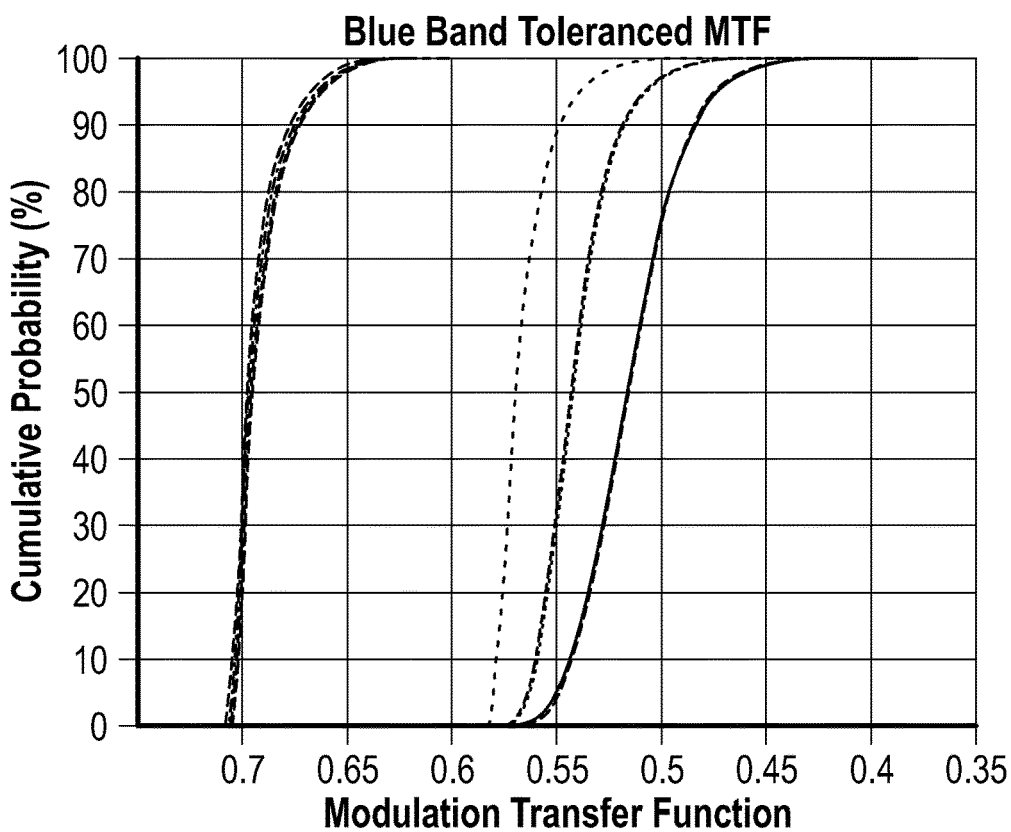

Referring to FIGS. 19A and 19B, the graphs present the optical design MTF and tolerance MTF, respectively, of the NIR band for the optical system 150. Referring to FIGS. 20A and 20B, the graphs present the optical design MTF and tolerance MTF, respectively, of the blue band for the optical system 150.

The estimated MTF values of the optical system 150 are summarized in Table 4. The design MTF of the panchromatic band is higher than 15% and the tolerance value is greater than 14%. For the multispectral bands, the results are different from the optical system 100. Due to the wide field-of-view (FOV) and their location in the FOV, the MTF drops are strange and get much harsher than for the optical system 100. The lowest multispectral MTF value is just above 40% at the outer field and surprisingly at the near-infrared band, which is located closer to optical axis. The tolerance values are managed to be higher than 35%.

TABLE 4

| Spectral bands | Design MTF | Tolerance MTF |
|---|---|---|
| PAN (450~720 nm) | ≥15 | ≥14 |
| NIR (770~890 nm) | ≥40 | ≥35 |
| RED (630~690 nm) | ≥46 | ≥41 |
| GREEN (520~590 nm) | ≥49 | ≥44 |
| BLUE (450~520 nm) | ≥53 | ≥46 |

Figure 21B:
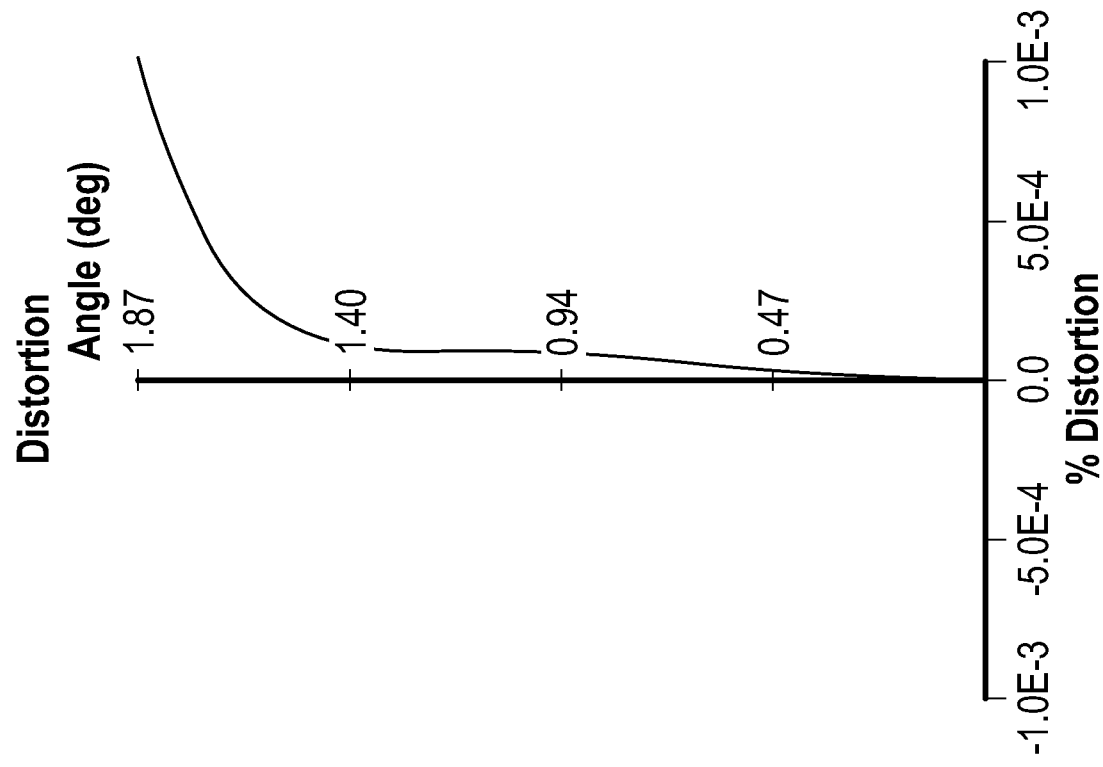
FIGS. 21A and 21B are graphical plots showing distortion performance for, respectively, the optical systems FIGS. 1A and 1C.
Figure 21A:
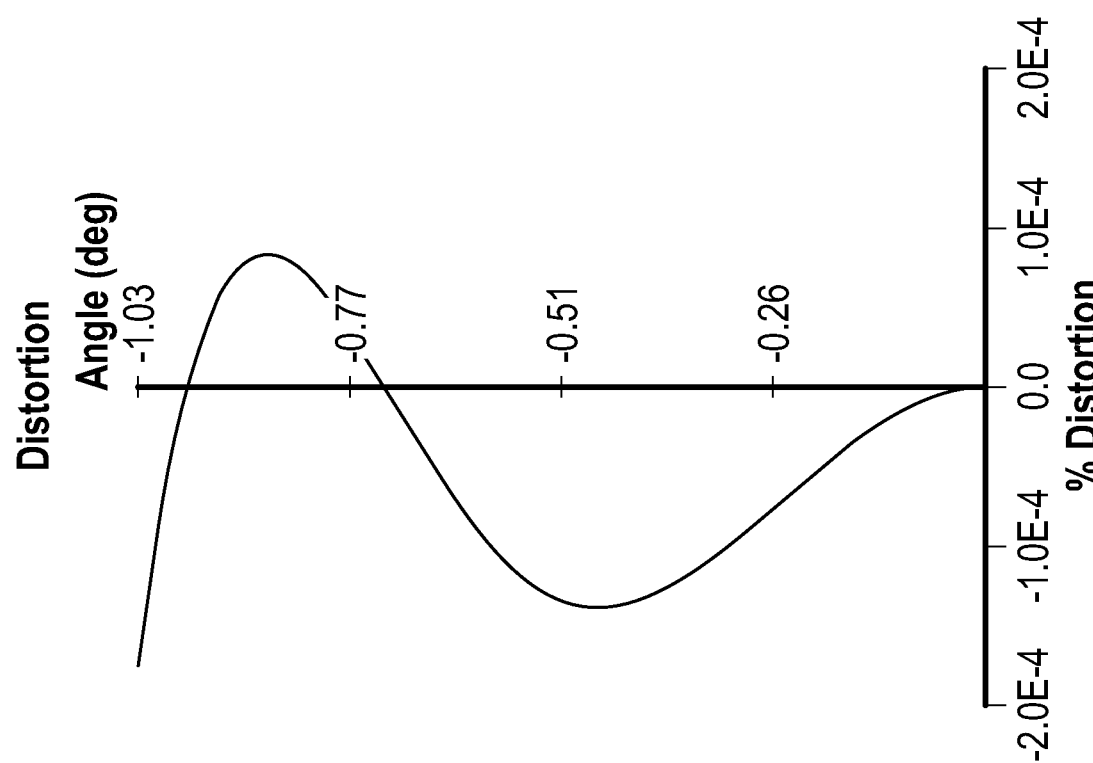

Referring to FIGS. 21A and 21B, the distortion performance of the optical system 100 and the optical system 150, respectively, is illustrated. The distortion magnitude of the optical system 150 is 0.08 micrometer, higher than that of the optical system 100, 0.02 micrometer at the edge, due to its larger field of view. But it should be noted that the distortion magnitudes of both camera systems are still much lower than 1/50 pixels, which leads to enough margin for TDI imaging and indicates much less probability of image quality degradation.

Despite having a small form factor, the optical system 100 has performance better than other camera systems in constellation operation as shown in Table 5. The optical system 100 is designed to have a ground sample distance of 0.9-meter and a swath-width of 10.8 kilometer at 500 kilometer altitude, which are comparable to or better than those of SKYSAT. It should be also highlighted that the optical system 100 can operate a panchromatic band and a near-infrared band simultaneously on the fly, which are optimized compatible with other remote sensing missions and the other cameras identified in Table 5 are lacking.

TABLE 5

| Parameters | Optical system 100 | SKYSAT[12] | BLACKSKY[5] | CARBONITE-2[11] |
|---|---|---|---|---|
| Orbit Altitude (km) | 500 | 500 | 450 | 550 |
| PAN GSD (m) | ≤0.9 | ≤0.9 | ≤1 | ≤1.2 |
| Spectral bands | PAN, RGB, NIR | RGB, NIR | PAN, Color | Color |
| Swath width (nadir, km) | ≤10.8 | ≤8 | ≤6.6 | ≤5.9 |
| Clear Aperture (mm) | ≤195 | ≤350 | ≤240 | ≤250 |
| Length (mm) | ≤300 | — | — | — |
| Video imaging | NA | Available | NA | Available |

The benefits of the optical system 150 over DOVE cameras are better resolution, diverse spectral bands and shorter in axial direction as shown in Table 6. At 500 kilometer altitude, the optical system 150 has a ground sample distance of 1.85 meters, which is half resolution of DOVE or PLANETSCOPE. The optical system 150 can be equipped with the customized spectral bands, which are essential to extract meaningful spectral information.

TABLE 6

| Parameters | Optical system 150 | DOVE or PS2[2] |
|---|---|---|
| Orbit Altitude (km) | 500 | 475 |
| Ground Sample Distance (m) | ≤1.85 | ≤3.7 |
| Spectral bands | PAN, RGB, NIR | Color |
| Swath width (nadir, km) | ≤14.8 | ≤24.6 |
| Clear Aperture (mm) | ≤95 | ≤90 |
| Length (mm) | ≤200 | — |

Advantages

The optical system is based on the 4-mirror all-reflective optical design and is free from chromatic aberration and distortion. Being free from chromatic aberration helps the optical system go beyond the visible spectral range so it can support imaging in the infrared and UV spectral range. Being distortion-free helps the optical system to support TDI imaging in orbit and precision metrics in post-processing.

Some of the prior art, especially the less expensive solutions, still relies heavily on a combination of lenses and mirrors in a catadioptric design, so that limits its application, or its optical design needs be revised from the beginning to adapt to a different spectral range. Furthermore, the catadioptric design does not easily embrace TDI imaging, especially for a wider field of view imaging because of inherent or residual aberrations.

The form factor is smaller compared to bigger, more massive systems of the prior systems. The optical system described herein has a much smaller form factor compared to the prior art. It is quite small so that it can be installed on a small flying object, including CUBESAT, minisatellite, airplane, UAV, drone, or balloon. It can also be onboard flying objects as a secondary or tertiary payload, which helps provide diverse missions or more opportunities for missions. The optical system is small and lightweight so that it helps reduce launch cost and increase the opportunity of a launch compared to the prior art. The benefit stands out when it comes to constellation operation, where launch cost is a driving factor. The optical system can be developed at a lower cost so that it is more affordable than the prior art. In developing the optical system, smaller test equipment and facilities can be used due to the smaller aperture size. Also, the optical system is lightweight, and it can be transported with lower logistics costs.

The developing process of the optical system can be automated more efficiently compared to the prior art. Developing the prior art, which is quite bigger, always mandates labor resources, leading to an increasing budget. For the optical system with its smaller aperture size and being lightweight, iterative or repetitive processes or procedures can be automated, even with affordable equipment. The processes may include optical alignment, optical measurements (such as wavefront error, modulation transfer function, a focal length, a field of view, instantaneous field of view, distortion, signal to noise ratio), and those under various conditions. In addition to the financial benefit, the optical system can sustain stability in operation because of shorter physical distance among mirrors.

The optical system is based on the 4-mirror optical design and provides design flexibility that is backed by a degree of freedom of the optical design. With a minimal modification of the optical design, it can be adapted to provide imaging in the modes of starring, scanning or pushbroom, video, stereo, BRDF (Bidirectional Reflectance Distribution Function), HDR (High Dynamic Range), Polarimetric, or low-light. The optical system, based on the 4-mirror optical design, can support panchromatic, multispectral, hyperspectral, infrared, and UV imaging with minimal design modification, mainly due to different pixel sizes. The optical system has a degree of freedom of optical design and can support super-resolution, high dynamic range, polarimetric, and other remote sensing or scientific imaging.

The optical system can support planetary or deep space missions, which mandates a small form factor for payload selection. The optical system can embrace diverse missions because of its affordability and launch opportunity, which may include AI-based imaging. The optical system can be used for a precision star sensor and a stellar sensor.

The optical system, based on the 4-mirror optical design, can support simultaneous multi-color imaging. It can include, for example, but is not limited to, panchromatic+RGB+near-infrared, visible+infrared (near-infrared, shortwave infrared, mid-wave infrared, or longwave infrared), visible+visible, infrared+infrared, UV+visible, or UV+infrared imaging.

The optical system, being of the small form factor, can be onboard the satellites of a non-imaging mission, like communication satellites (for example, Starlink of SpaceX). The optical system can also be installed on other imaging satellites, quasi-imaging satellites, like SAR mission, or scientific mission satellites. This functionality potentially leads to synchronous or asynchronous constellation operation of the optical system, which enhances the temporal resolution of imaging or increases imaging opportunity. Constellation operation of the prior art tends to mandate substantial fixed cost of expensive satellite and camera system, 24/7 operation of a dedicated control station, and non-automated image-receiving centers. The optical system enables synchronous or asynchronous constellation operations so that the resources for control and data receiving can be distributed, leading to significantly reduced fixed cost.

Additional Embodiments

Figure 22:
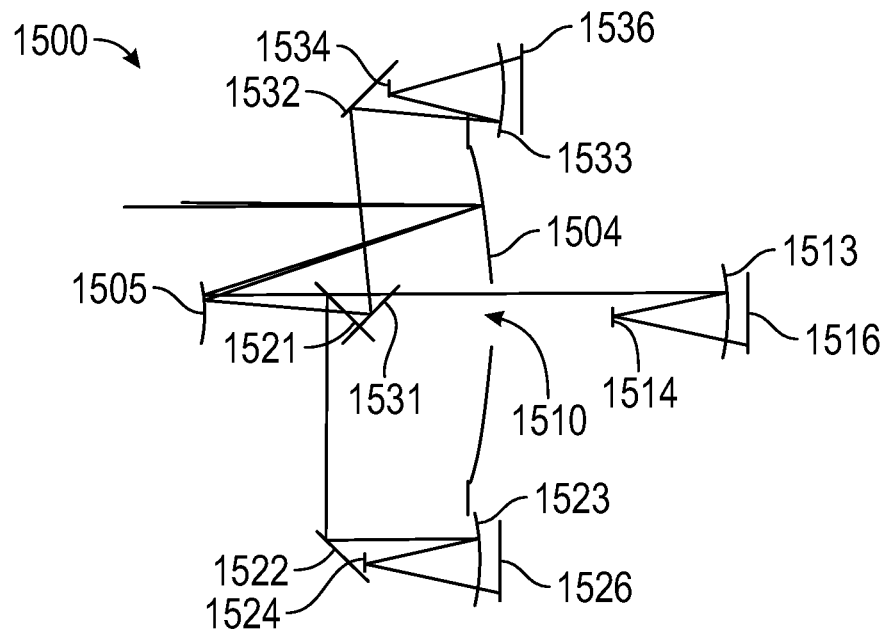
FIG. 22 is a schematic showing an embodiment of a configuration layout for mirrors, including two beam splitters, two folding mirrors, and three imaging planes, that may be used with the various optical systems described herein.

Referring to FIG. 22, a schematic of an embodiment of an all-reflective optical system 1500 is shown. The optical system 1500 may include any or all features of the various four mirror designs described herein with respect to the systems 100 to 1300 (as shown in FIGS. 1A, 1C and 3-13). The optical system 1500 may be further configured for additional multispectral imaging with additional auxiliary mirrors.

The systems 100 to 1300 are designed in certain embodiments for higher resolution imaging in wide spectral bands, including the visible band and near-infrared band. Simultaneously with the visible and near-infrared imaging, the systems 100 to 1300 are capable of moderate resolution imaging in shortwave infrared, midwave infrared, and longwave infrared, when equipped with customized sensors of the pixel size that is tailored to the focal length ratio with respect to the one for visible band imaging. In this perspective, the systems numbered from 100 to 1300 are capable of two spectral-range imaging simultaneously: for example, visible-near infrared and shortwave infrared, visible-near infrared and midwave infrared, shortwave infrared and midwave infrared, midwave infrared and longwave infrared, and etc.

As shown in FIG. 22, the system 1500 may add more spectral ranges than the systems 100 to 1300, using auxiliary mirrors including beam splitters and additional tertiary and quaternary mirrors of a four-mirror system. The optical system 1500 includes a concave primary mirror 1504 having a central aperture 1510, where the primary mirror may have one of a parabolic, non-parabolic conical or aspherical surface. A smaller convex secondary mirror 1505 faces the primary mirror 1504 and has an aspherical surface. A concave tertiary mirror 1513 is arranged behind (behind is with respect to an incoming direction of light), the primary mirror 1504, where the tertiary mirror may have one of a parabolic, non-parabolic conical or aspherical surface. A concave quaternary mirror 1514 is arranged near the central aperture 1510 of the primary mirror 1504, where the quaternary mirror may have one of a spherical, parabolic, non-parabolic conical or aspherical surface. The quaternary mirror 1514 is positioned near the central aperture 1510, facing the tertiary mirror 1513, to accommodate folding mirrors 1522 and 1532 (described below) outside the incident beam radius that is defined by a radius of the primary mirror 1504. The primary mirror 1504, the tertiary mirror 1513 and the quaternary mirror 1514 each have positive power or focal length, and the secondary mirror 1505 has negative power.

An image plane 1516 having one or more aggregated sensors that convert light into electrical signals is positioned behind the primary mirror 1504. In certain embodiments, the image plane 1516 is positioned at a specific distance from an optical axis that is defined by a mechanical symmetry around a line through the vertices of the primary and the secondary mirrors, and line which may define the "optical axis."

The optical system 1500 uses a beam splitter 1521 and 1531 to separate specific spectral ranges of the rays destined for the tertiary mirror 1513. The beam splitters, 1521 and 1531, are positioned between the primary mirror 1504 and the secondary mirror 1505 and have the opposite tilt angles with respect to each other. Each beam splitter may have a tilt angle ranging from 65 to 115 degrees with respect to the optical axis.

Following the beam splitters, 1521 and 1531, tertiary mirrors, 1523 and 1533, and quaternary mirrors, 1524 and 1534, focus light rays to image planes, 1526 and 1536. The image planes, 1526 and 1536, having one or more aggregated sensors that convert light into electrical signals are positioned close to the primary mirror 1504. In certain embodiments, the sets of the auxiliary mirrors, including folding mirrors 1522 and 1532, the tertiary mirrors 1523 and 1533, the quaternary mirrors 1524 and 1534, and the image planes 1526 and 1536 are positioned at a specific distance from and around the optical axis in a circumferential direction.

Light rays impinge upon and are reflected by the primary mirror 1504 first, the secondary mirror 1505 next, the tertiary mirror 1513 thirdly after the rays go through beam splitters 1521 and 1531, and finally the quaternary mirror 1514, so that the rays reach the image plane 1516. The image plane 1516 includes one or more sensors, which may be aggregated in an orderly manner. An entrance pupil of the optical system 1500 may be positioned near the primary or the secondary mirrors 1504, 1505. An intermediate focus is formed around a vertex of the primary mirror 1504, positioned between the primary and the secondary mirrors 1504, 1505, or between the primary mirror 1504 and the tertiary mirror 1513. An exit pupil or Lyot stop may be positioned near the quaternary mirror 1514, between the tertiary and the quaternary mirrors 1513, 1514, or between the quaternary mirror 1514 and the image plane 1516.

For additional multispectral imaging, the rays reflected by the secondary mirror 1505 impinge on the beam splitters, 1521 and 1531 that redirect the rays to the folding mirrors, 1522 and 1532. Then the rays are reflected by the tertiary mirrors, 1523 and 1533, thirdly and finally the quaternary mirrors, 1524 and 1534, so that the rays reach the image planes 1526 and 1536.

With beam splitters, 1521 and 1531, intermediate focuses are formed near the folding mirrors 1522 and 1532. An exit pupil or Lyot stop may be positioned near the quaternary mirrors, 1524 and 1534, between the tertiary mirrors 1523/1533 and the quaternary mirrors 1524/1534, or between the quaternary mirror 1524/1534 and the image plane 1526/1536.

Figure 23:
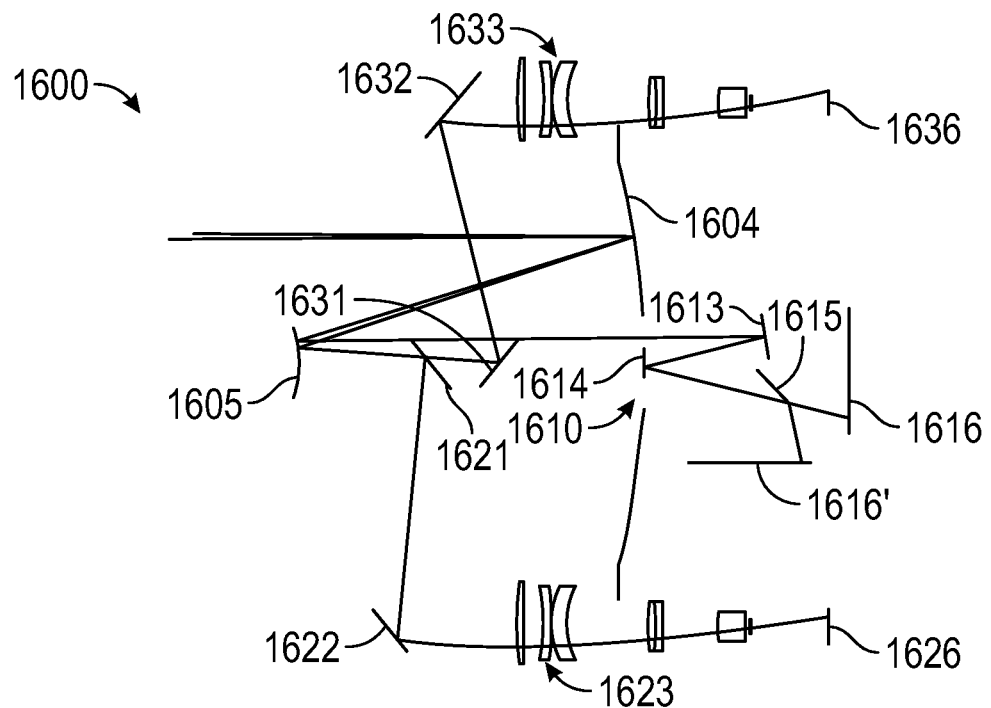

Referring to FIG. 23, a schematic of an embodiment of a cata-dioptric and reflective system 1600 is shown. The optical system 1600 is based on a four mirror design such as the systems numbered from 100 to 1300 and the system 1500. Thus, the baseline design of the system 1600 has a primary mirror 1604, a secondary mirror 1605, a tertiary mirror 1613, a quaternary mirror 1614, a folding or beam splitter 1615, and image planes 1616/1616'. The optical system 1600 is different from the systems 100 to 1300 and 1500 by being capable of additional multispectral imaging with a focal length reducer or optimizer 1623 and 1633 that consists of lenses of spherical or aspherical surfaces.

While the systems 100 to 1300 and the system 1500 are capable of the highest resolution imaging in visible and near-infrared spectral range, the systems utilize customized or tailored sensors to take images simultaneously in shortwave infrared, midwave infrared and longwave infrared.

In contrast, the optical system 1600 is capable of multispectral imaging with off-the-shelf or ready-made sensors, and not customized or tailored pixel sensors. To accomplish this, the system 1600 has a series of splitting mirrors that separate the rays of a specific spectral range and then transmit or reflect them.

The optical system 1600 includes a concave primary mirror 1604 having a central aperture 1610, where the primary mirror may have one of a parabolic, non-parabolic conical or aspherical surface. A smaller convex secondary mirror 1605 faces the primary mirror 1604 and has an aspherical surface. A concave tertiary mirror 1613 is arranged behind (behind is with respect to an incoming direction of light) the primary mirror 1604, where the tertiary mirror may have one of a parabolic, non-parabolic conical or aspherical surface. A concave quaternary mirror 1614 is arranged near the central aperture 1610 of the primary mirror 1604, where the quaternary mirror may have one of a spherical, parabolic, non-parabolic conical or aspherical surface. The quaternary mirror 1614 is positioned near the central aperture 1610, facing the tertiary mirror 1613, to accommodate folding mirrors 1622 and 1632 (described below) outside the incident beam radius that is defined by a radius of the primary mirror 1604. The primary mirror 1604, the tertiary mirror 1613 and the quaternary mirror 1614 each have positive power or focal length, and the secondary mirror 1605 has negative power.

An image plane 1616 having one or more aggregated sensors that convert light into electrical signals is positioned behind the primary mirror 1604. In certain embodiments, the image plane 1616 is positioned at a specific distance from an optical axis that is defined by a mechanical symmetry around a line through the vertices of the primary and the secondary mirrors, and which line may define the "optical axis."

The optical system 1600 uses beam splitters 1621 and 1631 to separate specific spectral ranges of the rays destined for the tertiary mirror 1513. The beam splitters, 1621 and 1631, are positioned between the primary mirror 1604 and the secondary mirror 1605 and have opposite tilt angles with respect to each other. Each splitter may have a tilt angle ranging from 65 to 115 degrees with respect to the optical axis.

Following the beam splitters 1621 and 1631, groups of lenses 1623 and 1633 focus light rays to the image planes 1626 and 1636. In certain embodiments, the groups of lenses 1623 and 1633 with the image planes 1626 and 1636 are positioned at a specific distance from and around the optical axis in a circumferential direction.

The groups of lenses, 1623 and 1633, act as focal length optimizers to adjust and optimize the focal lengths to match its optical resolution to the pixel size of an off-the shelf or ready-made sensor. In certain embodiments, the focal length of the first lens group 1623 may be different from the focal length of the second lens group 1633. For space applications, the lenses in 1623 and 1633 are radiation hardened or resistant; for aerial application, commercial lenses are used in combination with radiation resistant lenses for best performance. For CTE matching with lens materials, a combination of titanium, ceramics, aluminum, Kovar®, and designed composite structures are manufactured by additive manufacturing technology.

In some embodiments, light rays impinge upon and are reflected by the primary mirror 1604 first, the secondary mirror 1605 next, the tertiary mirror 1613 thirdly after the rays go through beam splitters 1621 and 1631, and finally the quaternary mirror 1614, so that the rays reach the image plane 1616. The image plane 1616 includes one or more sensors, which may be aggregated in an orderly manner. An entrance pupil of the optical system 1600 may be positioned near the primary or the secondary mirrors 1604, 1605. An intermediate focus is formed around a vertex of the primary mirror 1604, positioned between the primary and the secondary mirrors 1604, 1605, or between the primary mirror 1604 and the tertiary mirror 1613. An exit pupil or Lyot stop may be positioned near the quaternary mirror 1614, between the tertiary and the quaternary mirrors 1613, 1614, or between the quaternary mirror 1614 and the image plane 1616.

For additional multispectral imaging, the rays reflected by the secondary mirror 1605 impinge on the beam splitters, 1621 and 1631 that redirect the rays to folding mirrors 1622 and 1632. Then the rays go through the focal length optimizer 1623 and 1633 and reach the image planes 1626 and 1636.

With the beam splitters, 1621 and 1631, intermediate focuses are formed near the folding mirrors 1622 and 1632. An exit pupil or Lyot stop may be positioned in the lens group 1623 and 1633, before the image plane 1626/1636.

Figure 24:
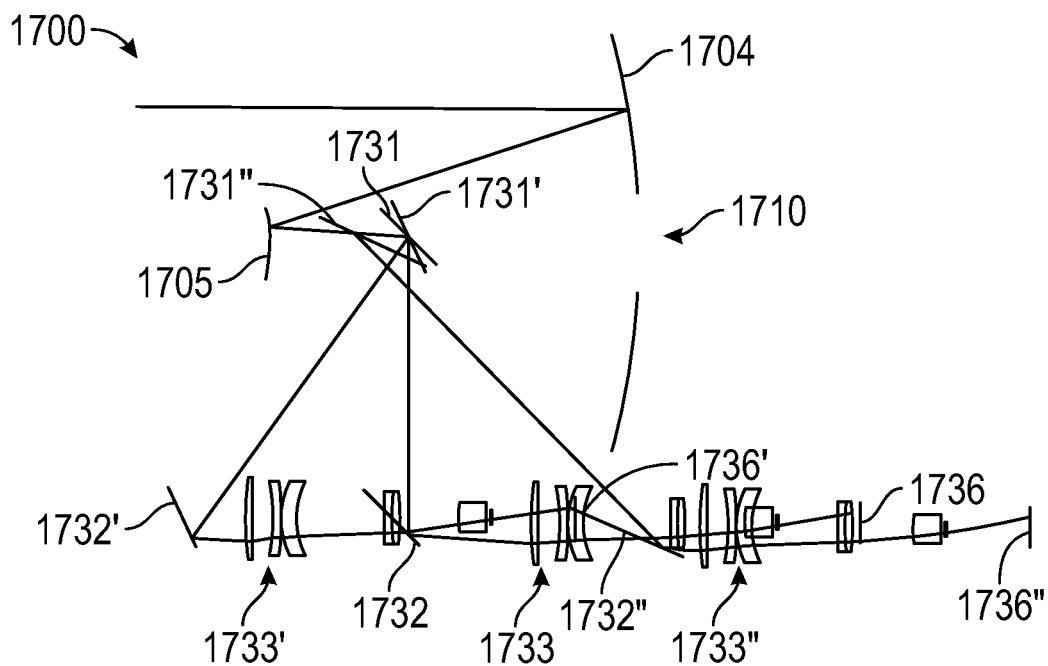

Referring to FIG. 24, a schematic of another embodiment of a cata-dioptric and reflective system 1700 is shown. The optical system 1700 includes a primary mirror 1704, a secondary mirror 1705, a tertiary mirror 1713 (not shown for simplicity), a quaternary mirror 1714 (not shown for simplicity), and an image plane 1716 (not shown for simplicity). The primary mirror 1704, the secondary mirror 1705, the tertiary mirror 1713, the quaternary mirror 1714 and the image plane 1716 may have the same or similar features and/or functions as, respectively, the primary mirror 1604, the secondary mirror 1605, the tertiary mirror 1613, the quaternary mirror 1614 and the image plane 1616 of the optical system 1600, and vice versa.

For additional multispectral imaging, the optical system 1700 includes a focal length optimizer 1733, 1733' or 1733" to match its optical resolution to the pixel size of an off-the shelf or ready-made sensor. The focal length optimizers, 1733, 1733' and 1733" may have the same or similar features and/or functions as the focal length optimizer 1623 and 1633 of the optical system 1600, and vice versa.

The focal length optimizers can be positioned to have a tilt angle ranging 65 to 115 degrees with respect to an "optical axis," which may be defined by a mechanical symmetry around a line through the vertices of the primary and the secondary mirrors, and which line may define the "optical axis". Adjusting a position and a tilt angle of beam splitters 1731, 1731' or 1731", a series of beam splitters may be placed along the optical axis so that additional multispectral imaging may be possible. The beam splitters may be positioned to have a tilt angle ranging 65 to 115 degrees with respect to the optical axis. After the beam splitters, folding mirrors 1732, 1732' and 1732" direct the rays through the focal length optimizers 1733, 1733', and 1733" and reach image planes 1736, 1736' and 1736".

Figure 25:
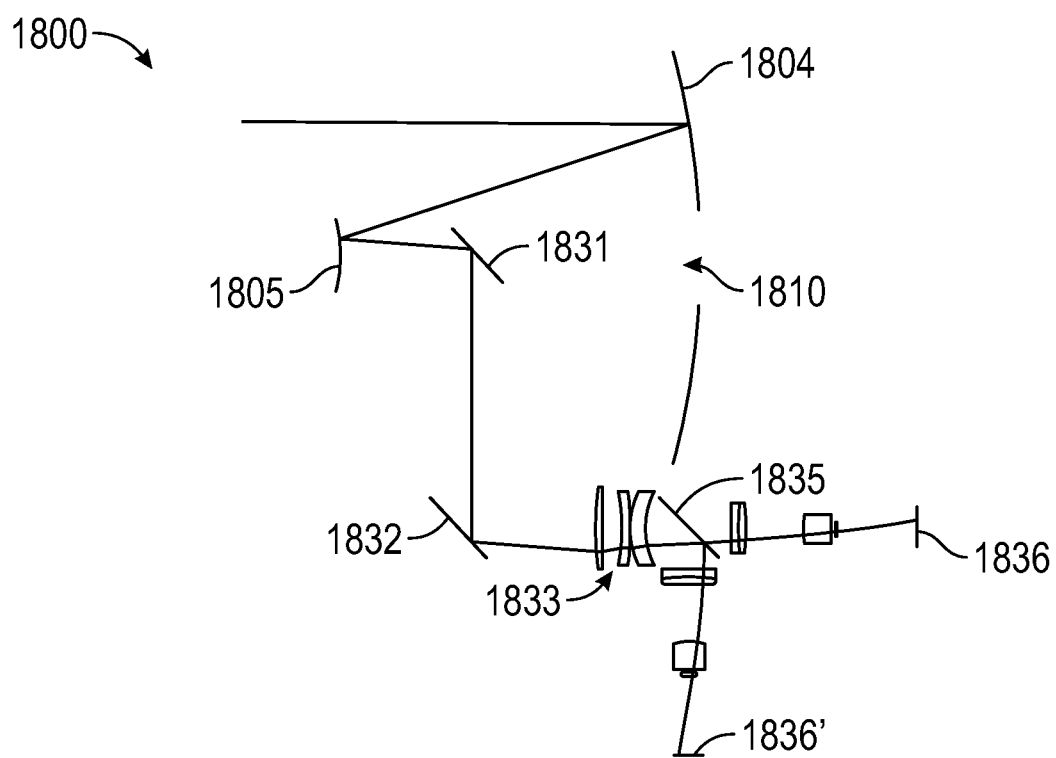

Referring to FIG. 25, a schematic of another embodiment of a cata-dioptric and reflective system 1800 is shown. The optical system 1800 includes a primary mirror 1804, a secondary mirror 1805, a tertiary mirror (not shown for clarity), a quaternary mirror (not shown for clarity), and an image plane (not shown for clarity). The primary mirror 1804, the secondary mirror 1805, the tertiary mirror, the quaternary mirror and the image plane may have the same or similar features and/or functions as, respectively, the primary mirror 1604, the secondary mirror 1605, the tertiary mirror 1613, the quaternary mirror 1614 and the image plane 1616 of the optical system 1600, and vice versa.

For additional multispectral imaging, the optical system 1800 includes a focal length optimizer 1833 to match its optical resolution to the pixel size of an off-the shelf or ready-made sensor. The focal length optimizer 1833 may have the same or similar features and/or functions as the focal length optimizer 1623 and 1633 of the optical system 1600, and vice versa.

The focal length optimizers can be positioned to have a tilt angle ranging 65 to 115 degree with respect to the "optical axis," which may be defined by a mechanical symmetry around a line through the vertices of the primary and the secondary mirrors, and which line may define the "optical axis." Adjusting a position and a tilt angle of a beam splitter 1831 and a folding mirror 1832, one or more beam splitters may be placed along the optical axis so that additional multispectral imaging may be possible. The beam splitter may be positioned to have a tilt angle ranging 65 to 115 degrees with respect to the optical axis.

However, the focal length optimizer 1833 is different from the focal length optimizers 1623 and 1633 of the optical system 1600 in that the focal length optimizer 1833 has an additional branch of lenses to further separate spectral range from the rays going through the focal length optimizer 1833. In an embodiment, another beam splitter 1835 is placed in the focal length optimizer 1833 and enables additional multispectral imaging simultaneously. Such a separation may be applied to visible 1 vs visible 2, visible vs near-infrared, shortwave infrared 1 vs 2, midwave infrared 1 vs 2, longwave infrared 1 vs 2, etc., but the application is not limited to the specified examples herein. At the end of each branch of lenses of the focal length optimizer 1833, there is an image plane 1826 and 1836'.

In another embodiment, the focal length optimizer 1833 may be different from the focal length optimizers 1623 and 1633 of the optical system 1600 in that, instead of a beam splitter, the focal length optimizer 1833 may utilize a reflective polarizer 1835 that separates s-polarized rays from p-polarized rays. With the reflective polarizer 1835, polarimetric imaging is possible for each spectral band.

Figure 26A:
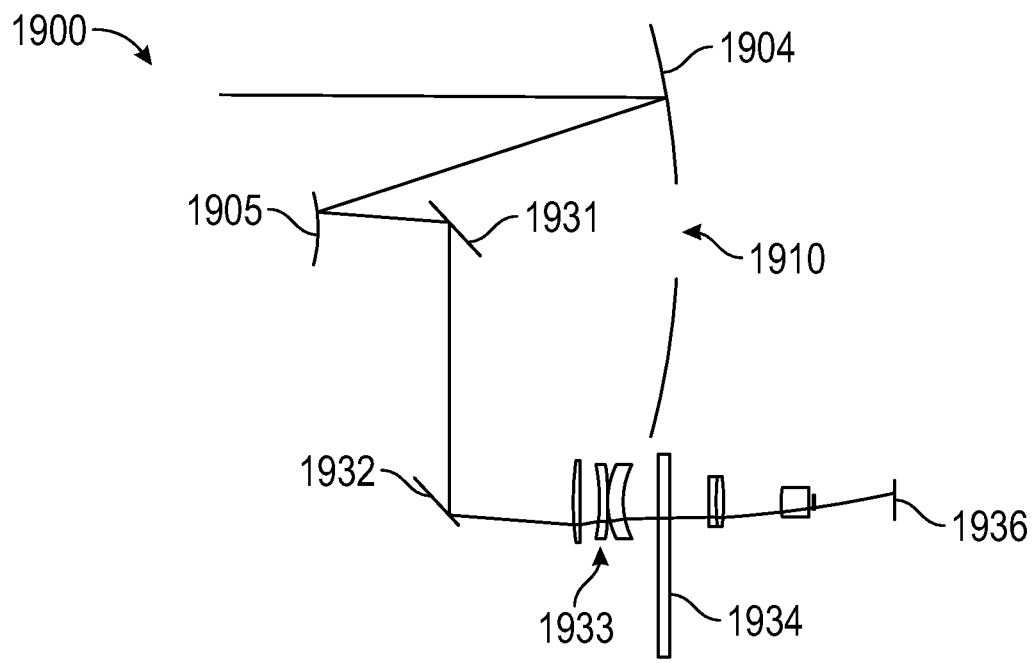
Figure 26B:
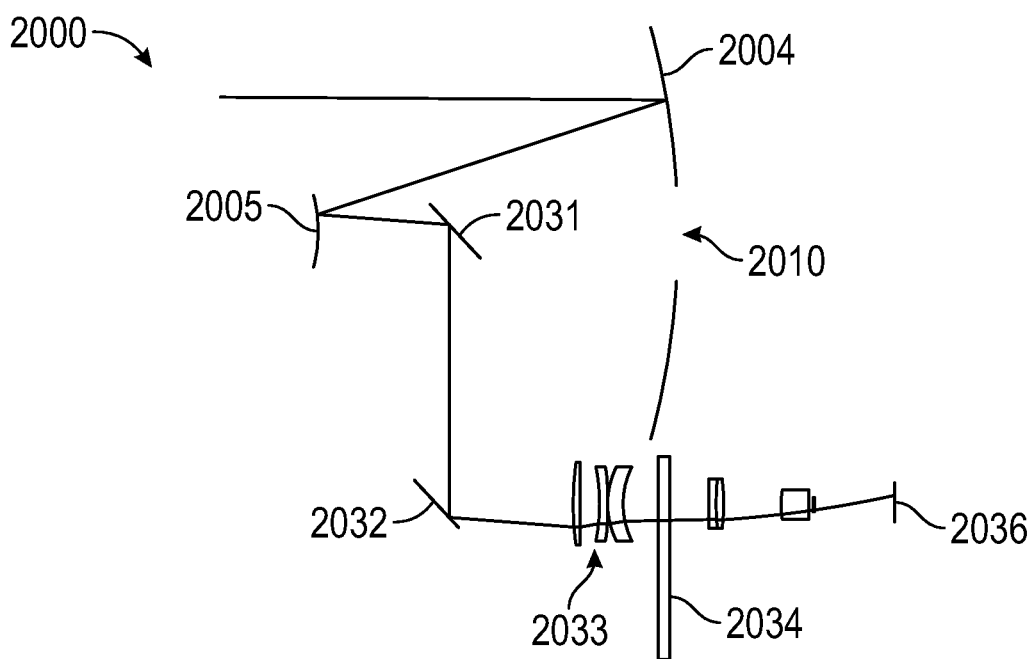

Referring to FIGS. 26A and 26B, schematics of other embodiments of a cata-dioptric and reflective system 1900 and 2000, respectively, are shown. The optical systems 1900 and 2000 include, respectively, primary mirrors 1904/2004, secondary mirrors 1905/2005, tertiary mirrors (not shown for clarity), quaternary mirrors (not shown for clarity), and image planes (not shown for clarity). The primary mirrors 1904/2004, the secondary mirrors 1905/2005, the tertiary mirrors, the quaternary mirrors, and the image planes may have the same or similar features and/or functions as, respectively, the primary mirror 1604, the secondary mirror 1605, the tertiary mirror 1613, the quaternary mirror 1614 and the image plane 1616 of the optical system 1600, and vice versa.

For additional multispectral imaging, the optical systems 1900/2000 includes focal length optimizers 1933/2033 respectively, to match its optical resolution to the pixel size of off-the shelf or ready-made sensors. The focal length optimizers 1933/2033 may have the same or similar features and/or functions as the focal length optimizers 1623 and 1633 of the optical system 1600, and vice versa.

The focal length optimizers can be positioned to have a tilt angle ranging 65 to 115 degree with respect to an "optical axis," which may be defined by a mechanical symmetry around a line through the vertices of the primary and the secondary mirrors, and which line may define the "optical axis." Adjusting a position and a tilt angle of beam splitters 1931/2031 and folding mirrors 1932/2032 respectively, a series of beam splitters may be placed along the optical axis so that additional multispectral imaging may be possible. The beam splitters 1931/2031 may be positioned to have a tilt angle ranging 65 to 115 degrees with respect to the optical axis. After the beam splitters 1931/2031, folding mirrors 1932/2032 direct the rays through the focal length optimizers 1933/2033 to reach image planes 1936/2036.

However, the focal length optimizers 1933/2033 are different from focal length optimizers 1623 and 1633 in that the focal length optimizers 1933/2033 have filter wheels or sliders to use spectral filters or calibration targets.

The filter wheels or sliders may have narrow-band spectral filters within the spectral range that is defined by the beam splitter 1931.

The filter wheels or sliders 2034 may have calibration targets that may include transmitting or diffusive targets at a different transmission level or reflectance, respectively. For the diffusive targets, a set of spectral diodes may be a reference light source and installed on the lens barrel in a circumferential direction.

Figure 27A:
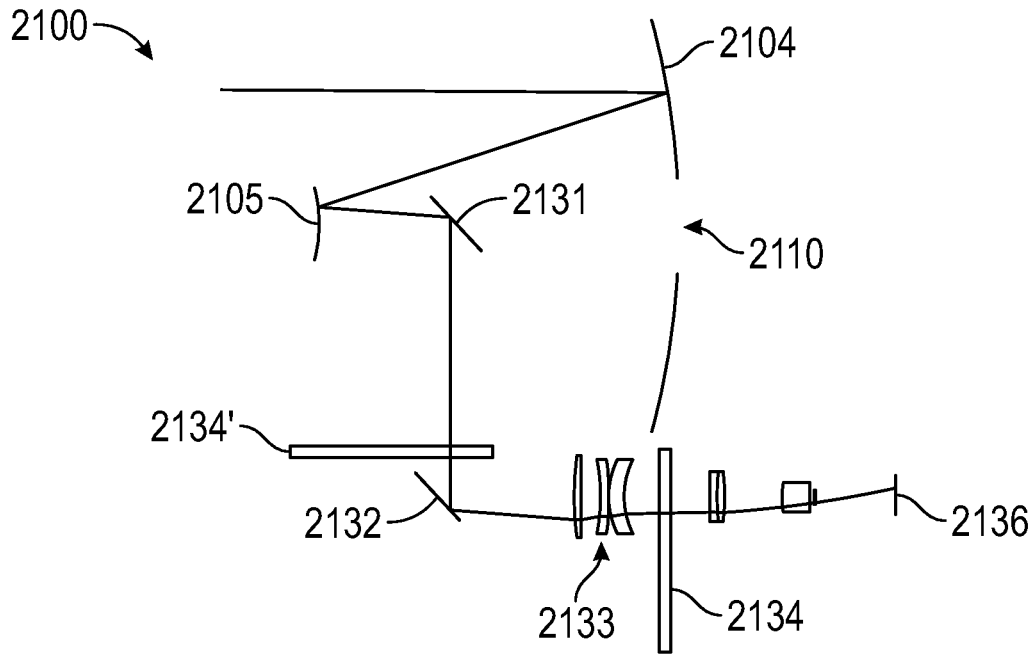
Figure 27B:
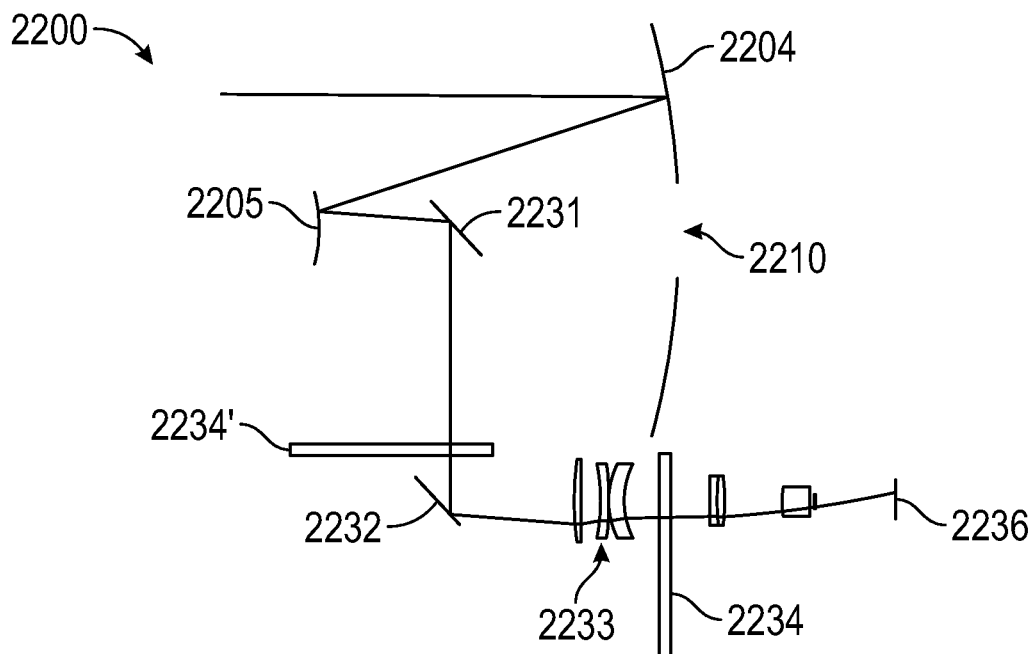

Referring to FIGS. 27A and 27B, schematics of other embodiments of a cata-dioptric and reflective system 2100 and 2200, respectively, are shown. The optical systems 2100 and 2200 include, respectively, primary mirrors 2104/2204, secondary mirrors 2105/2205, tertiary mirrors (not shown for clarity), quaternary mirrors (not shown for clarity), and image planes (not shown for clarity). The primary mirrors 2104/2204, the secondary mirrors 2105/2205, the tertiary mirrors, the quaternary mirrors, and the image planes may have the same or similar features and/or functions as, respectively, the primary mirror 1604, the secondary mirror 1605, the tertiary mirror 1613, the quaternary mirror 1614 and the image plane 1616 of the optical system 1600, and vice versa.

For additional multispectral imaging, the optical systems 2100/2200 includes focal length optimizers 2133/2233 respectively, to match its optical resolution to the pixel size of off-the shelf or ready-made sensors. The focal length optimizers 2133/2233 may have the same or similar features and/or functions as the focal length optimizers 1623 and 1633 of the optical system 1600, and vice versa.

The focal length optimizers can be positioned to have a tilt angle ranging 65 to 115 degree with respect to an "optical axis," which may be defined by a mechanical symmetry around a line through the vertices of the primary and the secondary mirrors, and which line may define the "optical axis." Adjusting a position and a tilt angle of beam splitters 2131/2231 and folding mirrors 2132/2232, respectively, a series of beam splitters may be placed along the optical axis so that additional multispectral imaging may be possible. The beam splitters 2131/2231 may be positioned to have a tilt angle ranging 65 to 115 degrees with respect to the optical axis. After the beam splitters 2131/2231, folding mirrors 2132/2232 direct the rays through the focal length optimizers 2133/2233 to reach image planes 2136/2236.

However, the focal length optimizers 2133/2233 are different from the focal length optimizers 1623 and 1633 in that the focal length optimizers 2133/2233 have filter wheels or sliders 2134/2234 to use polarizers or hyperspectral filters.

The filter wheel or slider 2134 or 2134' may include polarizers at 0, 45, 90, 135 degrees or at other polarization angles for polarimetric imaging. In certain embodiments, the filter wheel or slider 2134' may be located between the beam splitter 2131 and folding mirror 2132.

The filter wheel or slider 2234 may include a Fabry Perot interferometer for hyperspectral imaging, or the filter wheel or slider 2234' may include a linear variable filter for hyperspectral imaging. In certain embodiments, the filter wheel or slider 2234' may be located between the beam splitter 2231 and folding mirror 2232.

Figure 28A:
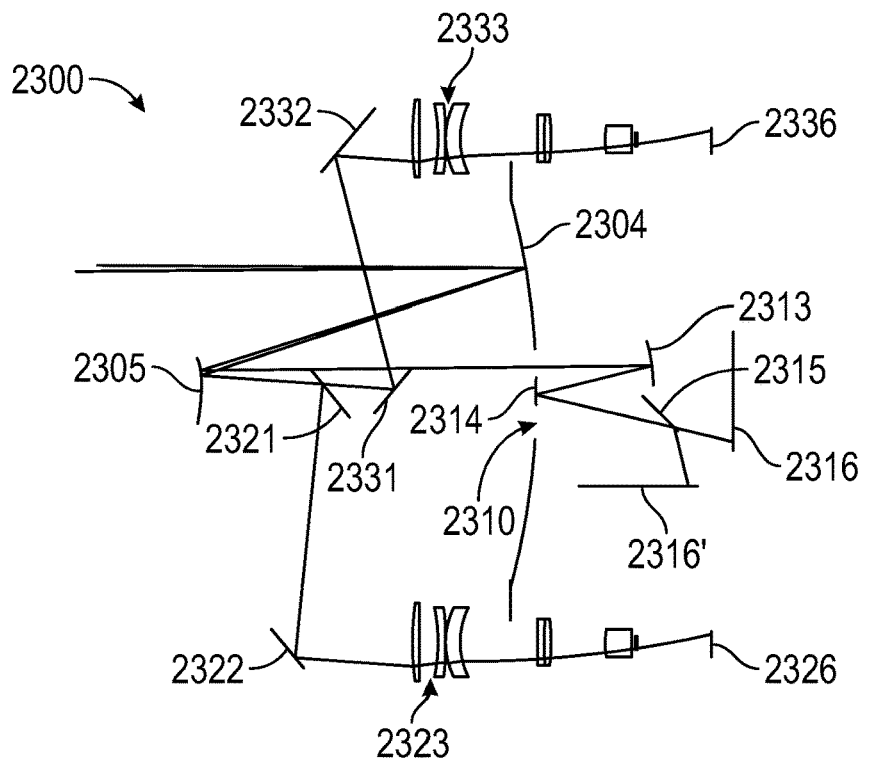

Referring to FIG. 28A, a schematic of another embodiment of a cata-dioptric and reflective system 2300 is shown. The optical system 2300 includes a primary mirror 2304, a secondary mirror 2305, a tertiary mirror 2313, a quaternary mirror 2314, a folding mirror or beam splitter 2315, and image planes 2316/2316'. The primary mirror 2304, the secondary mirror 2305, the tertiary mirror 2313, the quaternary mirror 2314, the folding mirror/beam splitter 2315, and the image planes 2316/2316' may have the same or similar features and/or functions as, respectively, the primary mirror 1604, the secondary mirror 1605, the tertiary mirror 1613, the quaternary mirror 1614, the folding mirror/beam splitter 1615, and the image planes 1616/1616' of the optical system 1600, and vice versa.

For additional multispectral imaging, the optical system 2300 includes focal length optimizers 2323/2333 respectively, to match its optical resolution to the pixel size of off-the shelf or ready-made sensors. The focal length optimizers 2323/2333 may have the same or similar features and/or functions as the focal length optimizer 1623 and 1633 of the optical system 1600, and vice versa.

The focal length optimizers can be positioned to have a tilt angle ranging 65 to 115 degree with respect to the An "optical axis" may be defined by a mechanical symmetry around a line through the vertices of the primary and the secondary mirrors, and which line may define the "optical axis." Adjusting a position and a tilt angle of beam splitters 2321/2331 and folding mirrors 2322/2332 respectively, a series of beam splitters may be placed along the optical axis so that additional multispectral imaging may be possible. The beam splitters 2321/2331 may be positioned to have a tilt angle ranging 65 to 115 degrees with respect to the optical axis. After the beam splitters 2321/2331, folding mirrors 2322/2332 direct the rays through the focal length optimizers 2323/2333 to reach image planes 2326/2336.

However, the optical system 2300 is different from the system 1600 in that the folding mirrors, 2315, 2322, and 2332, may function as a scanning mirror or forward motion compensator.

Figure 28B:
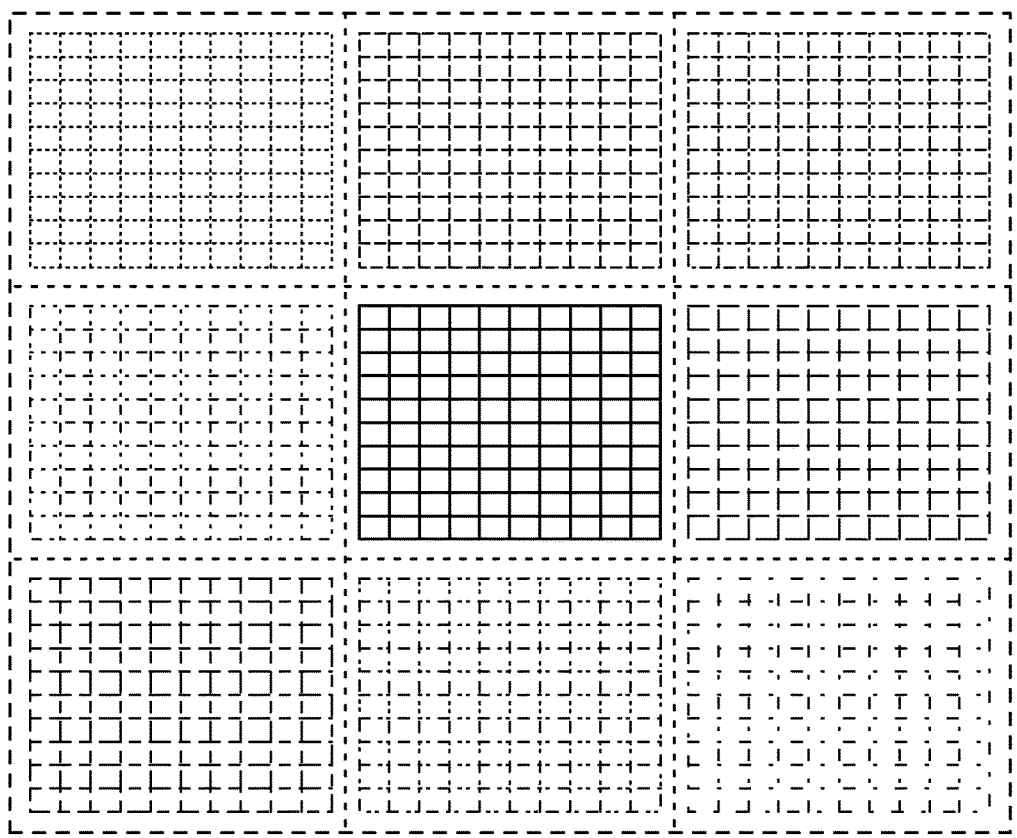
FIG. 28B is a diagram showing a projection of an embodiment of an image plane circuit that may be used with the configuration layout of FIG. 28A.

The scanning mirror is used to cover the field of view of the optical system 2300 with a smaller number of sensors than the system is designed to have. Traditionally the scheme is known as whiskbroom scanning when an imaging sensor has a fewer numbers of pixels than such as used in the systems 100-1300 previously described. For the optical system 2300, the approach is like stamping on the Earth surface, sweeping in the system field of view. For example, the projection of the sensors may be represented as in FIG. 28B.

The forward motion compensator may stabilize the line of sight of the optical system 2300 or the instantaneous field-of-view (IFOV) of the image sensors that are positioned at the image planes 2316, 2316', 2326, and 2336. Connected to an inertial measurement unit (IMU) and controlled to compensate unwanted motion, the folding mirrors, 2315, 2322, and 2332, may help in reducing image blur that is caused by an unstable motion of the platform, such as spacecraft, fighters, planes, drones, UAVs, or balloons.

Different from a traditional forward motion compensator, the folding mirrors, 2315, 2322, and 2332, may be used for low-light level imaging, casting away replacing time delay integration (TDI) sensors that have been used for such a mission. Connected to an IMU and controlled to compensate unwanted motion, the folding mirrors, 2315, 2322, and 2332, may help in maintaining the line of sight of the optical system 2300 or the instantaneous field-of-view (IFOV) of the image sensors so that the sensors may collect more light for a given time period. This approach may replace pitch maneuvering of a platform, like a spacecraft, drone, or UAV and gimbals.

Furthermore, different from a traditional forward motion compensator, the folding mirrors, 2315, 2322, and 2332, may be used to generate pixel shift images. Connected to an IMU and controlled to compensate unwanted motion, the folding mirrors 2315, 2322, and 2332 may move the line of sight of the system 2300 or the IFOV of the image sensors so that projections of the sensors are shifted by 1/n pixels. The resultant image data may be used for super-resolution to enhance image resolution by post processing.

Figure 29A:
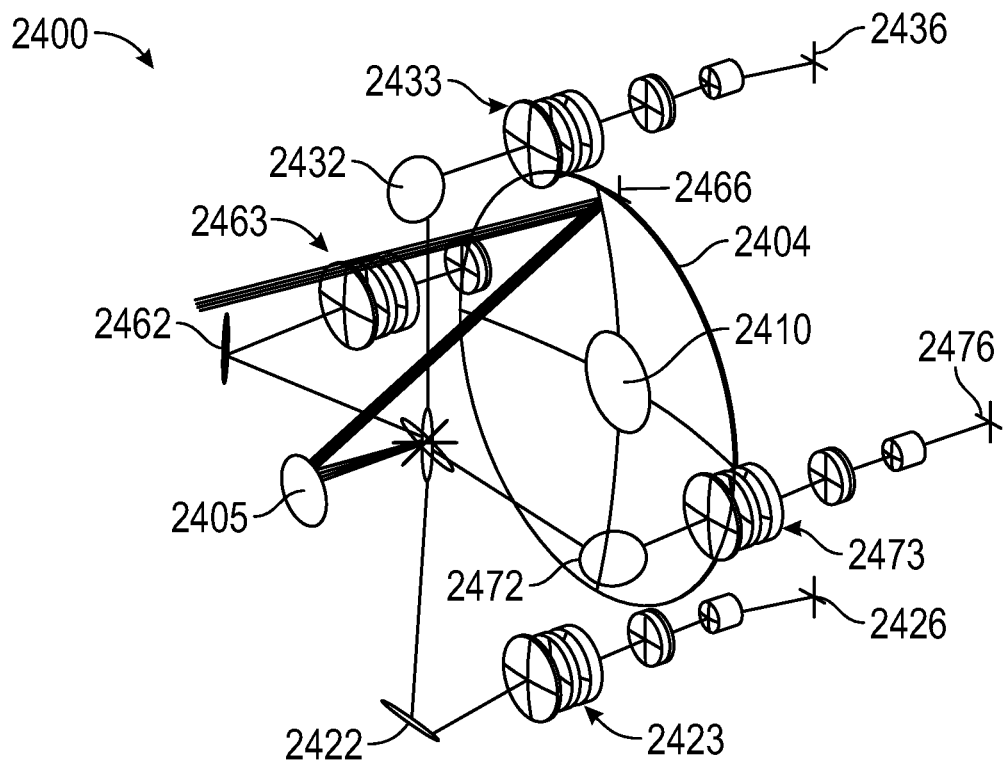
FIGS. 29A and 29B are schematics of another embodiment of an optical system that may be used for imaging.
Figure 29B:
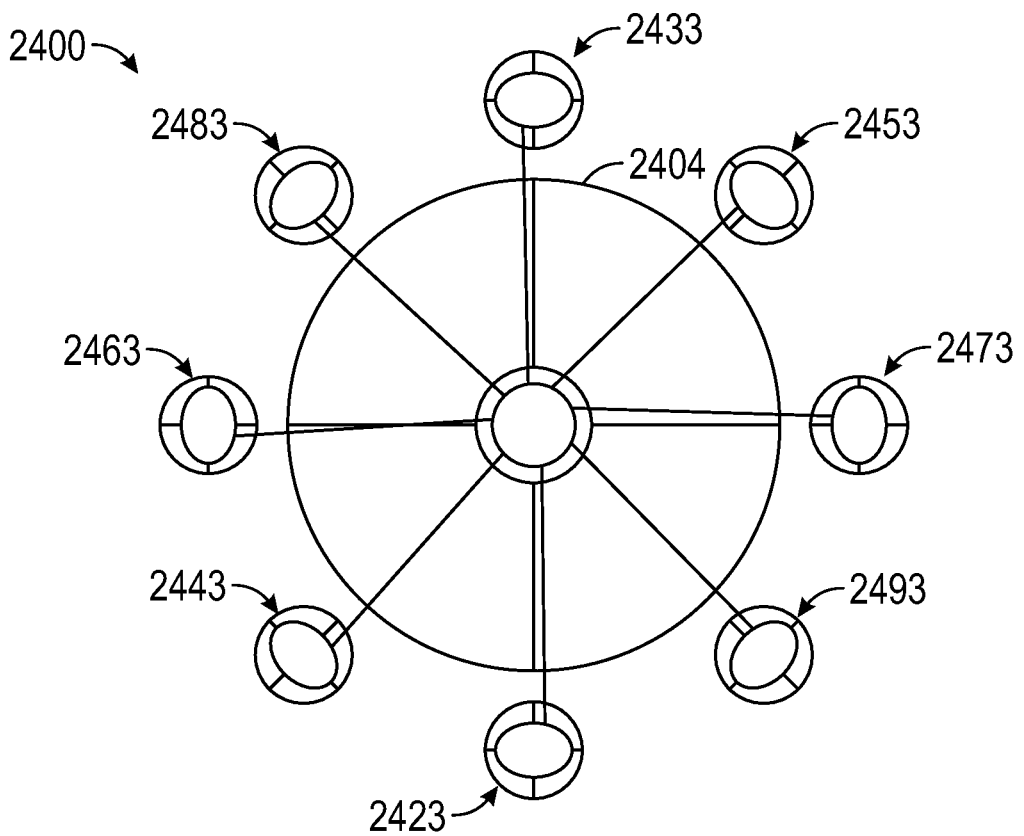

Referring to FIGS. 29A and 29B, a schematic of another embodiment of a cata-dioptric and reflective system 2400 is shown. FIG. 29A illustrates a perspective view of the optical system 2400 and FIG. 29B illustrates a front view facing a primary mirror 2404 and a set of focal length optimizers 2423, 2433, 2443, 2453, 2463, 2473, 2483, and 2493 described below. The optical system 2400 includes the primary mirror 2404, a secondary mirror 2405, a tertiary mirror (not shown for clarity), a quaternary mirror (not shown for clarity), and an image plane (not shown for clarity). The primary mirror 2404, the secondary mirror 2405, the tertiary mirror, the quaternary mirror and the image plane may have the same or similar features and/or functions as, respectively, the primary mirror 1604, the secondary mirror 1605, the tertiary mirror 1613, the quaternary mirror 1614 and the image plane 1616 of the optical system 1600, and vice versa.

For additional multispectral imaging, the optical system 2400 includes the focal length optimizers 2423, 2433, 2443, 2453, 2463, 2473, 2483, and 2493 to match its optical resolution to the pixel size of an off-the shelf or ready-made sensors respectively. The focal length optimizers 2423, 2433, 2443, 2453, 2463, 2473, 2483, and 2493 may have the same or similar features and/or functions as the focal length optimizer 1623 and 1633 of the optical system 1600, and vice versa.

The focal length optimizers 2423, 2433, 2443, 2453, 2463, 2473, 2483, and 2493 may be positioned to have a tilt angle ranging 65 to 115 degree with respect to and in the circumferential direction of an optical axis, which was defined by a mechanical symmetry around a line through the vertices of the primary and the secondary mirrors, and which line may define the "optical axis." Adjusting a position and a tilt angle of beam splitters (not specifically referenced for simplicity) 2421, 2431, 2441, 2451, 2461, 2471, 2481, and 2491, and folding mirrors (not all of them referenced for simplicity) 2422, 2432, 2442, 2452, 2462, 2472, 2482, and 2492, the focal length optimizers 2423, 2433, 2443, 2453, 2463, 2473, 2483, and 2493 may find their proper position along the circumference whose diameter is larger than the primary mirror 2404. The beam splitters 2421, 2431, 2441, 2451, 2461, 2471, 2481, and 2491 may be positioned to have a tilt angle ranging 65 to 115 degrees with respect to and in the circumferential direction of the optical axis. After the beam splitters 2421, 2431, 2441, 2451, 2461, 2471, 2481, and 2491, folding mirrors 2422, 2432, 2442, 2452, 2462, 2472, 2482, and 2492 direct the rays through the focal length optimizers 2423, 2433, 2443, 2453, 2463, 2473, 2483, and 2493 to reach image planes 2426, 2436, 2446, 2456, 2466, 2476, 2486, and 2496 (not all of them referenced for simplicity).

The focal length optimizers 2423, 2433, 2443, 2453, 2463, 2473, 2483, and 2493 may have the same or similar features and/or functions as the focal length optimizer 1833 (FIG. 25) of the optical system 1800, and vice versa.

The focal length optimizers 2423, 2433, 2443, 2453, 2463, 2473, 2483, and 2493 may have the same or similar features and/or functions as the focal length optimizer 1933/2033 of the optical system 1900 (FIG. 26A)/2000 (FIG. 26B), and vice versa.

The focal length optimizers 2423, 2433, 2443, 2453, 2463, 2473, 2483, and 2493 may have the same or similar features and/or functions as the focal length optimizer 2133/2233 of the optical system 2100 (FIG. 27A)/2200 (FIG. 27B), and vice versa.

The folding mirrors 2415, 2422, 2432, 2442, 2452, 2462, 2472, 2482, and 2492 may have the same or similar features and/or functions as the folding mirrors, 2315, 2322, and 2332, of the optical system 2300 (FIG. 28A), and vice versa.

Figure 30:
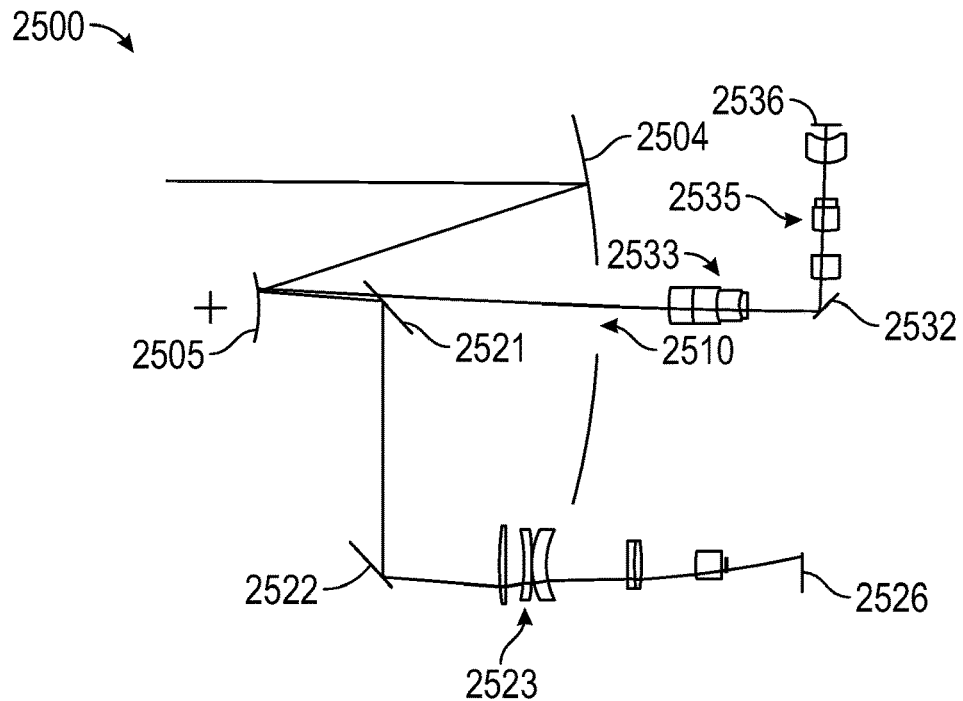
FIGS. 30-33 are schematics showing various embodiments of configuration layouts for mirrors and lenses, including one or more beam splitters, two or more folding mirrors, and two or more imaging planes, that may be used with the various optical systems described herein.

Referring to FIG. 30, a schematic of an embodiment of a cata-dioptric system 2500 is shown. The optical system 2500 is derived from a four-mirror design such as shown in the systems numbered from 100 to 1300 and the system 1500. Specifically, the optical system 2500 is based on cata-dioptric design such as the systems numbered from 1600 to 2300 and the system 2400. However, the optical system 2500 is different from the systems 100 to 1300 and 1500 by being capable of multispectral imaging with focal length optimizers 2523 and 2533 that consist of lenses of spherical or aspherical surfaces. Furthermore, the optical system 2500 is also different from the systems 1600 to 2300 and 2400 by achieving the multispectral imaging only with lens groups 2523 and 2533 that can be substituted by the tertiary and the quaternary mirrors of the systems 100 to 2400. Thus, the baseline design of the system 2500 has a primary mirror 2504, a secondary mirror 2505, a focal length optimizer 2523 and 2533/2535, a beam splitter 2521, a folding mirror 2522 and 2532, and image planes 2526 and 2536. In certain embodiments, beam splitter 2521 is a plate beam splitter.

The fore-optics of the optical system 2500 includes a concave primary mirror 2504 having a central aperture 2510, where the primary mirror may have one of a parabolic, non-parabolic conical or aspherical surface. A smaller convex secondary mirror 2505 faces the primary mirror 2504 and has an aspherical surface. The primary mirror 2504 has positive power or focal length, and the secondary mirror 2505 has negative power.

An entrance pupil of the optical system 2500 may be positioned near the primary 2504 or the secondary mirrors 2505. An intermediate focus is formed around a vertex of the primary mirror 2504, positioned between the primary 2504 and the secondary mirrors 2505, or between the primary mirror 2504 and the focal length optimizer 2533.

The groups of lenses 2523 and 2533/2535 have spherical or aspherical surfaces and act as focal length optimizers to adjust and optimize the focal lengths to match its optical resolution to the pixel size of an off-the shelf or ready-made sensor. Therefore, the optical system 2500 may perform re-imaging with a focal length being adjusted to a different pixel size or a modified resolution.

The image planes 2526 and 2536 have one or more aggregated sensors that convert light into electrical signals. In certain embodiments, the image plane 2536 is positioned behind the primary mirror 2504. In certain embodiments, the image plane 2526 is positioned at a specific distance from an optical axis that is defined by a mechanical symmetry around a line through the vertices of the primary and the secondary mirrors, which may define the "optical axis."

With focal length optimizers 2523 and 2533, the optical system 2500 is capable of multispectral imaging with off-the-shelf or ready-made sensors, and not customized or tailored pixel sensors, simultaneously in visible, near-infrared, shortwave-infrared, mid-wave infrared, and longwave infrared spectrums. To accomplish this, the system 2500 may have a series of splitting mirrors that separate the rays of a specific spectral range and then transmit or reflect them toward the focal length optimizers.

The focal length optimizer 2523 may be positioned to have a tilt angle ranging from 65 to 115 degrees with respect to the optical axis that may be defined by a mechanical symmetry around a line through the vertices of the primary and the secondary mirrors. In other embodiments, other tilt angles or tilt angle ranges may be utilized.

The beam splitter 2521 may cut out sets of a specific spectral range. The beam splitter 2521 may be positioned between the primary mirror 2504 and the secondary mirror 2505 and may have a tilt angle ranging from 65 to 115 degrees with respect to the optical axis.

Light rays impinge upon and are reflected by the primary mirror 2504 first and the secondary mirror 2505 next. The rays reflected by the secondary mirror 2505 impinge on the beam splitter 2521 that redirects one part of the rays to folding mirror 2522 and transmits the other part of the rays to the focal length optimizer 2533. Then the rays go through the focal length optimizers 2523 and 2533/2535 and reach the image planes 2526 and 2536. The image planes 2526 and 2536 may include one or more sensors, which may be aggregated in an orderly manner.

In certain embodiments, the group of lenses 2523 with the image plane 2526 is positioned at a specific distance from and around the optical axis in a circumferential direction. In certain embodiments, the group of lenses 2533 with the image plane 2536 is positioned behind the primary mirror 2504. The groups of lenses 2523 and 2533/2535 are interchangeable with each other in their position.

For the rays redirected by the beam splitter 2521, an intermediate focus may be formed near the folding mirrors 2522. An exit pupil or Lyot stop may be positioned immediately after the lens group 2523 and before the image plane 2526. In certain embodiments, a Fabry Perot interferometer may be positioned for hyperspectral imaging at the exit pupil or Lyot stop. In certain embodiments, the filter wheel or slider that includes a series of meta-lens may be arranged, e.g. at the exit pupil and/or Lyot stop. The filter wheel or slider that includes a series of meta-lens may be arranged to correct optical aberrations due to mechanical and thermal distortion during system operation and/or to remove focus-shift due to the thermal expansion or shrinkage of system structure.

For the rays transmitted through the beam splitter 2521, an intermediate focus may be formed near the central aperture 2510 of the primary mirror 2504. An exit pupil or Lyot stop may be positioned near the folding mirror 2532, which is located between the focal length optimizers 2533 and 2535. In certain embodiments, a Fabry Perot interferometer may be positioned for hyperspectral imaging at the exit pupil and/or Lyot stop. In certain embodiments, the filter wheel or slider that includes a series of meta-lens may be arranged, e.g. at the exit pupil and/or Lyot stop. The filter wheel or slider that includes a series of meta-lens may be arranged to correct optical aberrations due to mechanical and thermal distortion during system operation and to remove focus-shift due to the thermal expansion or shrinkage of system structure.

A forward motion compensator may stabilize the line of sight of the optical system 2500 or the instantaneous field-of-view (IFOV) of the image sensors that are positioned at the image planes 2526 and 2536. Connected to an inertial measurement unit (IMU) and controlled to compensate unwanted motion, the folding mirrors, 2522 and 2532, may help in reducing image blur that is caused by an unstable motion of the platform, such as spacecraft, fighters, planes, drones, UAVs, or balloons.

Different from a traditional forward motion compensator, the folding mirrors, 2522 and 2532, may be used for low-light level imaging, replacing time delay integration (TDI) sensors that have been used for such a mission. Connected to an IMU and controlled to compensate unwanted motion, the folding mirrors, 2522 and 2532, may help in maintaining the line of sight of the optical system 2500 or the instantaneous field-of-view (IFOV) of the image sensors so that the sensors may collect more light for a given time-period. This approach may replace pitch maneuvering of a platform, like a spacecraft, drone, or UAV and gimbals.

Furthermore, different from a traditional forward motion compensator, the folding mirrors 2522 and 2532 may be used to generate pixel shift images. Connected to an IMU and controlled to compensate unwanted motion, the folding mirrors 2522 and 2532 may move the line of sight of the system 2500 or the IFOV of the image sensors so that projections of the sensors are shifted by 1/n pixels. The resultant image data may be used for super-resolution to enhance image resolution by post processing.

In certain embodiments, the lens groups 2523 and 2533 may be positioned in parallel to the optical axis defined by the primary mirror 2504 and the secondary mirror 2505. In certain embodiments, the plate beam splitter 2521 along the optical axis may be fixed to its position and angle, which implies that the beam splitter is not used for forward motion compensation. Folding mirrors that direct a beam into lens groups for multispectral imaging, such as the folding mirrors 2522 and 2532, may function as a scanning mirror or forward motion compensator. In certain embodiments, lens groups, such as the lens groups 2523 and 2533, may include hyperspectral filters or further beam splitters to add more spectral bands.

Figure 31:
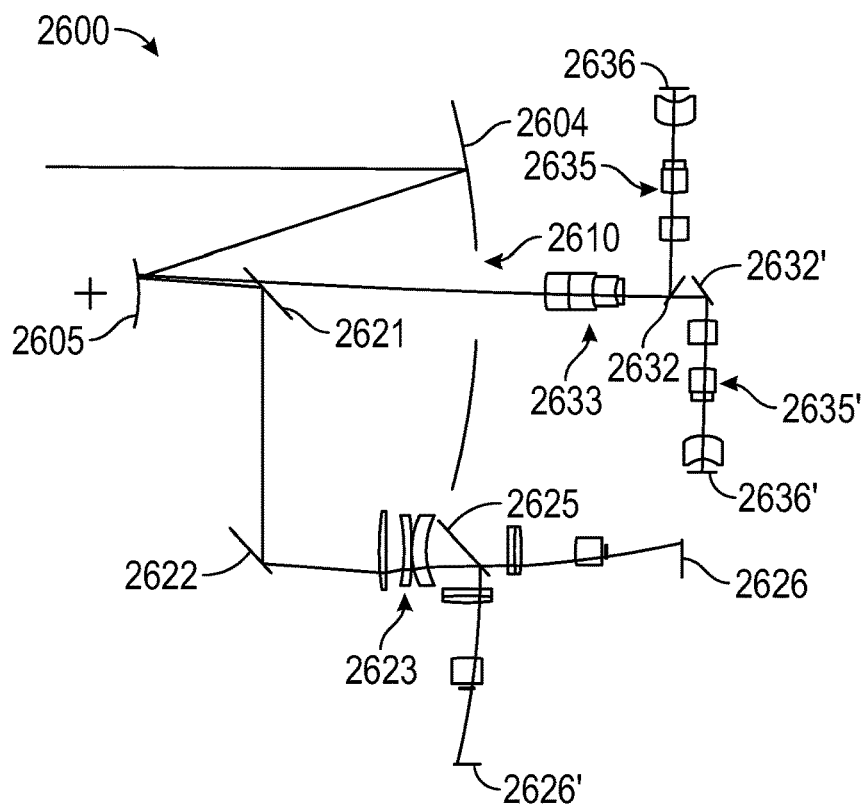

Referring to FIG. 31, a schematic of another embodiment of a cata-dioptric system 2600 is shown. The optical system 2600 may be based on or designed similar to cata-dioptric design such as the system 2500. However, the optical system 2600 is different from the optical system 2500 in that each focal length optimizer of the optical system 2600 may have additional branches of lenses to further separate sets of spectral range. Thus, the baseline design of the optical system 2600 includes a primary mirror 2604, a secondary 2605, and focal length optimizers 2623 and 2633/2635/2635', beam splitters 2621 and 2632, folding mirrors 2622 and 2632', and image planes 2626/2626' and 2636/2636'.

The fore-optics of the optical system 2600 includes a concave primary mirror 2604 having a central aperture 2610, where the primary mirror may have one of a parabolic, non-parabolic conical or aspherical surface. A smaller convex secondary mirror 2605 faces the primary mirror 2604 and has an aspherical surface. The primary mirror 2604 has positive power or focal length, and the secondary mirror 2605 has negative power.

An entrance pupil of the optical system 2600 may be positioned near the primary 2604 or the secondary mirrors 2605. An intermediate focus is formed around a vertex of the primary mirror 2604, positioned between the primary 2604 and the secondary mirrors 2605, or between the primary mirror 2604 and the focal length optimizer 2633.

For multispectral imaging, the optical system 2600 may include focal length optimizers 2623 and 2633/2635/2635' to match its optical resolution to the pixel size of off-the shelf or ready-made sensors. The focal length optimizers 2623 and 2633/2635/2635' may have the same or similar features and/or functions as the focal length optimizers 2523 and 2533 of the optical system 2500, and vice versa.

The image planes 2626/2626' and 2636/2636' may have one or more aggregated sensors that convert light into electrical signals. In certain embodiments, the image planes 2636 and 2636' are positioned behind the primary mirror 2604. In certain embodiments, the image planes 2626 and 2626' are positioned at a specific distance from an optical axis that is defined by a mechanical symmetry around a line through the vertices of the primary and the secondary mirrors, which may define the optical axis.

With focal length optimizers 2623 and 2633/2635/2635', the optical system 2600 is capable of multispectral imaging with off-the-shelf or ready-made sensors, and not customized or tailored pixel sensors, simultaneously in visible, near-infrared, shortwave-infrared, mid-wave infrared, and longwave infrared spectrums. To accomplish this, the system 2600 may have a series of splitting mirrors that may separate the rays of a specific spectral range and then transmit or reflect them toward the focal length optimizers.

The focal length optimizer 2623 may be positioned to have a tilt angle ranging from 65 to 115 degrees with respect to the optical axis that may be defined by a mechanical symmetry around a line through the vertices of the primary and the secondary mirrors.

The beam splitters 2621, 2625, and 2632 may cut out sets of a specific spectral range. The beam splitter 2621 may be positioned between the primary mirror 2604 and the secondary mirror 2605 and may have a tilt angle ranging from 65 to 115 degrees with respect to the optical axis. The beam splitter 2625 may be positioned in the focal length optimizer 2623. The beam splitter 2632 may be positioned between the lens groups 2633 and 2635/2635'.

Light rays impinge upon and are reflected by the primary mirror 2604 first and the secondary mirror 2605 next. The rays reflected by the secondary mirror 2605 impinge on the beam splitter 2621 that redirects one part of the rays to folding mirror 2622 and transmits the other part of the rays to the focal length optimizer 2633.

The rays through the focal length optimizer 2623 may be split by the beam splitter 2625 and reach the image planes 2626 and 2626' respectively. The rays transmitted through the focal length optimizer 2633 are split by the beam splitter 2632. The rays redirected by beam splitter 2632 travel through the focal length optimizer 2635 and arrive at the image plane 2636. The rays transmitted through beam splitter 2632 are redirected by the folding mirror 2632' and find their way to the image plane 2636'. The image planes 2626/2626' and 2636/2636' may include one or more sensors, which may be aggregated in an orderly manner.

In certain embodiments, the group of lenses 2623 with the image planes 2626 and 2626' is positioned at a specific distance from and around the optical axis in a circumferential direction. In certain embodiments, the group of lenses 2633 and 2635/2635' with the image planes 2636 and 2636' are positioned behind the primary mirror 2604. The groups of lenses 2623 and 2633/2635/2635' are interchangeable with each other in their position.

For the rays redirected by the beam splitter 2621, an intermediate focus may be formed near the folding mirror 2622. An exit pupil or Lyot stop may be positioned immediately after the lens group 2623 and before the image plane 2626 and 2626'. In certain embodiments, a Fabry Perot interferometer may be positioned for hyperspectral imaging at the exit pupil and/or Lyot stop. In certain embodiments, the filter wheel or slider that includes a series of meta-lens may be arranged, e.g. at the exit pupil and/or Lyot stop. The filter wheel or slider that includes a series of meta-lens may be arranged to correct optical aberrations due to mechanical and thermal distortion during system operation and to remove focus-shift due to the thermal expansion or shrinkage of system structure.

For the rays transmitted through the beam splitter 2621, an intermediate focus may be formed near the central aperture 2610 of the primary mirror 2604. An exit pupil or Lyot stop may be positioned between the folding mirrors 2632 and 2632', which are located between the focal length optimizers 2633 and 2635/2635'. In certain embodiments, a Fabry Perot interferometer may be positioned for hyperspectral imaging at the exit pupil and/or Lyot stop. In certain embodiments, the filter wheel or slider that includes a series of meta-lens may be arranged, e.g. at the exit pupil and/or Lyot stop. The filter wheel or slider that includes a series of meta-lens may be arranged to correct optical aberrations due to mechanical and thermal distortion during system operation and to remove focus-shift due to the thermal expansion or shrinkage of system structure.

A forward motion compensator may stabilize a line of sight of the optical system 2600 or an instantaneous field-of-view (IFOV) of the image sensors that are positioned at the image planes 2626/2626' and 2636/2636'. Connected to an inertial measurement unit (IMU) and controlled to compensate unwanted motion, the folding mirrors 2622 and 2632', and the beam splitter 2632 may help in reducing image blur that is caused by an unstable motion of the platform, such as spacecraft, fighters, planes, drones, UAVs, or balloons.

Different from a traditional forward motion compensator, the folding mirrors 2622 and 2632', and the beam splitter 2632 may be used for low-light level imaging, replacing time delay integration (TDI) sensors that have been used for such a mission. Connected to an IMU and controlled to compensate unwanted motion, the folding mirrors 2622 and 2632', and the beam splitter 2632 may help in maintaining the line of sight of the optical system 2600 or the instantaneous field-of-view (IFOV) of the image sensors so that the sensors may collect more light for a given time-period. This approach may replace pitch maneuvering of a platform, like a spacecraft, drone, or UAV and gimbals.

Furthermore, different from a traditional forward motion compensator, the folding mirrors 2622 and 2632', and the beam splitter 2632 may be used to generate pixel shift images. Connected to an IMU and controlled to compensate unwanted motion, the folding mirrors 2622 and 2632', and the beam splitter 2632 may move the line of sight of the system 2600 or the IFOV of the image sensors so that the projections of the sensors are shifted by 1/n pixels. The resultant image data may be used for super-resolution to enhance image resolution by post processing.

In certain embodiments, the lens groups 2623 and 2633 may be positioned in parallel to the optical axis defined by the primary mirror 2604 and the secondary mirror 2605. In certain embodiments, the plate beam splitter 2621 along the optical axis may be fixed to its position and angle, which implies that the beam splitter is not used for forward motion compensation. Folding mirrors that direct a beam into lens groups for multispectral imaging, such as the folding mirrors 2622 and 2632' and the beam splitter 2632, may function as a scanning mirror. In certain embodiments, lens groups, such as the lens groups 2623 and 2633, may include hyperspectral filters to add more spectral bands.

Figure 32:
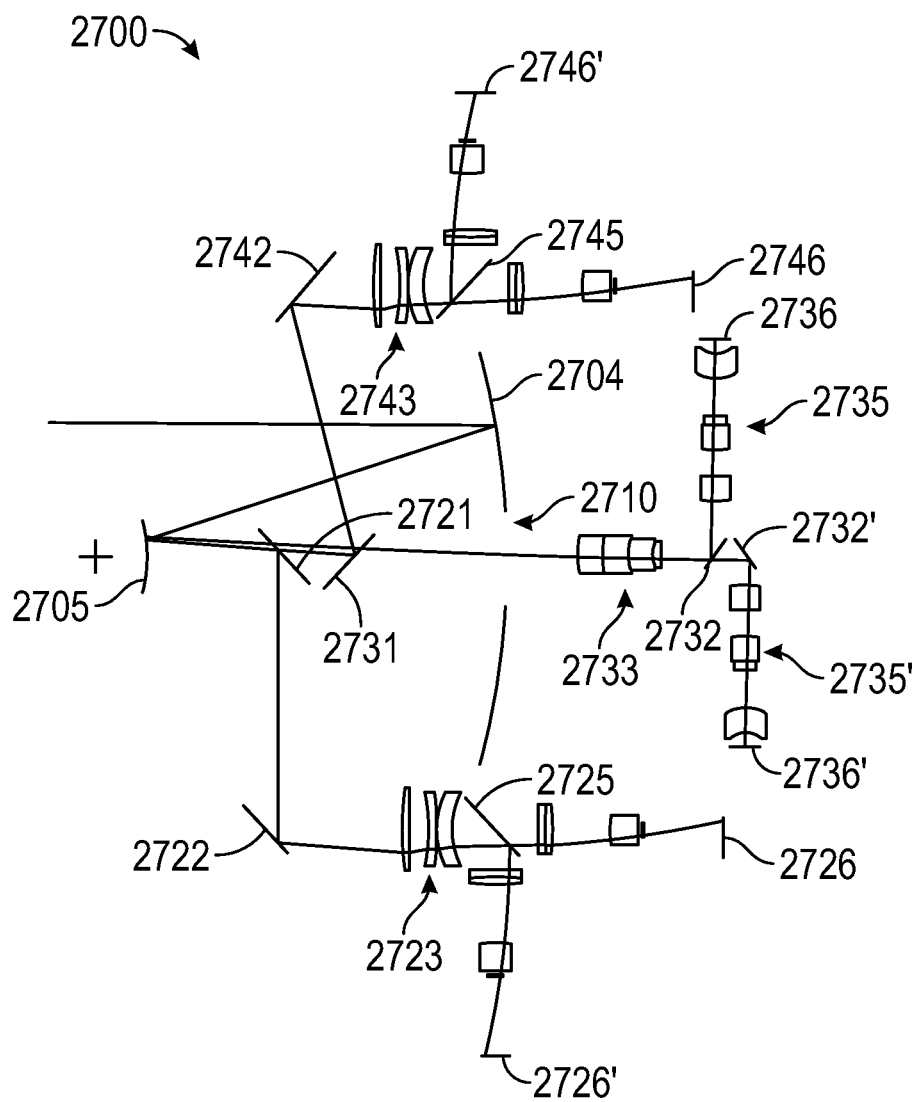

Referring to FIG. 32, a schematic of another embodiment of a cata-dioptric system 2700 is shown. The optical system 2700 may be based on or designed similarly to the cata-dioptric design such as in the systems 2500 and 2600. However, the optical system 2700 is different from the optical systems 2500 and 2600 in that the optical system 2700 has an additional or third focal length optimizer to expand its multispectral imaging capability. Thus, the baseline design of the optical system 2700 includes a primary mirror 2704, a secondary mirror 2705, focal length optimizers 2723, 2733/2735/2735' and 2743, beam splitters 2721, 2731, 2732, 2725 and 2745, folding mirrors 2722, 2732' and 2742, and image planes 2726/2726', 2736/2736' and 2746/2746'.

The fore-optics of the optical system 2700 includes a concave primary mirror 2704 having a central aperture 2710, where the primary mirror may have one of a parabolic, non-parabolic conical or aspherical surface. A smaller convex secondary mirror 2705 faces the primary mirror 2704 and has an aspherical surface. The primary mirror 2704 has positive power or focal length, and the secondary mirror 2705 has negative power.

An entrance pupil of the optical system 2700 may be positioned near the primary mirror 2704 or the secondary mirror 2705. An intermediate focus is formed around a vertex of the primary mirror 2704, positioned between the primary mirror 2704 and the secondary mirror 2705, or between the primary mirror 2704 and the focal length optimizer 2733.

For multispectral imaging, the optical system 2700 includes focal length optimizers 2723, 2733/2735/2735' and 2743, to match its optical resolution to the pixel size of off-the shelf or ready-made sensors. The focal length optimizers 2723, 2733/2735/2735' and 2743 may have the same or similar features and/or functions as the focal length optimizers 2523 and 2533 of the optical system 2500, and 2623 and 2633/2635/2635' of the optical system 2600, and/or vice versa.

The image planes 2726/2726', 2736/2736' and 2746/2746' have one or more aggregated sensors that convert light into electrical signals. In certain embodiment, the image planes 2736 and 2736' are positioned behind the primary mirror 2704. In certain embodiments, the image planes 2726/2726' and 2746/2746' are positioned at a specific distance from an optical axis that is defined by a mechanical symmetry around a line through the vertices of the primary and the secondary mirrors, which may define the optical axis.

With focal length optimizers 2723, 2733/2735/2735' and 2743, the optical system 2700 is capable of multispectral imaging with off-the-shelf or ready-made sensors, and not customized or tailored pixel sensors, simultaneously in visible, near-infrared, shortwave-infrared, mid-wave infrared, and longwave infrared spectrums. To accomplish this, the system 2700 may have a series of splitting mirrors that separate the rays of a specific spectral range and then transmit or reflect them toward the focal length optimizers.

The focal length optimizers 2723 and 2743 may be positioned to have a tilt angle ranging from 65 to 115 degrees with respect to the optical axis that may be defined by a mechanical symmetry around a line through the vertices of the primary and the secondary mirrors.

The beam splitters 2721, 2731, 2725, 2732 and 2745 may cut out sets of a specific spectral range. The beam splitters 2721 and 2731 may be positioned between the primary mirror 2704 and the secondary mirror 2705 and may have a tilt angle ranging from 65 to 115 degrees with respect to the optical axis. The beam splitter 2725 may be positioned in the focal length optimizer 2723. The beam splitter 2745 may be positioned in the focal length optimizer 2743. The beam splitter 2732 may be positioned between the lens groups 2733 and 2735/2735'.

Light rays impinge upon and are reflected by the primary mirror 2704 first and the secondary mirror 2705 next. The rays reflected by the secondary mirror 2705 impinge on the beam splitter 2721 that redirects one part of the rays to folding mirror 2722 and transmits the other part of the rays to the beam splitter 2731. The beam splitter 2731 redirects one part of the rays to folding mirror 2742 and transmits the other part of the rays to the focal length optimizer 2733.

The rays through the focal length optimizer 2723 are split by the beam splitter 2725 and reach the image planes 2726 and 2726' respectively. The rays through the focal length optimizer 2743 are split by the beam splitter 2745 and reach the image planes 2746 and 2746' respectively. The rays transmitted through the focal length optimizer 2733 are split by the beam splitter 2732. The rays redirected by 2732 travel through the focal length optimizer 2735 and arrive at the image plane 2736. The rays transmitted through 2732 are redirected by the folding mirror 2732' and find their way to the image plane 2736'. The image planes 2726/2726', 2736/2736', and 2746/2746' may include one or more sensors, which may be aggregated in an orderly manner.

In certain embodiments, the group of lenses 2723 with the image planes 2726 and 2726' may be positioned at a specific distance from and around the optical axis in a circumferential direction. In certain embodiments, the group of lenses 2743 with the image planes 2746 and 2746' may be positioned at a specific distance from and around the optical axis in a circumferential direction. In certain embodiments, the group of lenses 2733 and 2735/2735' with the image planes 2736 and 2736' may be positioned behind the primary mirror 2704. The groups of lenses 2723, 2743, and 2733/2735/2735' may be interchangeable with each other in their position.

For the rays redirected by the beam splitter 2721, intermediate focus may be formed near the folding mirrors 2722. An exit pupil or Lyot stop may be positioned immediately after the lens group 2723 and before the image planes 2726 and 2726'. For the rays redirected by the beam splitter 2731, intermediate focus may be formed near the folding mirrors 2742. An exit pupil or Lyot stop may be positioned immediately after the lens group 2743 and before the image planes 2746 and 2746'. In certain embodiments, a Fabry Perot interferometer may be positioned for hyperspectral imaging at the exit pupil and/or Lyot stop. In certain embodiments, the filter wheel or slider that includes a series of meta-lens may be arranged, e.g. at the exit pupil and/or Lyot stop. The filter wheel or slider that includes a series of meta-lens may be arranged to correct optical aberrations due to mechanical and thermal distortion during system operation and to remove focus-shift due to the thermal expansion or shrinkage of system structure.

For the rays transmitted through the beam splitters 2721 and 2731, intermediate focus may be formed near the central aperture 2710 of the primary mirror 2704. An exit pupil or Lyot stop may be positioned between the folding mirrors 2732 and 2732', which is located between the focal length optimizers 2733 and 2735/2735'. In certain embodiments, a Fabry Perot interferometer may be positioned for hyperspectral imaging at the exit pupil and/or Lyot stop. In certain embodiments, the filter wheel or slider that includes a series of meta-lens may be arranged, e.g. at the exit pupil and/or Lyot stop. The filter wheel or slider that includes a series of meta-lens may be arranged to correct optical aberrations due to mechanical and thermal distortion during system operation and to remove focus-shift due to the thermal expansion or shrinkage of system structure.

A forward motion compensator may stabilize the line of sight of the optical system 2700 or the instantaneous field-of-view (IFOV) of the image sensors that are positioned at the image planes 2726/2726', 2736/2736', and 2746/2746'. Connected to an inertial measurement unit (IMU) and controlled to compensate unwanted motion, the folding mirrors 2722, 2732' and 2742, and the beam splitter 2732 may help in reducing image blur that is caused by an unstable motion of the platform, such as spacecraft, fighters, planes, drones, UAVs, or balloons.

Different from a traditional forward motion compensator, the folding mirrors 2722 and 2732', and the beam splitter 2732 may be used for low-light level imaging, replacing time delay integration (TDI) sensors that have been used for such a mission. Connected to an IMU and controlled to compensate unwanted motion, the folding mirrors 2722 and 2732', and the beam splitter 2732 may help in maintaining the line of sight of the optical system 2700 or the instantaneous field-of-view (IFOV) of the image sensors so that the sensors may collect more light for a given time-period. This approach may replace pitch maneuvering of a platform, like a spacecraft, drone, or UAV and gimbals.

Furthermore, different from a traditional forward motion compensator, the folding mirrors 2722 and 2732', and the beam splitter 2732 may be used to generate pixel shift images. Connected to an IMU and controlled to compensate unwanted motion, the folding mirrors 2722 and 2732', and the beam splitter 2732 may move the line of sight of the system 2700 or the IFOV of the image sensors so that projections of the sensors are shifted by 1/n pixels. The resultant image data may be used for super-resolution to enhance image resolution by post processing.

In certain embodiments, the lens groups 2723, 2733 and 2743 may be positioned in parallel to the optical axis defined by the primary mirror 2704 and the secondary mirror 2705. In certain embodiments, the plate beam splitters 2721 and 2731 along the optical axis may be fixed to their position and angle, which implies that the beam splitters are not used for forward motion compensation. Folding mirrors that direct a beam into lens groups for multispectral imaging, such as the folding mirrors 2722, 2742 and 2732' and the beam splitter 2732, may function as a scanning mirror. In certain embodiments, lens groups, such as the lens groups 2723 and 2743, may include hyperspectral filters to add more spectral bands.

Figure 33:
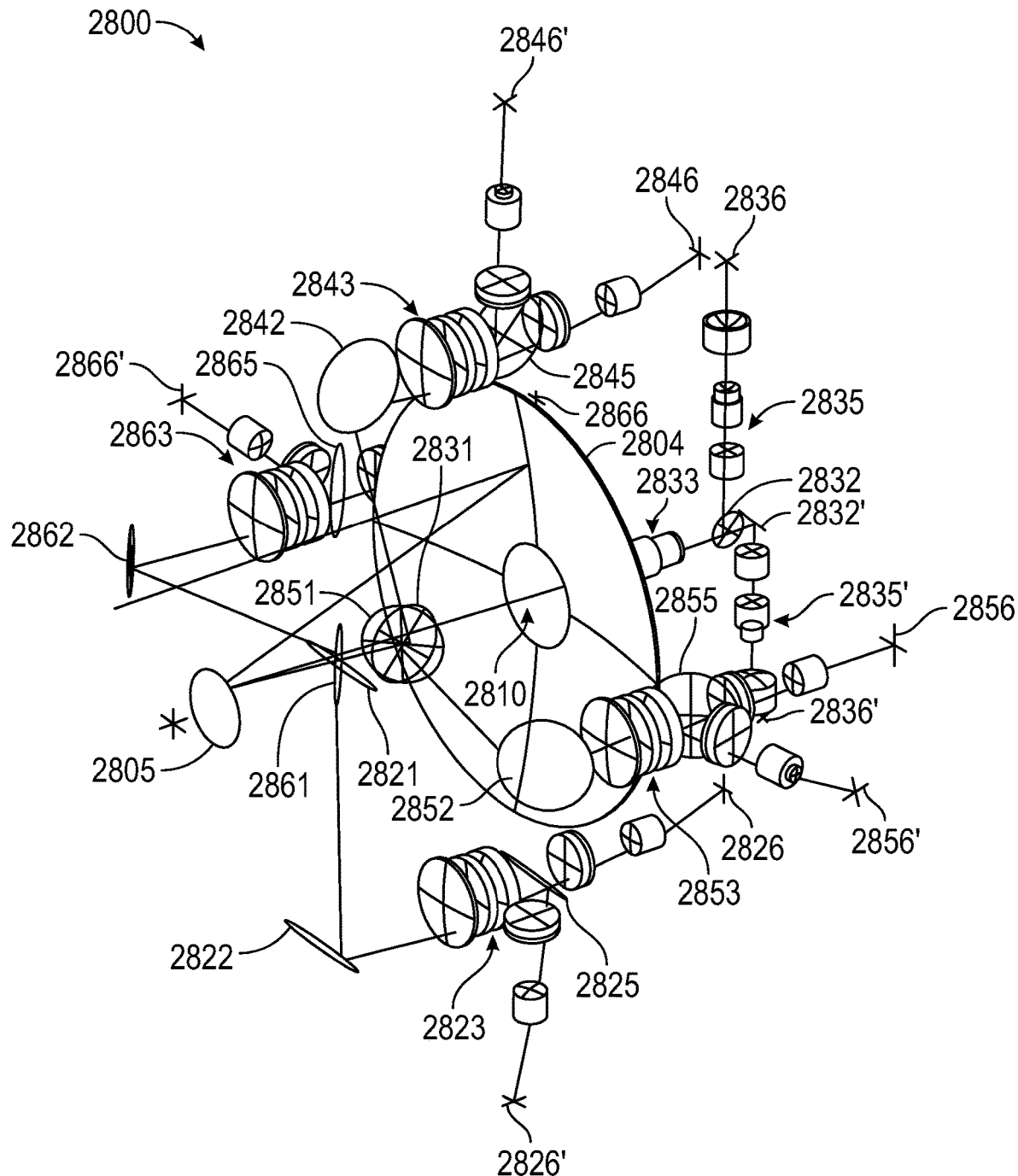

Referring to FIG. 33, a schematic of another embodiment of a cata-dioptric system 2800 is shown. The optical system 2800 may be based on or designed to be similar to the cata-dioptric designs such as for the systems 2500, 2600, and 2700. However, the optical system 2800 is different from the optical systems 2500, 2600 and 2700 in that the optical system 2800 may have more than, but not limited to, five focal length optimizers to maximize its multispectral imaging capability. Thus, the baseline design of the optical system 2800 includes a primary mirror 2804, a secondary mirror 2805, focal length optimizers 2823, 2833/2835/2835', 2843, 2853 and 2863, beam splitters 2821, 2831, 2851, 2861, 2832, 2825, 2845, 2855 and 2865, folding mirrors 2822, 2832', 2842, 2852 and 2862, and image planes 2826/2826', 2836/2836', 2846/2846', 2856/2856' and 2866/2866'.

The fore-optics of the optical system 2800 includes a concave primary mirror 2804 having a central aperture 2810, where the primary mirror may have one of a parabolic, non-parabolic conical or aspherical surface. A smaller convex secondary mirror 2805 faces the primary mirror 2804 and has an aspherical surface. The primary mirror 2804 has positive power or focal length, and the secondary mirror 2805 has negative power.

An entrance pupil of the optical system 2800 may be positioned near the primary mirror 2804 or the secondary mirror 2805. An intermediate focus is formed around a vertex of the primary mirror 2804, positioned between the primary mirror 2804 and the secondary mirror 2805, or between the primary mirror 2804 and the focal length optimizer 2833.

For multispectral imaging, the optical system 2800 includes focal length optimizers 2823, 2833/2835/2835', 2843, 2853, and 2863, to match its optical resolution to the pixel size of off-the-shelf or ready-made sensors. The focal length optimizers 2823, 2833/2835/2835', 2843, 2853, and 2863, may have the same or similar features and/or functions as the focal length optimizers 2523 and 2533 of the optical system 2500; 2623 and 2633/2635/2635' of the optical system 2600; and 2723, 2733/2735/2735', and 2743 of the optical system 2700, and/or vice versa.

The image planes have one or more aggregated sensors that convert light into electrical signals. In certain embodiment, the image planes 2836 and 2836' are positioned behind the primary mirror 2804. In certain embodiments, the image planes 2826/2826', 2846/2846', 2856/2856', and 2866/2866' are positioned at a specific distance from an optical axis that is defined by a mechanical symmetry around a line through the vertices of the primary and the secondary mirrors, which may define the optical axis.

With focal length optimizers 2823, 2833/2835/2835', 2843, 2853, and 2863, the optical system 2800 is capable of multispectral imaging with off-the-shelf or ready-made sensors, and not customized or tailored pixel sensors, simultaneously in visible, near-infrared, shortwave-infrared, midwave infrared, and longwave infrared spectrums. To accomplish this, the system 2800 may have a series of splitting mirrors that separate the rays of a specific spectral range and then transmit or reflect them toward the focal length optimizers.

The focal length optimizers 2823, 2843, 2853 and 2863 may be positioned to have a tilt angle ranging from 65 to 115 degrees with respect to the optical axis that may be defined by a mechanical symmetry around a line through the vertices of the primary and the secondary mirrors.

The beam splitters 2821, 2831, 2851, 2861, 2832, 2825, 2845, 2855, and 2865, may cut out sets of a specific spectral range. The beam splitters 2821, 2831, 2851 and 2861 may be positioned between the primary mirror 2804 and the secondary mirror 2805 that may have a tilt angle ranging from 65 to 115 degrees with respect to the optical axis. Adjusting a position and a tilt angle of beam splitters 2821, 2831, 2851, and 2861, and folding mirrors 2822, 2842, 2852 and 2862, respectively, a series of beam splitters, more than four but not limited to that, may be placed along the optical axis so that additional multispectral imaging may be possible.

The beam splitters 2825, 2845, 2855 and 2865 may be positioned in the focal length optimizers 2823, 2843, 2853 and 2863, respectively. The beam splitter 2832 may be positioned between the lens groups 2833 and 2835/2835'.

Light rays impinge upon and are reflected by the primary mirror 2804 first and the secondary mirror 2805 next. The rays reflected by the secondary mirror 2805 impinge on the beam splitter 2821 that redirects one part of the rays to the folding mirror 2822 and transmits another part of the rays to the beam splitter 2861. The beam splitter 2861 redirects one part of the rays to the folding mirror 2862 and transmits another part of the rays to the beam splitter 2831. The beam splitter 2831 redirects one part of the rays to the folding mirror 2842 and transmits another part of the rays to the beam splitter 2851. The beam splitter 2851 redirects one part of the rays to folding mirror 2852 and transmits another part of the rays to the focal length optimizer 2833.

The rays through the focal length optimizer 2823 maybe split by the beam splitter 2825 and reach the image planes 2826 and 2826' respectively. The rays through the focal length optimizer 2843 may be split by the beam splitter 2845 and reach the image planes 2846 and 2846' respectively. The rays through the focal length optimizer 2853 may be split by the beam splitter 2855 and reach the image planes 2856 and 2856' respectively. The rays through the focal length optimizer 2863 may be split by the beam splitter 2865 and reach the image planes 2866 and 2866' respectively. The rays transmitted through the focal length optimizer 2833 may be split by the beam splitter 2832. The rays redirected by beam splitter 2832 travel through lens group 2835 and arrive at the image plane 2836. The rays transmitted through the beam splitter 2832 may be redirected by the folding mirror 2832' and find their way to the image plane 2836'. The image planes 2826/2826', 2836/2736', 2846/2846', 2856/2856' and 2866/2866' may include one or more sensors, which may be aggregated in an orderly manner.

In certain embodiments, the group of lenses 2823, 2843, 2853 and 2863, with the image planes 2826/2826', 2846/2846', 2856/2856' and 2866/2866', respectively, may be positioned at a specific distance from and around the optical axis in a circumferential direction. In certain embodiments, the group of lenses 2833 and 2835/2835' with the image planes 2836 and 2836' may be positioned behind the primary mirror 2804. The groups of lenses 2823, 2843, 2853, 2863, and 2833/2835/2836' may be interchangeable with each other in their position.

For the rays redirected by the beam splitters 2821, 2831, 2851 and 2861, intermediate focuses may be formed near the folding mirrors 2822, 2842, 2852 and 2862, respectively. An exit pupil or Lyot stop may be positioned immediately after the lens groups 2823, 2843, 2853 and 2863, before the image planes 2826/2826', 2846/2846', 2856/2856' and 2866/2866', respectively. In certain embodiments, a Fabry Perot interferometer may be positioned for hyperspectral imaging at the exit pupil and/or Lyot stop. In certain embodiments, the filter wheel or slider that includes a series of meta-lens may be arranged, e.g. at the exit pupil and/or Lyot stop. The filter wheel or slider that includes a series of meta-lens may be arranged to correct optical aberrations due to mechanical and thermal distortion during system operation and to remove focus-shift due to the thermal expansion or shrinkage of system structure.

For the rays transmitted through the beam splitters 2821, 2831, 2851, and 2861, intermediate focus may be formed near the central aperture 2810 of the primary mirror 2804. An exit pupil or Lyot stop may be positioned between the beam splitter 2832 and the folding mirror 2832', which is located between the focal length optimizers 2833 and 2835/2835'. In certain embodiments, a Fabry Perot interferometer may be positioned for hyperspectral imaging at the exit pupil and/or Lyot stop. In certain embodiments, the filter wheel or slider that includes a series of meta-lens may be arranged, e.g. at the exit pupil or Lyot stop. The filter wheel or slider that includes a series of meta-lens may be arranged to correct optical aberrations due to mechanical and thermal distortion during system operation and to remove focus-shift due to the thermal expansion or shrinkage of system structure.

A forward motion compensator may stabilize a line of sight of the optical system 2800 or an instantaneous fieldof-view (IFOV) of the image sensors that are positioned at the image planes 2826/2826', 2836/2836', 2846/2846', 2856/2856', and 2866/2866'. Connected to an inertial measurement unit (IMU) and controlled to compensate unwanted motion, the folding mirrors 2822, 2832', 2842, 2852 and 2862, and the beam splitter 2832 may help in reducing image blur that is caused by an unstable motion of the platform, such as spacecraft, fighters, planes, drones, UAVs, or balloons.

Different from a traditional forward motion compensator, the folding mirrors 2822, 2832', 2842, 2852 and 2862, and the beam splitter 2832 may be used for low-light level imaging, replacing time delay integration (TDI) sensors that have been used for such a mission. Connected to an IMU and controlled to compensate unwanted motion, the folding mirrors 2822, 2832', 2842, 2852 and 2862, and the beam splitter 2832 may help in maintaining the line of sight of the optical system 2800 or the instantaneous field-of-view (IFOV) of the image sensors so that the sensors may collect more light for a given time-period. This approach may replace pitch maneuvering of a platform, like a spacecraft, drone, or UAV and gimbals.

Furthermore, different from a traditional forward motion compensator, the folding mirrors 2822, 2832', 2842, 2852 and 2862, and the beam splitter 2832 may be used to generate pixel shift images. Connected to an IMU and controlled to compensate unwanted motion, the folding mirrors 2822, 2832', 2842, 2852 and 2862, and the beam splitter 2832 may move the line of sight of the system 2800 or the IFOV of the image sensors so that projections of the sensors are shifted by 1/n pixels. The resultant image data may be used for super-resolution to enhance image resolution by post processing.

While there has been illustrated and described what are presently considered to be example embodiments, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

It is contemplated that various combinations or subcombinations of the specific features and aspects of the embodiments disclosed above may be made and still fall within one or more of the inventions. Further, the disclosure herein of any particular feature, aspect, method, property, characteristic, quality, attribute, element, or the like in connection with an embodiment may be used in all other embodiments set forth herein. Accordingly, it should be understood that various features and aspects of the disclosed embodiments can be combined with or substituted for one another in order to form varying modes of the disclosed inventions. Thus, it is intended that the scope of the present inventions herein disclosed should not be limited by the particular disclosed embodiments described above. Moreover, while the inventions are susceptible to various modifications, and alternative forms, specific examples thereof have been shown in the drawings and are herein described in detail. It should be understood, however, that the inventions are not to be limited to the particular forms or methods disclosed, but to the contrary, the invention is to cover all modifications, equivalents, and alternatives falling within the spirit and scope of the various embodiments described and the appended claims. Any methods disclosed herein need not be performed in the order recited.

The ranges disclosed herein also encompass any and all overlap, sub-ranges, and combinations thereof. Language such as "up to," "at least," "greater than," "less than," "between," and the like includes the number recited. Numbers preceded by a term such as "approximately", "about", "up to about," and "substantially" as used herein include the recited numbers, and also represent an amount or characteristic close to the stated amount or characteristic that still performs a desired function or achieves a desired result. For example, the terms "approximately", "about", and "substantially" may refer to an amount that is within less than 10% of, within less than 5% of, within less than 1% of, within less than 0.1% of, and within less than 0.01% of the stated amount or characteristic. Features of embodiments disclosed herein preceded by a term such as "approximately", "about", and "substantially" as used herein represent the feature with some variability that still performs a desired function or achieves a desired result for that feature.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced embodiment recitation is intended, such an intent will be explicitly recited in the embodiment, and in the absence of such recitation no such intent is present. For example, as an aid to understanding, the disclosure may contain usage of the introductory phrases "at least one" and "one or more" to introduce embodiment recitations. However, the use of such phrases should not be construed to imply that the introduction of an embodiment recitation by the indefinite articles "a" or "an" limits any particular embodiment containing such introduced embodiment recitation to embodiments containing only one such recitation, even when the same embodiment includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, embodiments, or drawings, should be understood to contemplate the possibilities of including one of the terms, either of the terms, or both terms. For example, the phrase "A or B" will be understood to include the possibilities of "A" or "B" or "A and B."

Although the present subject matter has been described herein in terms of certain embodiments, and certain exemplary methods, it is to be understood that the scope of the subject matter is not to be limited thereby. Instead, the Applicant intends that variations on the methods and materials disclosed herein which are apparent to those of skill in the art will fall within the scope of the disclosed subject matter.

What is claimed is:

1. A cata-dioptric optical system, comprising:
   a concave primary mirror having a central aperture and a radius, the primary mirror having one of a parabolic, non-parabolic conical, or aspherical surface;
   a convex secondary mirror facing and receiving light rays from the primary mirror, the secondary mirror having an aspherical surface, wherein an optical axis extends from a vertex of the primary mirror to a vertex of the secondary mirror;
   at least one beam splitter configured to separate specific spectral ranges of light rays, wherein a first beam splitter receives light rays reflected by the secondary mirror;
   a first folding mirror receiving light rays from the first beam splitter;
   a first group of lenses for a visible imaging chain receiving rays from the first beam splitter, wherein the first group of lenses is positioned in parallel to the optical axis;
   a second group of lenses for an infrared imaging chain receiving rays from the first folding mirror, wherein the second group of lenses is positioned in parallel to the optical axis; and
   at least two image planes having one or more aggregated sensors, wherein a first image plane receives rays from the first group of lenses and a second image plane receives rays from the second group of lenses, wherein at least one image plane is positioned behind the primary mirror and at a radial distance from the optical axis that is no more than the radius of the primary mirror.

2. The cata-dioptric optical system of claim 1, wherein the first beam splitter is a plate beam splitter.

3. The cata-dioptric optical system of claim 1, wherein an entrance pupil of the optical system is positioned near the primary mirror or the secondary mirror.

4. The cata-dioptric optical system of claim 1, wherein an intermediate focus is formed around a vertex of the primary mirror, is positioned between the primary mirror and the secondary mirror, or is positioned between the primary mirror and the first group of lenses.

5. The cata-dioptric optical system of claim 1, wherein the one or more aggregated sensors of the first image plane and the second image plane comprises a first sensor and a second sensor respectively, wherein the first group of lenses and the second group of lenses have spherical or aspherical surfaces and act as focal length optimizers to each independently adjust the focal length to match an optical resolution of each of the first group of lenses and the second group of lenses to a pixel size of the first and second sensor respectively.

6. The cata-dioptric optical system of claim 1, wherein the first beam splitter transmits rays of a specific spectral range and reflects rays of a different spectral range, is positioned between the primary mirror and the secondary mirror and has a tilt angle ranging from 65 to 115 degrees with respect to the optical axis.

7. The cata-dioptric optical system of claim 1, wherein the rays reflected by the secondary mirror impinge on the first beam splitter that redirects one part of the rays to the first folding mirror and transmits the other part of the rays to the first group of lenses.

8. The cata-dioptric optical system of claim 7, wherein, for the rays redirected by the first beam splitter, an intermediate focus is formed near the first folding mirror, and an exit pupil or Lyot stop is positioned immediately after the second lens group and before the second image plane.

9. The cata-dioptric optical system of claim 1, wherein the second group of lenses with the second image plane is positioned at a specific distance from and around the optical axis in a circumferential direction, and the first group of lenses with the first image plane is positioned behind the primary mirror.

10. The cata-dioptric optical system of claim 9, wherein, for the rays transmitted through the first beam splitter, the system comprises a second folding mirror and a third group of lenses positioned after the first group of lenses and before the first image plane.

11. The cata-dioptric optical system of claim 9, wherein, for the rays transmitted through the first beam splitter, an intermediate focus is formed near the central aperture of the primary mirror, and an exit pupil or Lyot stop is positioned in the middle of the first group of lenses or between the first and the third group of lenses.

12. The cata-dioptric optical system of claim 11, wherein, for the rays transmitted through the first beam splitter, a Fabry Perot interferometer is positioned for hyperspectral imaging at the exit pupil or Lyot stop.

13. The cata-dioptric optical system of claim 12, further comprising an inertial measurement unit connected to the first and second folding mirrors to compensate for unwanted motion of the system by stabilizing a line of sight of the system or an instantaneous field of view of image sensors positioned at the first and second image planes.

14. The cata-dioptric optical system of claim 12, further comprising an inertial measurement unit connected to the first and second folding mirrors to compensate for unwanted motion of the system, the first and second folding mirrors are configured to move a line of sight of the system or an instantaneous field of view of image sensors positioned at the first and second image planes so that projections of the sensors are shifted by 1/n pixels.

15. The cata-dioptric optical system of claim 11, wherein, for the rays transmitted through the first beam splitter, a filter wheel or slider that includes a series of meta-lens is arranged, at the exit pupil or Lyot stop, to correct residual optical aberrations, to minimize estimated optical aberrations due to mechanical and thermal distortion during system operation, and to remove focus-shift due to the thermal expansion or shrinkage of system structure.

16. The cata-dioptric optical system of claim 1, wherein the first group of lenses and the second group of lenses are interchangeable with each other in their position.

17. The cata-dioptric optical system of claim 1, wherein the rays reflected by the secondary mirror impinge on the first beam splitter that redirects one part of the rays to the first folding mirror and transmits another part of the rays to the first group of lenses, wherein, for the rays transmitted through the first beam splitter, the system comprises a second beam splitter positioned after the first group of lenses, wherein the second beam splitter redirects a portion of the rays through a third group of lenses and to the first image plane, and wherein the second beam splitter transmits through another portion of the rays to the second folding mirror and through a fourth group of lenses and to a third image plane.

18. The cata-dioptric optical system of claim 17, wherein the rays reflected by the secondary mirror impinge on the first beam splitter that redirects one part of the rays to the first folding mirror and transmits another part of the rays to the first group of lenses,
wherein for the rays redirected by the first beam splitter to the first folding mirror and then to the second group of lenses, the system further comprises a third beam splitter positioned in the second group of lenses, wherein the third beam splitter redirects a portion of the rays through a part of the second group of lenses and to a fourth image plane, and wherein the third beam splitter transmits through another portion of the rays to another part of the second group of lenses and to the second image plane.

19. The cata-dioptric optical system of claim 1, wherein the rays reflected by the secondary mirror impinge on the first beam splitter that redirects one part of the rays from the secondary mirror to the first folding mirror and transmits another part of the rays from the secondary mirror to a fourth beam splitter,
wherein for rays transmitted through the fourth beam splitter and then the first group of lenses, the system further comprises a second beam splitter positioned after the first group of lenses, wherein the second beam splitter redirects a portion of the rays through a third group of lenses and to the first image plane, and wherein the second beam splitter transmits through another portion of the rays to the second folding mirror and through a fourth group of lenses to a third image plane, and
wherein for rays redirected by the fourth beam splitter, the system further comprises a third folding mirror that receives the rays redirected by the fourth beam splitter and reflects these rays to a fifth group of lenses, and a fifth beam splitter positioned in the fifth group of lenses, wherein the fifth beam splitter redirects a portion of the rays through a part of the fifth group of lenses and to a fifth image plane, and wherein the fifth beam splitter transmits through another portion of the rays to another part of the fifth group of lenses and to a sixth image plane.

20. The cata-dioptric optical system of claim 19, wherein the rays reflected by the secondary mirror impinge on the first beam splitter that redirects one part of the rays from the secondary mirror to the first folding mirror and transmits another part of the rays from the secondary mirror to the fourth beam splitter,
wherein for the rays redirected by the first beam splitter to the first folding mirror and then to the second group of lenses, the system further comprises a third beam splitter positioned in the second group of lenses, wherein the third beam splitter redirects a portion of the rays through a part of the second group of lenses and to a fourth image plane, and wherein the third beam splitter transmits through another portion of the rays to another part of the second group of lenses and to the second image plane.

21. The cata-dioptric optical system of claim 19, wherein the first beam splitter transmits rays of a first spectral range and reflects rays of a second spectral range, wherein the fourth beam splitter transmits rays of a portion of the first spectral range and reflects rays of another portion of the first spectral range, and wherein the first beam splitter and the fourth beam splitter are each positioned between the primary mirror and the secondary mirror and each has a tilt angle ranging from 65 to 115 degrees with respect to the optical axis.

* * * * *